(12) United States Patent
Nukada et al.

(10) Patent No.: US 10,195,794 B2
(45) Date of Patent: Feb. 5, 2019

(54) METHOD FOR PRODUCING POROUS POLYIMIDE FILM, AND POROUS POLYIMIDE FILM

(71) Applicant: FUJI XEROX CO., LTD., Tokyo (JP)

(72) Inventors: Katsumi Nukada, Minamiashigara (JP); Tsuyoshi Miyamoto, Minamiashigara (JP); Tomoya Sasaki, Minamiashigara (JP); Kana Miyazaki, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/613,549

(22) Filed: Jun. 5, 2017

(65) Prior Publication Data

US 2017/0266892 A1    Sep. 21, 2017

Related U.S. Application Data

(62) Division of application No. 14/811,654, filed on Jul. 28, 2015, now Pat. No. 9,707,722.

(30) Foreign Application Priority Data

Mar. 26, 2015  (JP) ................. 2015-064679
Mar. 26, 2015  (JP) ................. 2015-064680
Mar. 26, 2015  (JP) ................. 2015-064681

(51) Int. Cl.
```
B29C 67/20     (2006.01)
C08J 5/18      (2006.01)
C09D 179/08    (2006.01)
C08J 7/04      (2006.01)
B29C 71/02     (2006.01)
B29K 105/00    (2006.01)
B29K 103/00    (2006.01)
B29L 7/00      (2006.01)
B29K 79/00     (2006.01)
```

(52) U.S. Cl.
CPC ............ B29C 67/202 (2013.01); C08J 5/18 (2013.01); C08J 7/047 (2013.01); C08J 7/08 (2013.01); C09D 179/08 (2013.01); *B29K 2079/08* (2013.01); *B29K 2103/00* (2013.01); *B29K 2105/0002* (2013.01); *B29K 2105/0073* (2013.01); *B29K 2105/251* (2013.01); *B29L 2007/008* (2013.01); *C08J 2379/08* (2013.01); *C08L 2203/14* (2013.01); *C08L 2203/16* (2013.01)

(58) Field of Classification Search
CPC .. B29C 67/202; C08J 5/18; C08J 7/047; C08J 7/08; C08J 2379/08; C09D 179/08; B29K 2079/08; B29K 2103/00; B29K 2105/0002; B29K 2105/0073; B29K 2105/251; B29L 2007/008; C08L 2203/14; C08L 2203/16
See application file for complete search history.

(56) References Cited

U.S. PATENT DOCUMENTS

| | | | |
|---|---|---|---|
| 6,346,343 B1 | 2/2002 | Notten et al. | |
| 6,444,368 B1 | 9/2002 | Hikmet et al. | |
| 6,451,965 B1 | 9/2002 | Kanada et al. | |
| 8,022,110 B2 | 9/2011 | Yamada et al. | |

FOREIGN PATENT DOCUMENTS

| | | | | |
|---|---|---|---|---|
| EP | 3029093 A1 * | 6/2016 | ................ | C08J 9/26 |
| JP | H10-302749 A | 11/1998 | | |
| JP | 2003-514355 A | 4/2003 | | |
| JP | 2008-034212 A | 2/2008 | | |
| JP | 2010-024385 A | 2/2010 | | |
| JP | 2011-111470 A | 6/2011 | | |
| JP | 2012-107144 A | 6/2012 | | |
| JP | 6331627 B2 | 10/2013 | | |
| JP | 2014-240189 A | 12/2014 | | |
| WO | 2014/196435 A1 | 12/2014 | | |
| WO | WO-2015020101 A1 * | 2/2015 | ................ | C08J 9/26 |

OTHER PUBLICATIONS

Jul. 31, 2018 Office Action issued in Japanese Application No. 2015-064680.

* cited by examiner

*Primary Examiner* — Irina S Zemel
(74) *Attorney, Agent, or Firm* — Oliff PLC

(57) ABSTRACT

There is provided a method for producing a porous polyimide film, including a first step of forming a coating film containing a polyimide precursor solution where a polyimide precursor and an organic amine compound are dissolved in an aqueous solvent, and a resin particle incapable of dissolving in the polyimide precursor solution, followed by drying of the coating film to form a coat containing the polyimide precursor and the resin particle, and a second step of heating the coat to imidize the polyimide precursor and form a polyimide film, the second step including a treatment for removing the resin particle.

7 Claims, 7 Drawing Sheets

METHOD FOR PRODUCING POROUS POLYIMIDE FILM, AND POROUS POLYIMIDE FILM

CROSS-REFERENCE TO RELATED APPLICATIONS

This application is a Divisional application of U.S. patent application Ser. No. 14/811,654, filed on Jul. 28, 2015, which is based on and claims priority under 35 USC 119 from Japanese Patent Application No. 2015-064679, Japanese Patent Application No. 2015-64680, and Japanese Patent Application No. 2015-064681, all filed on Mar. 26, 2015.

BACKGROUND

1. Field

The present invention relates to a method for producing a porous polyimide film, and a porous polyimide film.

2. Description of the Related Art

A polyimide resin is a material having excellent properties in terms of mechanical strength, chemical stability and heat resistance, and a porous polyimide film having such properties is attracting attention.

SUMMARY

[1] A method for producing a porous polyimide film, containing:

a first step of forming a coating film containing a polyimide precursor solution where a polyimide precursor and an organic amine compound are dissolved in an aqueous solvent, and a resin particle incapable of dissolving in the polyimide precursor solution, followed by drying of the coating film to form a coat containing the polyimide precursor and the resin particle, and a second step of heating the coat to imidize the polyimide precursor and form a polyimide film, the second step including a treatment for removing the resin particle.

DESCRIPTION OF REFERENCE NUMERALS AND SIGNS

Figure 1A:
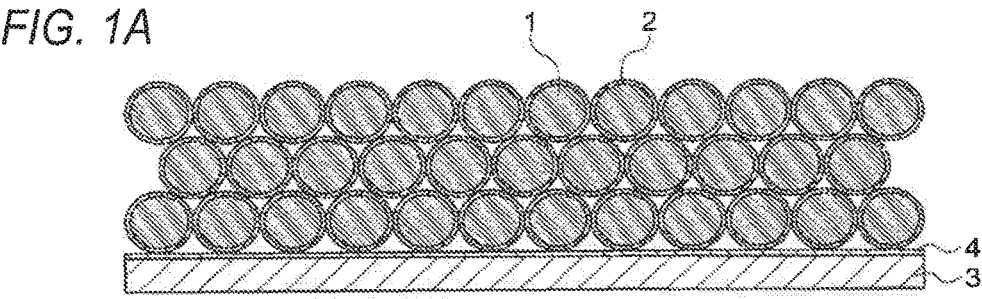
FIG. 1A, FIG. 1B, FIG. 1C, and FIG. 1D are process charts showing an example of the production method of a porous polyimide film in an exemplary embodiment of the present invention.

1: Resin particle
2: Binder resin
3: Base plate
4: Release layer
5: Polyimide precursor solution
7: Vacancy
11: Uncrosslinked resin particle
61: Polyimide coat
62: Porous polyimide film

DETAILED DESCRIPTION

Exemplary embodiments as an example of the present invention are described below.

At first, a first exemplary embodiment of the present invention is described below.

<Production Method of Porous Polyimide Film>

The production method of a porous polyimide film according to the first exemplary embodiment of the present invention includes a first step of forming a coating film containing a polyimide precursor solution where a polyimide precursor and an organic amine compound are dissolved in an aqueous solvent, and a resin particle incapable of dissolving in the polyimide precursor solution, followed by drying of the coating film to form a coat containing the polyimide precursor and the particle, and a second step of heating the coat to imidize the polyimide precursor and form a polyimide film, the second step including a treatment for removing the resin particle.

The "incapable of dissolving in" as used in the first exemplary embodiment of the present invention means that the object substance substantially maintains the form of a resin particle in the object liquid at 25° C., and encompasses a case where the object substance dissolves in an amount of 3 mass % or less.

In the production method of a porous polyimide film according to the first exemplary embodiment of the present invention, thanks to the configuration above, the production process is simplified, compared with a case where the solvent in the polyimide precursor solution is only an organic solvent.

The polyimide film is obtained, for example, by applying a polyimide precursor solution dissolved in an organic solvent (e.g., N-methylpyrrolidone (hereinafter, sometimes referred to as "NMP")) or a polyimide precursor solution dissolved in a high-polarity solvent such as N,N-dimethylacetamide (hereinafter, sometimes referred to as "DMAc"), and then heating and shaping the coating.

The porous polyimide film is obtained, for example, by a method where a film is shaped using a polyimide precursor solution dissolved in an organic solvent, then contacted with a poor solvent such as water to precipitate a polyamic acid, thereby creating pores, and thereafter, subjected to imidization, or a method of using a particle and a polyimide precursor solution dissolved in an organic solvent and removing the particle. The production method of a porous polyimide film includes, for example, a method of obtaining a porous polyimide film having formed therein a three-dimensionally ordered array structure (3DOM structure) of vacancies by using a silica particle layer as a mold, and a method of producing a coat by using a polyimide precursor solution having dispersed therein silica particles, firing the coat, and then removing the silica particles to obtain a porous polyimide film. However, according to these methods, a chemical such as hydrofluoric acid needs to be used in the treatment for removing the silica particle. In addition, in the case of producing a silica particle layer mold, a high heat treatment at 1,000° C. or more must be performed for sintering the particles together to form the silica particle layer. In the case of using a polyimide precursor solution having dispersed therein silica particles, a treatment for enhancing the dispersibility of the silica particle in the polyimide precursor solution is sometimes performed by subjecting the surface of the silica particle to a hydrophobization treatment. Therefore, in these production methods, the productivity is low, and the cost is high.

The production method also includes a method of forming a film from a resin composition containing a resin particle and a polyimide precursor solution dissolved in an organic solvent, and then removing the resin particle to obtain a porous polyimide film. In this case, since NMP or DMAc has a very high dissolving power, a general resin particle (for example, a polystyrene resin particle) is subject to dissolution, etc. due to the organic solvent dissolving the polyimide precursor, and a porous polyimide film may be hardly obtained.

Meanwhile, there is a method of producing, as a resin particle, a dispersion liquid of a polyoxyalkylene resin that is difficult to dissolve in an organic solvent such as NMP, mixing the dispersion liquid with a polyimide precursor solution dissolved in an organic solvent to prepare a resin composition, forming a film from the resin composition, and then removing the resin particle by heating to obtain a porous polyimide film. Since this resin particle is produced by emulsion polymerization, etc., a step of replacing the solvent by an organic solvent such as NMP may have to be provided so as to mix the resin particle with the polyimide precursor solution.

On the other hand, in the production method of a porous polyimide film in the first exemplary embodiment of the present invention, a polyimide precursor is dissolved in an aqueous solvent. Because of an aqueous solvent, the resin particle is kept from dissolution, etc. and therefore, a porous polyamide film is easily produced. In addition, a step of replacing the dispersion solvent in the water dispersion liquid of the resin particle by an organic solvent need not be provided.

The production method of a porous polyimide film in the first exemplary embodiment of the present invention encompasses a method where a resin particle layer working out to a mold is produced using a resin particle, but at the time of production of the resin particle layer, a heating temperature (for example, 100° C.) capable of forming a resin particle layer while maintaining the shape of the resin particle may be sufficient. Therefore, a resin particle layer mold is produced without performing a high heat treatment at 1,000° C. or more required when producing a silica particle layer mold, and the production process is simplified.

For these reasons, it is considered that in the production method of a porous polyimide film according to the first exemplary embodiment of the present invention, the production process is simplified, compared with a case where the solvent in the polyimide precursor solution is only an organic solvent.

In the porous polyimide film obtained by the production method of a porous polyimide film in the first exemplary embodiment of the present invention, generation of cracks is likely suppressed. This is presumed to occur because in the production method of a porous polyimide film in the first exemplary embodiment of the present invention, a resin particle is used and the use thereof effectively contributes to the relaxation of residual stress in the imidization step of the polyimide precursor.

In the porous polyimide film obtained by the production method of a porous polyimide film in the first exemplary embodiment of the present invention, the variation in vacancy shape, vacancy diameter, etc. is likely suppressed. The reason therefor is presumed to be that a resin particle is used and the use thereof effectively contributes to the relaxation of residual stress in the imidization step of the polyimide precursor.

Furthermore, in the porous polyimide film obtained by the production method of a porous polyimide film in the first exemplary embodiment of the present invention, the polyimide precursor is dissolved in an aqueous solvent and therefore, the boiling temperature of the polyimide precursor solution is about 100° C. Accordingly, the solvent rapidly volatilizes as the coat containing the polyimide precursor and the resin particle is heated, and thereafter, an imidization reaction proceeds. Before deformation of the resin particle in the coat occurs due to heat, the resin particle loses fluidity and becomes insoluble in an organic solvent. For this reason, the shape of vacancy is considered to be likely maintained, making it easy to suppress the variation in vacancy shape, vacancy diameter, etc. In addition, thanks to an aqueous solvent, the resin particle is prevented from dissolution, etc. Accordingly, the vacancy diameter of the porous polyimide film can be controlled by the particle diameter of the resin particle.

Incidentally, in the case of using a silica particle, it is thought that since volume contraction is hardly absorbed in the imidization step, the polyimide film after imidization is prone to generation of cracks. In addition, in the case of using a silica particle, it is thought that since a chemical such as hydrofluoric acid is used, an ion is likely to remain as an impurity.

The production method of a porous polyimide film according to the first exemplary embodiment of the present invention is described below.

In the drawings referred to in the description of the production method, the same numerical reference is used for the same component part. As to the numerical reference in each drawing, 1 indicates a resin particle, 2 indicates a binder resin, 3 indicates a base plate, 4 indicates a release layer, 5 indicates a polyimide precursor solution, 7 indicates a vacancy, 61 indicates a coat (polyimide coat) in the process of performing imidization of the polyimide precursor, and 62 indicates a porous polyimide film.

The production method of a porous polyimide film according to the first exemplary embodiment of the present invention includes the above-described first step and the above-described second step. In the following, the production method depicted in FIG. 1A, FIG. 1B, FIG. 1C, and FIG. 1D (one example of the production method according to the first exemplary embodiment of the present invention) is described, but the production method is not limited thereto.

(First Step)

In the first step, a polyimide precursor solution where a polyimide precursor and an organic amine compound are dissolved in an aqueous solvent, is prepared. Thereafter, a coating film containing the polyimide precursor solution and a resin particle incapable of dissolving in the polyimide precursor solution is formed on a base plate. The coating film formed on the base plate is then dried to form a coat containing the polyimide precursor and the resin particle.

In the first step, the method for forming, on a base plate, a coating film containing the polyimide precursor solution and a resin particle incapable of dissolving in the polyimide precursor solution includes specifically the following method.

First, a resin particle dispersion liquid containing a resin particle incapable of dissolving in the polyimide precursor solution, an organic solvent incapable of dissolving the resin particle, and a binder resin capable of dissolving in the organic solvent is prepared. Next, the resin particle dispersion liquid is applied onto a base plate and dried to form a resin particle layer. In the resin particle layer formed on the base plate, for example, adjacent resin particles are present without dissolving each other, adjacent resin particles are at the same time bonded to each other with a binder resin, and a void is formed between resin particles of the resin particle layer (see, FIG. 1A).

Meanwhile, a polyimide precursor solution where a polyimide precursor and an organic amine compound are dissolved in an aqueous solvent, is previously prepared.

The previously prepared polyimide precursor solution is impregnated between resin particles of the resin particle layer formed on the base plate. By impregnating the polyimide precursor solution between resin particles of the resin particle layer, the void formed between resin particles of the resin particle layer is filled with the polyimide precursor solution. In order to promote filling, it is also preferable to remove a gas component in the void by reducing the pressure in the state of the polyimide precursor solution being put into contact with the resin particle. Thereafter, the coating film is dried, whereby a coat containing the polyimide precursor and the resin particle is formed on the base plate (see, FIG. 1B).

The base plate on which the coat containing the polyimide precursor and the resin particle is formed, is not particularly limited and includes, for example, a base plate made of a resin such as polystyrene and polyethylene terephthalate; a glass-made base plate; a ceramic-made base plate; a metal base plate such as iron and stainless steel (SUS); and a composite material base plate formed by combining these materials. If desired, the base plate may be subjected to a release treatment with a silicone-based or fluorine-based release agent, etc. to provide a release layer.

The method for producing the resin particle dispersion liquid is not particularly limited and includes, for example, a method where each of the resin particle incapable of dissolving in the polyimide precursor solution, the organic solvent incapable of dissolving the resin particle, and the binder resin capable of dissolving in the organic solvent is weighed and these are mixed and stirred to obtain the resin particle dispersion liquid. As for the resin particle, a dispersion liquid where resin particles are previously dispersed may be produced, or a commercial product where resin particles are previously dispersed may be prepared. In the case of producing a dispersion liquid where resin particles are previously dispersed, the dispersibility of the resin particle may be increased, for example, by using at least either one of an ionic surfactant and a nonionic surfactant.

The binder resin may be previously dissolved in the above-described organic solvent or may be mixed with the resin particle and the organic solvent and dissolved.

The ratio (mass ratio) between the resin particle and the binder resin in the resin particle dispersion liquid is suitably resin particle:binder resin=from 100:0.5 to 100:50, preferably from 100:1 to 100:30, more preferably from 100:2 to 100:20. Within this range, in the resin particle layer formed from the resin particle dispersion liquid, a state where the surface of each resin particle is partially or entirely covered with the binder resin and adjacent resin particles are bonded to each other (including a primarily adhering state; a so-called pseudo-adhesion state), is likely formed, and a void producing an air layer state is readily formed between resin particles of the resin particle layer.

The resin particle is not particularly limited as long as it does not dissolve in the polyimide precursor solution, and includes, for example, a resin particle obtained by polycondensation of a polymerizable monomer, such as polyester resin and urethane resin, and a resin particle obtained by radical polymerization of a polymerizable monomer, such as vinyl resin and olefin resin. The resin particle obtained by radical polymerization includes, for example, resin particles of (meth)acrylic resin, (meth)acrylic acid ester resin, styrene·(meth)acrylic resin, polystyrene resin and polyethylene resin.

Among these, the resin particle is preferably at least one member selected from the group consisting of (meth)acrylic resin, (meth)acrylic acid ester resin, styrene·(meth)acrylic resin, and polystyrene resin.

The resin particle may or may not be crosslinked. From the standpoint of effectively contributing to the relaxation of residual stress in the imidization step of the polyimide precursor, an uncrosslinked resin particle is preferred.

The term "(meth)acrylic" as used in an exemplary embodiment of the present invention means that both "acrylic" and "methacrylic" are encompassed.

In the case where the resin particle is, for example, a vinyl resin particle, the synthesis method thereof is not particularly limited, and a known polymerization method (a radical polymerization method such as emulsion polymerization, soap-free emulsion polymerization, suspension polymerization, miniemulsion polymerization and microemulsion polymerization) may be applied.

For example, in the case of applying an emulsion polymerization method to the production of the vinyl resin particle, a monomer such as styrenes and (meth)acrylic acids is added to water having dissolved therein a water-soluble polymerization initiator such as potassium persulfate and ammonium persulfate, a surfactant such as sodium dodecylsulfate and diphenyl oxide disulfonates is further added, if desired, and the mixture is heated under stirring to perform polymerization, whereby the vinyl resin particle is obtained.

As for the monomer, the vinyl resin includes, for example, a vinyl resin unit obtained by polymerization of a monomer, e.g., styrene structure-containing styrenes such as styrene, an alkyl-substituted styrene (for example, α-methylstyrene, 2-methylstyrene, 3-methylstyrene, 4-methylstyrene, 2-ethylstyrene, 3-ethylstyrene and 4-ethylstyrene), a halogen-substituted styrene (for example, 2-chlorostyrene, 3-chlorostyrene and 4-chlorostyrene) and divinylnaphthalene; vinyl group-containing esters such as methyl (meth)acrylate, ethyl (meth)acrylate, n-propyl (meth)acrylate, n-butyl (meth)acrylate, lauryl (meth)acrylate, 2-ethylhexyl (meth)acrylate and trimethylolpropane trimethacrylate (TMPTMA); vinyl nitriles such as acrylonitrile and methacrylonitrile; vinyl ethers such as vinyl methyl ether and vinyl isobutyl ether, vinyl ketones such as vinyl methyl ketone, vinyl ethyl ketone and vinyl isopropenyl ketone; acids such as (meth)acrylic acid, maleic acid, cinnamic acid, fumaric acid and vinylsulfonic acid; and bases such as ethyleneimine, vinylpyridine and vinylamine.

As another monomer, a monofunctional monomer such as vinyl acetate, a bifunctional monomer such as ethylene glycol dimethacrylate, nonane diacrylate and decanediol diacrylate, or a polyfunctional monomer such as trimethylolpropane triacrylate and trimethylolpropane trimethacrylate, may be used in combination.

The vinyl resin may be a resin using such a monomer alone or a resin that is a copolymer using two or more of these monomers.

As described above, the resin particle is preferably uncrosslinked, but in the case of crosslinking the resin particle, when a crosslinking agent is used at least as part of the monomer components, the ratio of the crosslinking agent to all monomer components is preferably from 0 mass % to 20 mass %, more preferably from 0 mass % to 5 mass %, still more preferably 0 mass %.

In the case where the monomer used for the resin constituting the vinyl resin particle contains styrene, the ratio of styrene to all monomer components is preferably from 20 mass % to 100 mass %, more preferably from 40 mass % to 100 mass %.

The average particle diameter of the resin particle is not particularly limited but is suitably, for example, 2.5 μm or less, preferably 2.0 μm or less, more preferably 1.0 μm or less. The lower limit is not particularly limited but is suitably 0.001 μm or more, preferably 0.005 μm or more, more preferably 0.01 μm or more.

As for the average particle diameter of the resin particle, a cumulative distribution for the volume is drawn from the small diameter side with respect to divided particle size ranges (channels) by using a particle size distribution obtained by measurement by means of a laser diffraction particle size distribution measuring apparatus (for example, LA-700, manufactured by Horiba, Ltd.), and the particle diameter at an accumulation of 50% relative to all particles is measured as the volume average particle diameter D50v.

The resin particle may be a commercial product. Specifically, the crosslinked resin particle includes, for example, a crosslinked polymethyl methacrylate (MBX-Series, produced by Sekisui Plastics Co., Ltd.), a crosslinked polystyrene (SBX-Series, produced by Sekisui Plastics Co., Ltd.), and a crosslinked methyl methacrylate-styrene copolymer resin particle (MSX-Series, produced by Sekisui Plastics Co., Ltd.).

The uncrosslinked resin particle includes, for example, a polymethyl methacrylate (MB-Series, produced by Sekisui Plastics Co., Ltd.), and a (meth)acrylic acid ester-styrene copolymer (FS-Series, produced by Nippon Paint Co., Ltd.).

The binder resin is not particularly limited as long as it dissolves in the organic solvent and does not dissolve in the polyimide precursor solution. The binder resin includes, for example, an acetal resin such as polyvinylbutyral resin; a polyamide resin such as nylon; a polyester resin such as polyethylene terephthalate and polyethylene naphthalate; a polyolefin resin such as polyethylene and polypropylene; an acrylic resin; a vinyl resin such as polyvinyl chloride resin and polyvinylidene chloride resin; a polyurethane resin; polyvinylpyrrolidone, polyethylene glycol, and polyvinyl alcohol. A polyvinylacetal resin and an aliphatic polyamide resin are preferred.

The organic solvent incapable of dissolving the resin particle includes, for example, alcohols such as methanol, ethanol and ethylene glycol; cellosolves such as ethylene glycol monomethyl ether, hydrocarbons such as hexane; ketones such as acetone; aromatics such as toluene; esters such as ethyl acetate; and nitriles such as acetonitrile.

Among these, from the standpoint of maintaining the shape of the resin particle, alcohols and cellosolves are preferred, and the binder resin is preferably a resin soluble in alcohols and cellosolves (for example, acetal resin and polyamide resin).

The method for applying the resin particle dispersion liquid onto a base plate is not particularly limited and includes various methods, for example, a spray coating method, a spin coating method, a roll coating method, a bar coating method, a slit die coating method, and an inkjet coating method.

The coating film formed by applying the resin particle dispersion liquid onto the base plate is dried to obtain the resin particle layer. The drying temperature may be a temperature capable of maintaining the shape of the resin particle and bonding resin particles to each other (for example, 100° C.).

Subsequently, a coating film containing the polyimide precursor solution and the resin particle is formed by impregnating the previously prepared polyimide precursor solution between resin particles of the resin particle layer formed above, and the coating film is then dried to form a coat containing the polyimide precursor and the resin particle.

The method for impregnating the polyimide precursor solution is not particularly limited and includes, for example, a method where the base plate having formed thereon the resin particle layer is dipped in the polyimide precursor solution, and a method where the polyimide precursor solution is applied onto the resin particle layer formed on the base plate and impregnated between particles of the resin particle layer.

The method for applying the polyimide precursor solution onto the resin particle layer formed on the base plate includes various methods, for example, a spray coating method, a spin coating method, a roll coating method, a bar coating method, a slit die coating method, and an inkjet coating method. From the standpoint of impregnating the polyimide precursor solution between resin particles forming the resin particle layer, a vacuum impregnation filling method of applying the polyimide precursor solution onto the resin particle layer and then reducing the pressure, thereby filling between resin particles with the polyimide precursor solution, is preferably employed, because the polyimide precursor solution is efficiently impregnated into a void between resin particles.

The method for forming a coating film containing the polyimide precursor solution and the resin particle is not limited to the methods above.

For example, the method specifically includes the following method. First, a polyimide precursor solution where a polyimide precursor and an organic amine compound are dissolved in an aqueous solvent, is prepared. Next, the polyimide precursor solution and a resin particle incapable of dissolving in the polyimide precursor solution are mixed to obtain a polyimide precursor solution having dispersed therein resin particles (hereinafter, sometimes referred to as "resin particle-dispersed polyimide precursor solution"). This resin particle-dispersed polyimide precursor solution is applied onto the base plate to form a coating film containing the polyimide precursor solution and the resin particle. Resin particles in the coating film are distributed in the state of aggregation being suppressed (see, FIG. 3A). Thereafter, the coating film is dried, whereby a coat containing the polyimide precursor and the resin particle is formed on the base plate.

The method for producing the resin particle-dispersed polyimide precursor solution is not particularly limited and includes, for example, a method of mixing the polyimide precursor solution and the resin particle in a dry state, and a method of mixing the polyimide precursor solution with a dispersion liquid where resin particles are previously dispersed in an aqueous solvent. As the dispersion liquid where resin particles are previously dispersed in an aqueous solvent, a resin particle dispersion liquid where resin particles are previously dispersed in an aqueous solvent may be produced, or a commercially available dispersion liquid where resin particles are previously dispersed in an aqueous solvent may be prepared. In the case of producing a dispersion liquid where resin particles are previously dispersed, the dispersibility of the resin particle may be increased, for example, by using at least either one of an ionic surfactant and a nonionic surfactant.

In the polyimide precursor solution having dispersed therein resin particles, the ratio of the resin particle is suitably, in terms of mass ratio assuming that the solid content of the polyimide precursor solution is 100, solid content of polyimide precursor solution:resin particle=from 100:20 to 100:200, preferably from 100:25 to 100:180, more preferably from 100:30 to 100:150.

The method for applying the resin particle-dispersed polyimide precursor solution onto the base plate is not particularly limited and includes various methods, for example, a spray coating method, a spin coating method, a roll coating method, a bar coating method, a slit die coating method, and an inkjet coating method.

The amount of the polyimide precursor solution coated for obtaining the coating film containing the polyimide precursor solution obtained above and the resin particle is suitably an amount allowing the resin particle to be exposed on the coating film surface, because the pore area ratio of the porous polyimide film can be increased. For example, in the case of impregnating the polyimide precursor solution between resin particles forming the resin particle layer, the polyimide precursor solution is suitably impregnated with a thickness less than the thickness of the resin particle layer.

In the case of forming the resin particle-dispersed polyimide precursor solution on the base plate, the solution is suitably formed after adding the resin particle in an amount allowing the resin particle to be exposed on the coating film surface.

After the coating film containing the polyimide precursor solution obtained by the method above and the resin particle is formed, the coating film is dried to form a coat containing the polyimide precursor and the resin particle. Specifically, the coating film containing the polyimide precursor solution and the resin particle is dried, for example, by heat drying, natural drying, vacuum drying or other methods to form a coat. More specifically, the coat is formed by drying the coating film such that the solvent remaining in the coat accounts for 50% or less, preferably 30% or less, relative to the solid content of the coat. This coat is in a state of the polyimide precursor being dissolvable in water.

At the time of formation of the coating film, the coating film may be formed with an amount enough to embed the resin particle in the coating film. In this case, in the first step, a treatment for exposing the resin particle may be performed in the process of drying the obtained coating film to form the coat, so as to provide a state of the resin particle being exposed. The pore area ratio of the porous polyimide film is increased by performing the treatment for exposing the resin particle.

The treatment for exposing the resin particle specifically includes the following method.

Figure 1B:
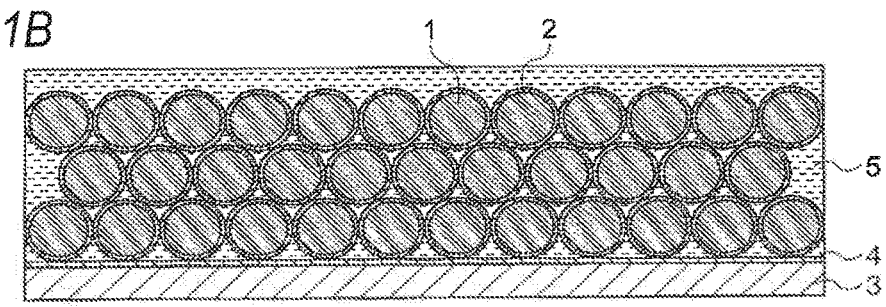
Figure 1C:
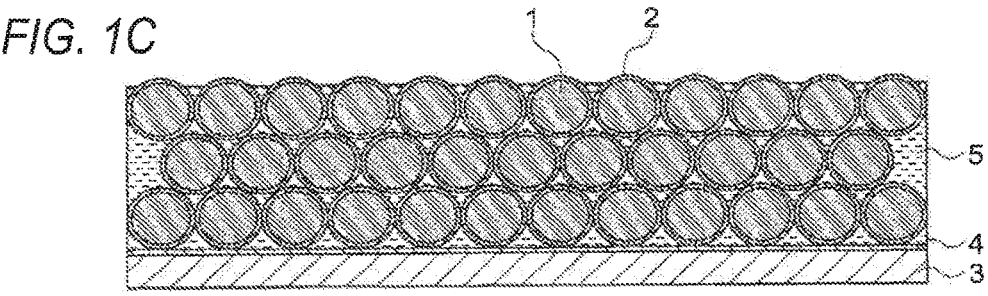
Figure 1D:
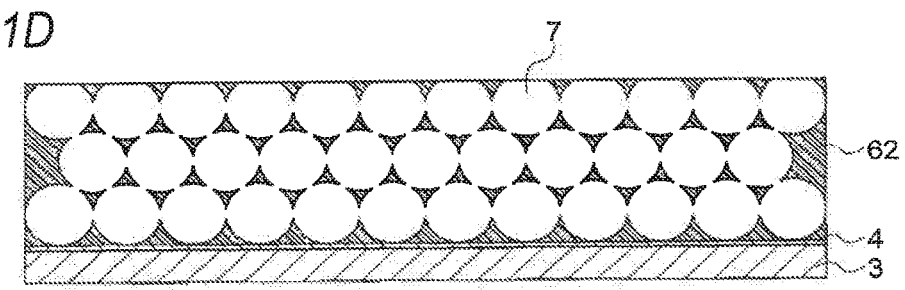

When the coating film is formed to embed the resin particle layer by impregnating the polyimide precursor solution between resin particles forming the resin particle layer, the polyimide precursor solution is present in the region exceeding the thickness of the resin particle layer (see, FIG. 1B).

In the process of drying the coating film to form the coat containing the polyimide precursor and the resin particle after obtaining the coating film containing the polyimide precursor solution and the resin particle, the coat is in a state of the polyimide precursor being dissolvable in water. The coat in this state is treated, for example, by wiping or dipping in water, whereby the resin particle can be exposed. Specifically, the polyimide precursor solution present in the region exceeding the thickness of the resin particle layer is subjected to, for example, a treatment for exposing the resin particle layer by wet wiping, whereby the polyimide precursor solution present in the region exceeding the thickness of the resin particle layer is removed. As a result, the resin particle present in the region at the top of the resin particle layer (that is, the region on the side distant from the base plate of the resin particle layer) is exposed on the coat surface (see, FIG. 1C).

In this connection, in the case of forming the coat on the base plate by using the resin particle-dispersed polyimide precursor solution, when a coat having embedded therein the resin particle is formed, the same treatment as the above-described treatment for exposing the resin particle can also be employed as the treatment for exposing the resin particle embedded in the coat.

(Second Step)

The second step is a step of heating the coat containing the polyimide precursor and the resin particle, obtained in the first step, to imidize the polyimide precursor and form a polyimide film. The second step includes a treatment for removing the resin particle. A porous polyimide film is obtained through the treatment for removing the resin particle.

In the second step, the step of forming a polyimide film is specifically performed by heating the coat containing the polyimide precursor and the resin particle, obtained in the first step, thereby allowing imidization to proceed, and further heating the coat to form a polyimide film. As the imidization proceeds and the imidization ratio rises, the coat becomes hardly dissolvable in an organic solvent.

Thereafter, in the second step, a treatment for removing the resin particle is performed. As for the removal, the resin particle may be removed in the process of imidizing the polyimide precursor by heating the coat or may be removed from a polyimide film after the completion of imidization (after imidization).

In the first exemplary embodiment of the present invention, the process of imidizing the polyimide precursor indicates a process of heating the coat containing the polyimide precursor and the resin particle, obtained in the first step, thereby allowing imidization to proceed and producing a state prior to becoming a polyimide film after the completion of imidization.

Specifically, the resin particle is removed from the coat in the process of heating the coating film obtained in the first step, on which the resin particle is exposed, and thereby imidizing the polyimide precursor (hereinafter, the coat in this state is sometimes referred to as "polyimide coat"). Alternatively, the resin particle may be removed from the polyimide film after the completion of imidization. As a result, a porous polyimide film, from which the resin particle is removed, is obtained (see, FIG. 1D).

In view of removability, etc. of the resin particle, the treatment for removing the resin particle is preferably performed when the imidization ratio of the polyimide precursor in the polyimide coat is 30% or more, in the process of imidizing the polyimide precursor. When the imidization ratio becomes 30% or more, the coat becomes hardly dissolvable in an organic solvent.

The treatment for removing the resin particle includes, for example, a method of removing the resin particle by heating, a method of removing the resin particle with an organic solvent capable of dissolving the resin particle, and a method of removing the resin particle by decomposition using a laser, etc. Among these, a method of removing the resin particle by heating, and a method of removing the resin particle with an organic solvent capable of dissolving the resin particle are preferred.

As the method of removing the resin particle by heating, the resin particle may be decomposed and removed, for example, by the heating performed for allowing the imidization to proceed in the process of imidizing the polyimide precursor. In this case, an operation of removing the resin particle with a solvent is omitted, which is advantageous in view of reducing the number of steps. On the other hand, depending on the kind of the resin particle, a decomposition gas may be generated by heating, and rupture, cracking, etc. may occur in the porous polyimide film due to the decomposition gas. Therefore, in this case, a method of removing the resin particle with an organic solvent capable of dissolving the resin particle is preferably employed. Incidentally, it is also effective to further perform heating after the removal with an organic solvent capable of dissolving the resin particle and thereby raise the removal ratio.

The method of removing the resin particle with an organic solvent capable of dissolving the resin particle includes, for example, a method of bringing the coat into contact with an organic solvent capable of dissolving the resin particle (for example, dipping in the solvent), and thereby dissolving and removing the resin particle. Dipping in this state in the solvent is preferred because the dissolution efficiency for the resin particle is increased.

The organic solvent capable of dissolving the resin particle for removing the resin particle is not particularly limited as long as it is an organic solvent incapable of dissolving the polyimide coat and the imidization-completed polyimide film and capable of dissolving the resin particle. The organic solvent includes, for example, ethers such as tetrahydrofuran; aromatics such as toluene; ketones such as acetone; and esters such as ethyl acetate.

In the case where the aqueous solvent remains at the time of dissolving the resin particle, the aqueous solvent may dissolve in the solvent capable of dissolving the resin particle and precipitation of the polyimide precursor may occur to produce a state similar to that in a so-called wet phase transition method, making it difficult to control the vacancy diameter. On this account, the resin particle is preferably dissolved and removed with an organic solvent after reducing the amount of the remaining aqueous solvent to 20 mass % or less, preferably 10 mass % or less, relative to the mass of the polyimide precursor.

In the second step, the heating method when heating the coat obtained in the first step to allow the progression of imidization and thereby obtain a polyimide film is not particularly limited and includes, for example, a method of heating the coat in two stages. In the case of two-stage heating, the heating conditions specifically include the following heating conditions.

As for the heating conditions in the first stage, the temperature is preferably a temperature capable of maintaining the shape of the resin particle. Specifically, the temperature is suitably, for example, from 50° C. to 150° C., preferably from 60° C. to 140° C. The heating time is suitably from 10 minutes to 60 minutes. As the heating temperature is higher, the heating time may be shorter.

As for the heating conditions in the second stage, heating is performed, for example, under the conditions of from 150° C. to 400° C. (preferably from 200° C. to 390° C.) and from 20 minutes to 120 minutes. Under the heating conditions in these ranges, the imidization reaction further proceeds and a polyimide film can be formed. At the time of heating reaction, heating is suitably performed by step-by-step raising the temperature or gradually raising the temperature at a constant rate, before reaching the final temperature of heating.

The heating conditions are not limited to the above-described two-stage heating method and, for example, a method of heating the coat in a single stage may be employed. In the case of the single-stage heating method, for example, the imidization may be completed only under the heating conditions of the second stage above.

In the case where a treatment for exposing the resin particle is not applied in the first step, from the standpoint of increasing the pore area ratio, a treatment for exposing the resin particle is preferably performed in the second step to produce a state of the resin particle being exposed. In the second step, the treatment for exposing the resin particle is preferably performed in the process of performing imidization of the polyimide precursor or after imidization but before the treatment for removing the resin particle.

Figure 2A:
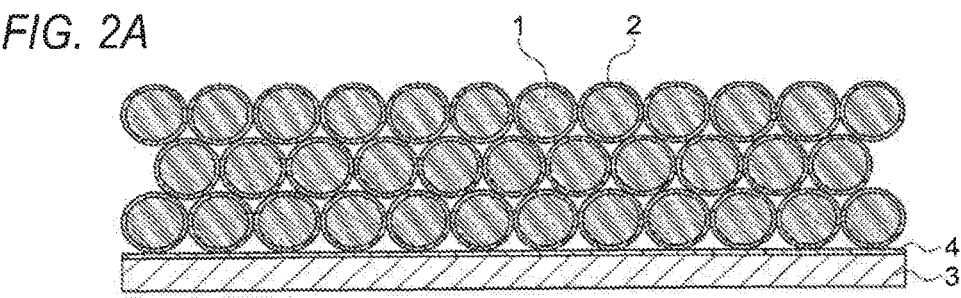
FIG. 2A, FIG. 2B, FIG. 2C, and FIG. 2D are process charts showing another example of the production method of a porous polyimide film in an exemplary embodiment of the present invention.
Figure 2B:
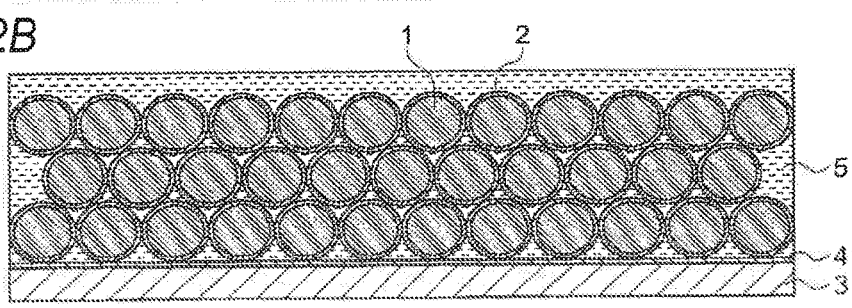

For example, in the first step, the resin particle layer is formed on the base plate (see, FIG. 2A), and the polyimide precursor solution is impregnated between resin particles of the resin particle layer to form a coating film in a state of the resin particle being embedded therein (see, FIG. 2B). Thereafter, a coat containing the polyimide precursor and the resin particle is formed without performing a treatment for exposing the resin particle in the process of drying the coating film to form a coat. The coat formed by this method is a coat in a state of the resin particle layer being embedded therein. Before performing the treatment for removing the resin particle by heating, the coat is subjected to a treatment for exposing the resin particle on the polyimide film in the process of imidizing the polyimide precursor or after the completion of imidization (after imidization).

In the second step, the treatment for exposing the resin particle includes, for example, a treatment applied when the polyimide coat is in the following state.

In the case of performing the treatment for exposing the resin particle when the imidization ratio of the polyimide precursor in the polyimide coat is less than 15% (i.e., a state of the polyimide coat being dissolvable in water), the treatment for exposing the resin particle embedded in the polyimide coat includes a wiping treatment, a water dipping treatment, etc.

In the case of performing the treatment for exposing the resin particle when the imidization ratio of the polyimide precursor in the polyimide coat is 15% or more (i.e., a state of being hardly dissolvable in an organic solvent) or when the imidization is completed to generate a polyimide film, the method includes a method of exposing the resin particle by mechanical cutting with tools such as sandpaper, and a method of exposing the resin particle by decomposition using a laser, etc.

Figure 2C:
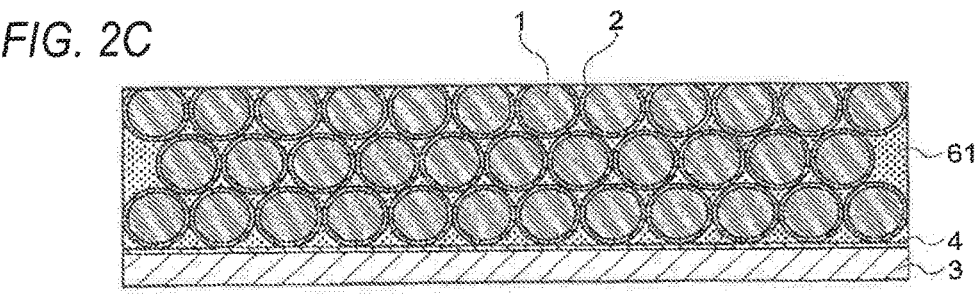

For example, in the case of mechanical cutting, part of the resin particle present in the region at the top of the resin particle layer embedded in the polyimide coat (i.e., the region on the side distant from the base plate of the resin particle layer) is cut together with the polyimide coat present at the top of the resin particle, and the cut resin particle is exposed on the surface of the polyimide coat (see, FIG. 2C).

Figure 2D:
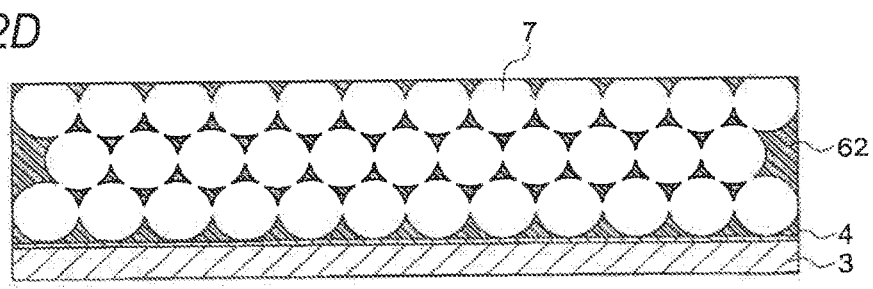

Thereafter, from the polyimide coat on which the resin particle is exposed, the resin particle is removed by the above-described treatment for removing the resin particle. As a result, a porous polyimide film, from which the resin particle is removed, is obtained (see, FIG. 2D).

Figure 3A:
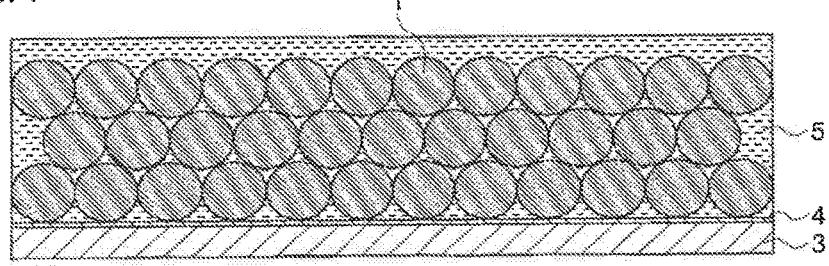
FIG. 3A, FIG. 3B, and FIG. 3C are process charts showing still another example of the production method of a porous polyimide film in an exemplary embodiment of the present invention.
Figure 3B:
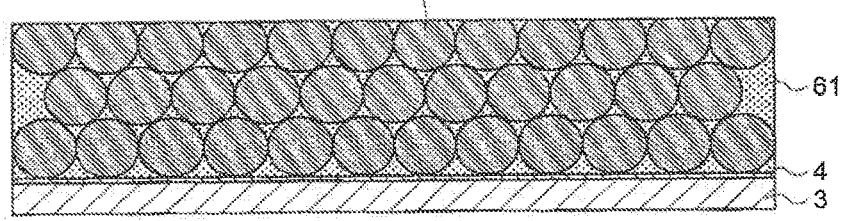

In the case of forming a coat on the base plate by using the resin particle-dispersed polyimide precursor solution, the resin particle-dispersed polyimide precursor solution is applied onto the base plate to form a coating film having embedded therein the resin particle (see, FIG. 3A). When a coat containing the polyimide precursor and the resin particle is formed without performing a treatment for exposing the resin particle in the process of drying the coating film to form a coat, a coat having embedded therein the resin particle is formed. The coat (polyimide coat) in the process of performing imidization by heating the coat is in a state of the resin particle layer being embedded therein. As the treatment for exposing the resin particle, which is performed in the second step so as to increase the pore area ratio, the same treatment as the above-descried treatment for exposing the resin particle can be employed. The resin particle is then cut together with the polyimide coat present at the top of the resin particle to expose the resin particle on the surface of the polyimide coat (see, FIG. 3B).

Figure 3C:
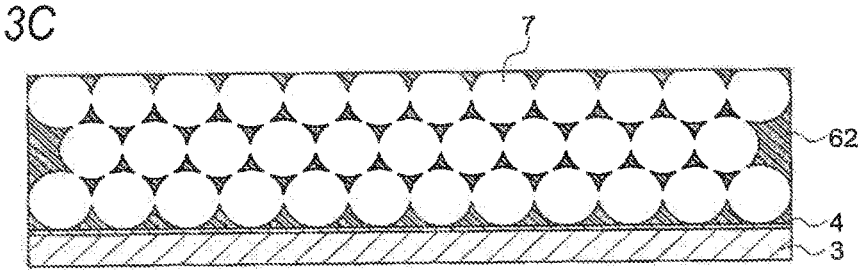

Thereafter, from the polyimide coat on which the resin particle is exposed, the resin particle is removed by the above-described treatment for removing the resin particle. As a result, a porous polyimide film, from which the resin particle is removed, is obtained (see, FIG. 3C).

In the second step, the base plate used in the first step for forming the coat thereon may be separated when the coat becomes a dry coat, may be separated when the polyimide precursor in the polyimide coat becomes hardly dissolvable in an organic solvent, or may be separated when an imidization-completed film is generated.

Through these steps, a porous polyimide film is obtained. The porous polyimide film may be post-processed according to the intended use.

[Polyimide Precursor Solution]

Respective components of the polyimide precursor solution according to an exemplary embodiment of the present invention are described below.

(Polyimide Precursor)

The polyimide precursor is a resin (polyamic acid) containing a repeating unit represented by formula (I):

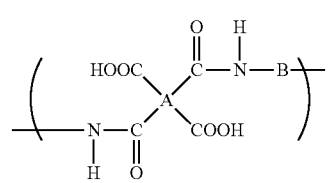

(I)

(wherein A represents a tetravalent organic group, and B represents a divalent organic group).

In formula (I), the tetravalent organic group represented by A is a residue obtained by removing four carboxyl groups from a tetracarboxylic acid dianhydride as a raw material.

The divalent organic group represented by B is a residue obtained by removing two amino groups from a diamine compound as a raw material.

That is, the polyimide precursor containing a repeating unit represented by formula (I) is a polymer of a tetracarboxylic acid dianhydride and a diamine compound.

The tetracarboxylic acid dianhydride include both aromatic and aliphatic compounds but is preferably an aromatic compound. In other words, the tetravalent organic group represented by A in formula (I) is preferably an aromatic organic group.

The aromatic tetracarboxylic acid dianhydride includes, for example, pyromellitic acid dianhydride, 3,3',4,4'-benzophenonetetracarboxylic acid dianhydride, 3,3',4,4'-biphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-biphenylethertetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidene diphthalic acid dianhydride, 3,3',4,4'-biphenyltetracarboxylic acid dianhydride, 2,3,3',4'-biphenyltetracarboxylic acid dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, and bis(triphenylphthalic acid)-4,4'-diphenylmethane dianhydride.

The aliphatic tetracarboxylic acid dianhydride includes, for example, an aliphatic or alicyclic tetracarboxylic acid dianhydride such as butanetetracarboxylic acid dianhydride, 1,2,3,4-cyclobutanetetracarboxylic acid dianhydride, 1,3-dimethyl-1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornane-2-acetic acid dianhydride, 2,3,4,5-tetrahydrofurantetracarboxylic acid dianhydride, 5-(2,5-dioxotetrahydrofuranyl)-3-methyl-3-cyclohexene-1,2-dicarboxylic acid dianhydride and bicyclo[2,2,2]-oct-7-ene-2,3,5,6-tetracarboxylic acid dianhydride; and an aromatic ring-containing aliphatic tetracarboxylic acid dianhydride such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione and 1,3,3a,4,5,9b-hexahydro-8-methyl-5-(tetrahydro-2,5-dioxo-3-furanyl)-naphtho[,2-c]furan-1,3-dione.

Among these tetracarboxylic acid dianhydrides, an aromatic tetracarboxylic acid dianhydride is preferred. Specifically, pyromellitic acid dianhydride, 3,3',4,4'-biphenyltetracarboxylic acid dianhydride, 2,3,3',4'-biphenyltetracarboxylic acid dianhydride, 3,3',4,4'-biphenylethertetracarboxylic acid dianhydride and 3,3',4,4'-benzophenonetetracarboxylic acid dianhydride are preferred, pyromellitic acid dianhydride, 3,3',4,4'-biphenyltetracarboxylic acid dianhydride and 3,3',4,4'-benzophenonetetracarboxylic acid dianhydride are more preferred, and 3,3',4,4'-biphenyltetracarboxylic acid dianhydride is still more preferred.

As the tetracarboxylic acid dianhydride, one tetracarboxylic acid dianhydride may be used alone, or two or more tetracarboxylic acid dianhydrides may be used in combination.

In the case of using two or more tetracarboxylic acid dianhydrides in combination, aromatic tetracarboxylic acid dianhydrides or aliphatic tetracarboxylic acids may be used in combination, or an aromatic tetracarboxylic acid dianhydride and an aliphatic tetracarboxylic acid dianhydride may be combined.

The diamine compound is a diamine compound having two amino groups in its molecular structure. The diamine compound includes both aromatic and aliphatic compounds and is preferably an aromatic compound. That is, in formula (I), the divalent organic group represented by B is preferably an aromatic organic group.

The diamine compound includes, for example, an aromatic diamine such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[(4-(4-aminophenoxy)phenyl)]propane, 2,2-bis[(4-(4-aminophenoxy)phenyl)]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p phenyleneisopropylidene)bisaniline, 4,4'-(m-phenyleneisopropylidene)bisaniline, 2,2'-bis[(4-(4-amino-2-trifluoromethylphenoxy)phenyl)]hexafluoropropane and 4,4'-bis[4-(4-amino-2-trifluoromethyl)phenoxy]-octafluorobiphenyl; an aromatic diamine having two amino groups bonded to an aromatic ring and having a heteroatom other than nitrogen atom of the amino group, such as diaminotetraphenylthiophene; and an aliphatic diamine and an alicyclic diamine, such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2,7}$]-undecylenedimethydiamine and 4,4'-methylenebis(cyclohexylamine).

Among these diamine compounds, an aromatic diamine compound is preferred. Specifically, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide and 4,4'-diaminodiphenylsulfone are preferred, and 4,4'-diaminodiphenyl ether and p-phenylenediamine are more preferred.

As the diamine compound, one compound may be used alone, or two or more compounds may be used in combination. In the case of using two or more compounds in combination, aromatic diamine compounds or aliphatic diamine compounds may be used in combination, or an aromatic diamine compound and an aliphatic diamine compound may be combined.

The number average molecular weight of the polyimide precursor is preferably from 1,000 to 150,000, more preferably from 5,000 to 130,000, still more preferably from 10,000 to 100,000.

When the number average molecular weight of the polyimide precursor is in the range above, reduction in the solubility of the polyimide precursor for a solvent is suppressed, and the film-forming property is likely ensured.

The number average molecular weight of the polyimide precursor is measured by the gel permeation chromatography (GPC) method under the following measurement conditions.

Column: Tosoh TSKgelα-M (7.8 mm, I.D×30 cm)
Eluent: DMF (dimethylformamide)/30 mM LiBr and 60 mM phosphoric acid
Flow velocity: 0.6 mL/min
Injection amount: 60 μL
Detector: RI (differential refractive index detector)

The content (concentration) of the polyimide precursor is suitably from 0.1 mass % to 40 mass %, preferably from 0.5 mass % to 25 mass %, more preferably from 1 mass % to 20 mass %, relative to the entire polyimide precursor solution.

(Organic Amine Compound)

The organic amine compound is a compound forming an amine salt of the polyimide precursor (a carboxyl group thereof) to increase the solubility in an aqueous solvent and at the same time, functioning as an imidization accelerator. Specifically, the organic amine compound is preferably an amine compound having a molecular weight of 170 or less. The organic amine compound is preferably a compound except for the diamine compound working out to a raw material of the polyimide precursor.

The organic amine compound is preferably a water-soluble compound. The "water-soluble" as used herein means that the object substance dissolves in a concentration of 1 mass % or more in water at 25° C.

The organic amine compound includes a primary amine compound, a secondary amine compound, and a tertiary amine compound.

Among these, the organic amine compound is preferably at least one compound selected from a secondary amine compound and a tertiary amine compound (particularly, a tertiary amine compound). When a tertiary amine compound or a secondary amine compound (particularly, a tertiary amine compound) is applied as the organic amine compound, it is likely that the solubility of the polyimide precursor for a solvent is increased, the film-forming property is enhanced and the storage stability of the polyimide precursor is improved.

The organic amine compound also includes a divalent or higher polyvalent amine compound, in addition to a monovalent amine compound. When a divalent or higher polyvalent amine compound is applied, it is likely that a pseudo-crosslinked structure is formed between molecules of the polyimide precursor and the storage stability of the polyimide precursor solution is improved.

The primary amine compound includes, for example, methylamine, ethylamine, n-propylamine, isopropylamine, 2-ethanolamine, and 2-amino-2-methyl-1-propanol.

The secondary amine compound includes, for example, dimethylamine, 2-(methylamino)ethanol, 2-(ethylamino) ethanol, and morpholine.

The tertiary amine compound includes, for example, 2-dimethylaminoethanol, 2-diethylaminoethanol, 2-dimethylaminopropanol, pyridine, triethylamine, picoline, methylmorpholine, ethylmorpholine, 1,2-dimethylimidazole, and 2-ethyl-4-methylimidazole.

As the organic amine compound, in view of film-forming property, an amine compound (particularly, a tertiary amine compound) having a nitrogen-containing heterocyclic structure is also preferred. The amine compound having a nitrogen-containing heterocyclic structure (hereinafter, referred to as "nitrogen-containing heterocyclic amine compound") includes, for example, isoquinolines (an amine compound having an isoquinoline structure), pyridines (an amine compound having a pyridine structure), pyrimidines (an amine compound having a pyrimidine structure), pyrazines (an amine compound having a pyrazine structure), piperazines (an amine compound having a piperazine structure), triazines (an amine compound having a triazine structure), imidazoles (an amine compound having an imidazole structure), morpholines (an amine compound having a morpholine structure), polyaniline, polypyridine, and polyamine.

In view of film-forming property, the nitrogen-containing heterocyclic amine compound is preferably at least one member selected from the group consisting of morpholines, pyridines and imidazoles, more preferably at least one member selected from the group consisting of N-methylmorpholine, pyridine and picoline.

Among these, the organic amine compound is preferably a compound having a boiling temperature of 60° C. or more (preferably from 60° C. to 200° C., more preferably from 70° C. to 150° C.). When the boiling temperature of the organic amine compound is 60° C. or more, it is likely that volatilization of the organic amine compound from the polyimide precursor solution during storage is prevented and reduction in the solubility of the polyimide precursor for a solvent is suppressed.

The organic amine compound is preferably contained in an amount of from 50 mol % to 500 mol %, more preferably from 80 mol % to 250 mol %, still more preferably from 90 mol % to 200 mol %, relative to the carboxyl group (—COOH) of the polyimide precursor in the polyimide precursor solution.

When the content of the organic amine compound is in the range above, it is likely that the solubility of the polyimide precursor for a solvent is increased, the film-forming property is enhanced, and the storage stability of the polyimide precursor solution is improved.

As the above-described organic amine compound, one compound may be used alone, or two or more compounds may be used in combination.

(Aqueous Solvent)

The aqueous solvent is an aqueous solvent containing water. Specifically, the aqueous solvent is suitably a solvent containing 50 mass % or more of water relative to the entire aqueous solvent. Water includes, for example, distilled water, ion-exchanged water, ultrafiltered water, and pure water.

The content of water is preferably from 50 mass % to 100 mass %, more preferably from 70 mass % to 100 mass %, still more preferably from 80 mass % to 100 mass %, relative to the entire aqueous solvent.

In the case where the aqueous solvent contains a solvent other than water, the solvent other than water includes, for example, a water-soluble organic solvent and an aprotic polar solvent. In view of transparency, mechanical strength, etc. of the polyimide molded body, the solvent other than water is preferably a water-soluble organic solvent. Above all, from the standpoint of improving various properties of the polyimide molded body, such as heat resistance, electrical property and solvent resistance, in addition to transparency and mechanical strength, it is preferred that the aqueous solvent does not contain an aprotic polar solvent or even if an aprotic polar solvent is contained, the amount thereof is small (for example, 40 mass % or less, preferably 30 mass % or less, relative to the entire aqueous solvent). The "water-soluble" as used herein means that the object substance dissolves in a concentration of 1 mass % or more in water at 25° C.

One of the above-described water-soluble organic solvents may be used alone, or two or more thereof may be used in combination.

The water-soluble ether-based solvent is a water-soluble solvent having an ether bond per molecule. The water-soluble ether-based solvent includes, for example, tetrahydrofuran (THF), dioxane, trioxane, 1,2-dimethoxyethane, diethylene glycol dimethyl ether, and diethylene glycol diethyl ether. Among these water-soluble ether-based solvents, tetrahydrofuran and dioxane are preferred.

The water-soluble ketone-based solvent is a water-soluble solvent having a ketone group per molecule. The water-soluble ketone-based solvent includes, for example, acetone, methyl ethyl ketone, and cyclohexanone. Among these water-soluble ketone solvents, acetone is preferred.

The water-soluble alcohol-based solvent is a water-soluble solvent having an alcoholic hydroxyl group per molecule. The water-soluble alcohol-based solvent includes, for example, methanol, ethanol, l-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these water-soluble alcohol solvents, methanol, ethanol, 2-propanol, ethylene glycol, ethylene glycol monoalkyl ether, propylene glycol, propylene glycol monoalkyl ether, diethylene glycol, and diethylene glycol monoalkyl ether are preferred.

In the case of containing, as the aqueous solvent, an aprotic polar solvent other than water, the aprotic polar solvent used in combination is a solvent having a boiling temperature of from 150° C. to 300° C. and a dipole moment of from 3.0 D to 5.0 D. The aprotic polar solvent specifically includes, for example, N-methyl-2-pyrrolidone (NMP), N,N-dimethylformamide (DMF), N,N-dimethylacetamide (DMAc), dimethylsulfoxide (DMSO), hexamethylenephosphoramide (HMPA), N-methylcaprolactam, N-acetyl-2-pyrrolidone, N,N-dimethylimidazolidinone (DMI), N,N'-dimethylpropyleneurea, tetramethylurea, trimethyl phosphate, and triethyl phosphate.

In the case of containing, as the aqueous solvent, a solvent other than water, the solvent used in combination suitably has a boiling temperature of 270° C. or less, preferably from 60° C. to 250° C., more preferably from 80° C. to 230° C. When the boiling temperature of the solvent used in combination is in the range above, the solvent other than water is less likely to remain in the polyimide molded body, and a polyimide molded body having high mechanical strength is easily obtained.

Here, dissolution of the polyimide precursor in the solvent is controlled by the content of water and the kind and amount of the organic amine compound. With a low content of water, the polyimide precursor is likely dissolved in the region where the content of the organic amine compound is small. Conversely, with a high content of water, the polyimide precursor is likely dissolved in the region where the content of the organic amine compound is large. In addition, when the hydrophilicity is high, for example, when the organic amine compound contains a hydroxyl group, the polyimide precursor is likely dissolved in the region where the content of water is high.

Furthermore, a polyimide precursor synthesized with an organic solvent such as aprotic polar solvent (e.g., N-methylpyrrolidone (NMP)), then added to a poor solvent such as water and alcohol, and thereby precipitated and separated, may be used as the polyimide precursor.

(Other Additives)

In the production method of a porous polyimide film according to the first exemplary embodiment of the present invention, the polyimide precursor solution may contain, for example, a catalyst for accelerating the imidization reaction, and a leveling material for improving the film-forming quality.

As the catalyst for accelerating the imidization reaction, a dehydrating agent such as acid anhydride, an acid catalyst such as phenol derivative, sulfonic acid derivative and benzoic acid derivative, and the like may be used.

The polyimide precursor solution may contain, according to the intended use of the porous polyimide film, for example, an electrically conductive material (conductive (for example, a volume resistivity of less than $10^7$ Ω·cm) or semi-conductive (for example, a volume resistivity of from $10^7$ Ω·cm to $10^{13}$ Ω·cm)) added to impart electrical conductivity.

The electrically conductive agent includes, for example, carbon black (e.g., acidic carbon black with pH of 5.0 or less); a metal (e.g., aluminum, nickel); a metal oxide (e.g., yttrium oxide, tin oxide); and an ionic electrically conductive substance (e.g., potassium titanate, LiCl). One of these electrically conductive materials may be used alone, or two or more thereof may be used in combination.

The polyimide precursor solution may contain, according to the intended use of the porous polyimide film, an inorganic particle added to enhance the mechanical strength. The inorganic particle includes a particulate material such as silica powder, alumina powder, barium sulfate powder, titanium oxide powder, mica and talc.

In addition, the polyimide precursor solution may contain $LiCoO_2$, $LiMn_2O$, etc. used as an electrode of a lithium ion battery.

(Production Method of Polyimide Precursor Solution)

The production method of the polyimide precursor solution according to the first exemplary embodiment of the present invention is not particularly limited but includes, for example, the following production method.

The production method includes, for example, a method of obtaining the polyimide precursor solution by polymerizing a tetracarboxylic acid dianhydride and a diamine compound in an aqueous solvent in the presence of an organic amine compound to produce a resin (polyimide precursor).

This method is advantageous in that use of an aqueous solvent affords high productivity and since the polyimide precursor solution is produced in a single stage, the process is simplified.

Other examples include a method where a tetracarboxylic acid dianhydride and a diamine compound are polymerized in an organic solvent such as aprotic polar solvent (e.g., N-methylpyrrolidone (NMP)) to produce a resin (polyimide precursor), the resin is charged into an aqueous solvent such as water and alcohol to precipitate the resin (polyimide precursor) and thereafter, the polyimide precursor and an organic amine compound are dissolved in an aqueous solvent to obtain the polyimide precursor solution.

<Porous Polyimide Film>

The porous polyimide film in the first exemplary embodiment of the present invention is described below.

In the porous polyimide film obtained by the production method of a porous polyimide film according to the first exemplary embodiment of the present invention, generation of cracks is suppressed.

(Characteristics of Porous Polyimide Film)

Although not particularly limited to this range, the porous polyimide film of the present invention suitably has a porosity of 30% or more. The porosity is preferably 40% or more, more preferably 50% or more. The upper limit of the porosity is not particularly limited but is suitably 90% or less.

The shape of the vacancy is preferably spherical or close to spherical. In addition, the vacancy is preferably in a configuration where vacancies are connected and continue with each other (see, FIG. 1D, FIG. 2D, and FIG. 3C). The vacancy diameter in the portion where vacancies are connected with each other is suitably, for example, from $\frac{1}{100}$ to $\frac{1}{2}$, preferably from $\frac{1}{50}$ to $\frac{1}{3}$, more preferably from $\frac{1}{20}$ to $\frac{1}{4}$, of the maximum diameter of the vacancy. Specifically, the average value of the vacancy diameter in the portion where vacancies are connected with each other is suitably from 5 nm to 1,500 nm.

The average value of the vacancy diameter is not particularly limited but is preferably from 0.01 μm to 2.5 μm, more preferably from 0.05 μm to 2.0 μm, still more preferably from 0.1 μm to 1.5 μm, yet still more preferably from 0.15 μm to 1.0 μm.

In the porous polyimide film in the first exemplary embodiment of the present invention, the ratio of maximum diameter and minimum diameter of the vacancy (ratio of maximum value and minimum value of the vacancy diameter) is from 1 to 2, preferably from 1 to 1.9, more preferably from 1 to 1.8. Of this range, a value closer to 1 is still more preferred. Within this range, the variation in vacancy diameter is reduced. In addition, when the porous polyimide film in the first exemplary embodiment of the present invention is applied, for example, to a battery separator of a lithium ion battery, occurrence of turbulence in the ion flow is inhibited and therefore, the formation of lithium dendrite is likely suppressed. The "ratio of maximum diameter and minimum diameter of the vacancy" is a ratio represented by a value obtained by dividing the maximum diameter by the minimum diameter of the vacancy (i.e., maximum value/minimum value of vacancy diameter).

The maximum value, minimum value and average value of the vacancy diameter, the average value of the vacancy diameter in the portion where vacancies are connected with each other, and the long diameter and short diameter of the vacancy are values observed and measured by a scanning electron microscope (SEM). Specifically, first, a sample for measurement is prepared by cutting out from the porous polyimide film. Observation and measurement of the sample for measurement are performed using an image processing software standardly equipped in VE SEM manufactured by Keyence Corporation. The observation and measurement are performed on 100 vacancies for each vacancy portion in the cross-section of the sample for measurement, and the average value, minimum diameter, maximum diameter and arithmetic mean diameter are determined for each portion. In the case where the shape of the vacancy is not circular, the longest part is taken as the diameter.

The thickness of the porous polyimide film is not particularly limited but is suitably from 15 μm to 500 μm.
(Use of Porous Polyimide Film)

The use to which the porous polyimide film according to the first exemplary embodiment of the present invention is applied includes, for example, a battery separator of a lithium battery, etc.; a separator for an electrolytic capacitor, an electrolyte membrane of a fuel cell, etc.; a battery electrode material; a gas or liquid separation membrane; and a low dielectric material.

In the case where the porous polyimide film according to the first exemplary embodiment of the present invention is applied, for example, to a battery separator, it is thought that the action such as suppressing the variation in ion stream distribution of the lithium ion inhibits the production of lithium dendrite. This is considered to be attributable to the fact that the variation in vacancy shape and vacancy diameter of the porous polyimide film in an exemplary embodiment of the present invention is reduced.

In addition, for example, when the porous polyimide film is applied to a battery electrode material, the capacity of the battery is thought to increase due to an increase in the opportunity of contacting with an electrolytic solution. This is presumed to occur because the material for electrode, such as carbon black, incorporated into the porous polyimide film is increased in the amount exposed on the vacancy surface or film surface.

Furthermore, the porous polyimide film can also be applied as an electrolyte membrane, for example, by filling the vacancy with an ionic gel, etc. formed from a so-called ionic liquid by gelling. Since the process is simplified by the production method in an exemplary embodiment of the present invention, a lower-cost electrolyte membrane is expected to be obtained.

Next, a second exemplary embodiment of the present invention is described below.
<Porous Polyimide Film>

The porous polyimide film according to the second exemplary embodiment of the present invention contains a polyimide resin and an uncrosslinked resin except for a polyimide resin, and the vacancy shape is spherical.

Thanks to the configuration above, in the porous polyimide film according to the second exemplary embodiment of the present invention, cracking of the porous polyimide is suppressed. The reason therefor is not clearly known but is presumed as follows.

A porous polyimide film is sometimes readily subject to volume contraction by heat. Since the polyimide film is a rigid resin, in the case of forming a vacancy in a porous polyimide film composed of only a polyimide resin by using, for example, as a template, an inorganic particle or an uncrosslinked resin particle, a residual stress due to volume contraction may be likely produced, giving rise to generation of cracks.

On the other hand, the porous polyimide film in the second exemplary embodiment of the present invention contains a polyimide resin and an uncrosslinked resin except for a polyimide resin. By virtue of containing an uncrosslinked resin except for a polyimide resin in addition to a polyimide resin, the uncrosslinked resin except for a polyimide resin is thought to facilitate relaxation of the residual stress due to volume contraction and suppress the generation of cracks. Furthermore, the vacancy is spherical and this is thought to more facilitate relaxation of the residual stress due to volume contraction and more suppress the generation of cracks.

For these reasons, the porous polyimide film according to the second exemplary embodiment of the present invention is believed to ensure that generation of cracks in the porous polyimide film is suppressed.

The porous polyimide film having the above-described configuration is preferably a porous polyimide film obtained by the production method of a porous polyimide film, including a first step of forming a coating film containing a polyimide precursor solution in which a polyimide precursor is dissolved in an aqueous solvent, and an uncrosslinked resin particle incapable of dissolving in the polyimide precursor solution, followed by drying of the coating film to form a coat containing the polyimide precursor and the uncrosslinked resin particle, and a second step of heating the coat to imidize the polyimide precursor and form a polyimide film, the second step including a treatment for removing the uncrosslinked resin particle with an organic solvent capable of dissolving the uncrosslinked resin particle.

It is presumed that thanks to this production method, an uncrosslinked resin except for a polyimide resin can be incorporated into the porous polyimide and generation of cracks is suppressed.

The polyimide film is obtained, for example, by applying a polyimide precursor solution dissolved in an organic solvent (e.g., N-methylpyrrolidone (hereinafter, sometimes referred to as "NMP")) or a polyimide precursor solution dissolved in a high-polarity solvent such as N,N-dimethylacetamide (hereinafter, sometimes referred to as "DMAc"), and then heating and shaping the coating.

Conventionally, a porous polyimide film is obtained using a polyimide precursor solution dissolved in an organic solvent. The method for obtaining a porous polyimide film includes, for example, a method of obtaining a porous polyimide film having formed therein a three-dimensionally ordered array structure (3DOM structure) of vacancies by using a silica particle layer as a mold, and a method of producing a coat by use of a varnish formed of a polyimide precursor solution having dispersed therein silica particles, firing the coat, and then removing the silica particles to obtain a porous polyimide film. In the porous polyimide film obtained by these methods, cracking readily occurs. The reason therefor is considered because the silica particle hardly absorbs volume contraction in the imidization step and in turn, a distortion (residual stress) is likely generated in the film.

Furthermore, a method where a film is shaped using a solution obtained by dissolving a water-soluble resin such as polyethylene glycol in a polyimide precursor solution, then contacted with a poor solvent such as water to precipitate a polyamic acid, thereby promoting creation of pores, and thereafter, subjected to imidization, is also known. In this method, precipitation in a porous manner of a polyamic acid resulting from displacement of the solvent such as NMP dissolving the polyamic acid by a poor solvent such as water is utilized, and the shape and size of the vacancy can be hardly controlled.

On the other hand, the porous polyimide film in the second exemplary embodiment of the present invention contains an uncrosslinked resin except for a polyimide resin. The uncrosslinked resin particle is removed with an organic solvent in the imidization step of the polyimide precursor in the process of producing the porous polyimide film and therefore, it is considered that control of the shape and size of the vacancy is facilitated and the uncrosslinked resin component dissolved in the organic solvent readily transfers into the polyimide resin. Thus, an imidization-completed porous polyimide film is obtained in the state of containing an uncrosslinked resin except for a polyimide resin, and this is presumed to more facilitate relaxation of the residual stress.

In the porous polyimide film obtained by the above-described production method in the second exemplary embodiment of the present invention, the variation in vacancy shape, vacancy diameter, etc. is likely suppressed. The reason therefor is presumed because an uncrosslinked resin particle is used in the production process and this effectively contributes to the relaxation of a residual stress in the imidization step of the polyimide precursor.

Furthermore, in the porous polyimide film obtained by the above-described production method in the second exemplary embodiment of the present invention, the polyimide precursor is dissolved in an aqueous solvent and therefore, the boiling temperature of the polyimide precursor solution is about 100° C. The solvent rapidly volatilizes as the coat containing the polyimide precursor and the uncrosslinked resin particle is heated, and thereafter, an imidization reaction proceeds. Before deformation of the uncrosslinked resin particle in the coat occurs due to heat, the uncrosslinked resin particle loses fluidity and becomes insoluble in an organic solvent or water. For this reason, the shape of vacancy is considered to be likely maintained, making it easy to suppress the variation in vacancy shape, vacancy diameter, etc.

Incidentally, in the case of using a silica particle, a chemical such as hydrofluoric acid needs to be used in the treatment for removing the silica particle. In addition, in the case of producing a silica particle layer mold, since a silica particle layer is formed, the productivity is low and the cost is high. Furthermore, in the case of using a silica particle, it is thought that since a chemical such as hydrofluoric acid is used, an ion is likely to remain as an impurity.

On the other hand, the porous polyimide film obtained by the above-described production method in the second exemplary embodiment of the present invention does not use a silica particle and therefore, the process of obtaining the porous polyimide film is simplified. In addition, since a hydrofluoric acid is not used for the removal of the uncrosslinked resin particle, an ion is prevented from remaining as an impurity.

The porous polyimide film according to the second exemplary embodiment of the present invention is described below together with the production method thereof.

The polyimide resin contained in the porous polyimide film according to the second exemplary embodiment of the present invention is obtained specifically by polymerizing a tetracarboxylic acid dianhydride and a diamine compound to produce a polyimide precursor, obtaining a solution of the polyimide precursor, and subjecting it to an imidization reaction. More specifically, the polyimide resin is obtained by an imidization reaction using a polyimide precursor solution in which the polyimide precursor is dissolved in an aqueous solvent. The method for obtaining the polyimide precursor solution includes, for example, a method of obtaining a polyimide precursor solution by polymerizing a tetracarboxylic acid dianhydride and a diamine compound in an aqueous solvent in the presence of an organic amine compound to produce a resin (polyimide precursor), but the method is not limited this example. The polyimide precursor solution is described later.

In the case of a porous polyimide film obtained by the above-described production method, the uncrosslinked resin except for a polyimide resin, contained in the porous polyimide film according to the second exemplary embodiment of the present invention, is a remaining resin component of the uncrosslinked resin. The uncrosslinked resin except for a polyimide resin may be contained while maintaining the shape of the uncrosslinked resin particle or may not have the shape of the uncrosslinked resin particle. That is, the porous polyimide film obtained by the above-described production method according to an exemplary embodiment of the present invention may be sufficient if it contains the component of the uncrosslinked resin except for a polyimide resin. The shape of the vacancy of the porous polyimide film obtained by the above-described production method is spherical. The uncrosslinked resin particle is described later.

The "incapable of dissolving in" as used in the second exemplary embodiment of the present invention means that the object substance substantially maintains the form of an uncrosslinked resin particle in the object liquid at 25° C., and encompasses a case where the object substance dissolves in an amount of 3 mass % or less.

(Production Method of Porous Polyimide Film)

First, the method for producing the porous polyimide film according to the second exemplary embodiment of the present invention is described.

In the drawings referred to in the description of the production method, the same numerical reference is used for the same component part. As to the numerical reference in each drawing, 11 indicates an uncrosslinked resin particle, 2 indicates a binder resin, 3 indicates a base plate, 4 indicates a release layer, 5 indicates a polyimide precursor solution, 7 indicates a vacancy, 61 indicates a coat (polyimide coat) in the process of performing imidization of the polyimide precursor, and 62 indicates a porous polyimide film.

The method for producing the porous polyimide film according to the second exemplary embodiment of the present invention is not particularly limited but includes, for example, a production method having the following first step and second step.

The first step is a step of forming a coating film containing a polyimide precursor solution in which a polyimide precursor is dissolved in an aqueous solvent, and an uncrosslinked resin particle incapable of dissolving in the polyimide precursor solution, followed by drying of the coating film to form a coat containing the polyimide precursor and the uncrosslinked resin particle.

The second step is a step of heating the coat to imidize the polyimide precursor and form a polyimide film, the second step including a treatment for removing the uncrosslinked resin particle with an organic solvent capable of dissolving the uncrosslinked resin particle.

Figure 4A:
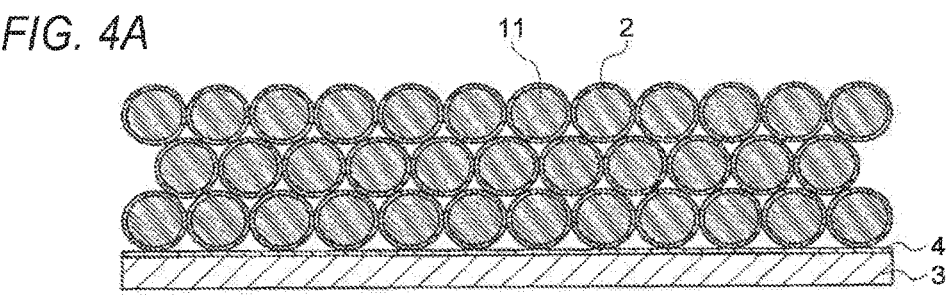
FIG. 4A, FIG. 4B, FIG. 4C, and FIG. 4D are process charts showing an example of the production method of a porous polyimide film in an exemplary embodiment of the present invention.

In the following, the production method depicted in FIG. 4A, FIG. 4B, and FIG. 4C (one example of the production method according to the second exemplary embodiment of the present invention) is described, but the production method is not limited thereto.

(First Step)

In the first step, a polyimide precursor solution where a polyimide precursor is dissolved in an aqueous solvent, is prepared. The polyimide precursor solution having dissolved therein a polyimide precursor is preferably, for example, a polyimide precursor solution having dissolved therein a polyimide precursor and an organic amine compound. In the following, a case using a polyimide precursor solution having dissolved therein a polyimide precursor and an organic amine compound is described as an example. Thereafter, a coating film containing the polyimide precursor solution and an uncrosslinked resin particle incapable of dissolving in the polyimide precursor solution is formed on a base plate. The coating film formed on the base plate is then dried to form a coat containing the polyimide precursor and the uncrosslinked resin particle. In the following description, the uncrosslinked resin particle is an uncrosslinked resin particle composed of an uncrosslinked resin except for a polyimide resin.

In the first step, the method for forming, on a base plate, a coating film containing the polyimide precursor solution and an uncrosslinked resin particle incapable of dissolving in the polyimide precursor solution includes specifically the following method.

First, an uncrosslinked resin particle dispersion liquid containing an uncrosslinked resin particle incapable of dissolving in the polyimide precursor solution, an organic solvent incapable of dissolving the uncrosslinked resin particle, and a binder resin capable of dissolving in the organic solvent is prepared. Next, the uncrosslinked resin particle dispersion liquid is applied onto a base plate and dried to form an uncrosslinked resin particle layer. In the uncrosslinked resin particle layer formed on the base plate, for example, adjacent uncrosslinked resin particles are present without dissolving each other, adjacent uncrosslinked resin particles are at the same time bonded to each other with a binder resin, and a void is formed between uncrosslinked resin particles of the uncrosslinked resin particle layer (see, FIG. 4A).

Meanwhile, a polyimide precursor solution where a polyimide precursor and an organic amine compound are dissolved in an aqueous solvent, is previously prepared.

The previously prepared polyimide precursor solution is impregnated between uncrosslinked resin particles of the uncrosslinked resin particle layer formed on the base plate. By impregnating the polyimide precursor solution between uncrosslinked resin particles of the uncrosslinked resin particle layer, the void formed between uncrosslinked resin particles of the uncrosslinked resin particle layer is filled with the polyimide precursor solution. In order to promote filling, it is also preferable to remove a gas component in the void by reducing the pressure in the state of the polyimide precursor solution being put into contact with the uncrosslinked resin particle. Thereafter, the coating film is dried, whereby a coat containing the polyimide precursor and the uncrosslinked resin particle is formed on the base plate (see, FIG. 4B).

The base plate on which the coat containing the polyimide precursor and the uncrosslinked resin particle is formed, is not particularly limited and includes, for example, a base plate made of a resin such as polystyrene and polyethylene terephthalate; a glass-made base plate; a ceramic-made base plate; a metal base plate such as iron and stainless steel (SUS); and a composite material base plate formed by combining these materials. If desired, the base plate may be subjected to a release treatment with a silicone-based or fluorine-based release agent, etc. to provide a release layer.

The method for producing the uncrosslinked resin particle dispersion liquid is not particularly limited and includes, for example, a method where each of the uncrosslinked resin particle incapable of dissolving in the polyimide precursor solution, the organic solvent incapable of dissolving the uncrosslinked resin particle, and the binder resin capable of dissolving in the organic solvent is weighed and these are mixed and stirred to obtain the uncrosslinked resin particle dispersion liquid. As for the uncrosslinked resin particle, a dispersion liquid where uncrosslinked resin particles are previously dispersed may be produced, or a commercial product where uncrosslinked resin particles are previously dispersed may be prepared. In the case of producing a dispersion liquid where uncrosslinked resin particles are previously dispersed, the dispersibility of the uncrosslinked resin particle may be increased, for example, by using at least either one of an ionic surfactant and a nonionic surfactant.

The binder resin may be previously dissolved in the above-described organic solvent or may be mixed with the uncrosslinked resin particle and the organic solvent and dissolved.

The ratio (mass ratio) between the uncrosslinked resin particle and the binder resin in the uncrosslinked resin particle dispersion liquid is suitably uncrosslinked resin particle:binder resin=from 100:0.5 to 100:50, preferably from 100:1 to 100:30, more preferably from 100:2 to 100:20. Within this range, in the uncrosslinked resin particle layer formed from the uncrosslinked resin particle dispersion liquid, a state where the surface of each uncrosslinked resin particle is partially or entirely covered with the binder resin and adjacent uncrosslinked resin particles are bonded to each other (including a primarily adhering state; a so-called pseudo-adhesion state), is likely formed, and a void producing an air layer state is readily formed between uncrosslinked resin particles of the uncrosslinked resin particle layer.

The uncrosslinked resin particle is not particularly limited as long as it does not dissolve in the polyimide precursor solution, and includes, for example, an uncrosslinked resin particle obtained by polycondensation of a polymerizable monomer, such as polyester resin and urethane resin, and an uncrosslinked resin particle obtained by radical polymerization of a polymerizable monomer, such as vinyl resin and olefin resin. The uncrosslinked resin particle obtained by radical polymerization includes, for example, uncrosslinked resin particles of (meth)acrylic resin, (meth)acrylic acid ester resin, styrene.(meth)acrylic resin, polystyrene resin and polyethylene resin.

In view of removal of the uncrosslinked resin particle performed in the later-described second step, the uncrosslinked resin particle is preferably an uncrosslinked resin particle soluble in an organic solvent and is preferably an uncrosslinked resin particle soluble in a solvent incapable of dissolving the polyimide resin. That is, the uncrosslinked resin particle except for a polyimide, contained in the porous polyimide film, is preferably an uncrosslinked resin particle soluble in tetrahydrofuran, toluene, ethyl acetate, acetone, etc.

Among these, the uncrosslinked resin particle is preferably at least one member selected from the group consisting of (meth)acrylic resin, (meth)acrylic acid ester resin, styrene.(meth)acrylic resin, and polystyrene resin.

The term "(meth)acrylic" as used in the second exemplary embodiment of the present invention means that both "acrylic" and "methacrylic" are encompassed.

In the case where the uncrosslinked resin particle is, for example, a vinyl resin particle, the synthesis method thereof is not particularly limited, and a known polymerization method (a radical polymerization method such as emulsion polymerization, soap-free emulsion polymerization, suspension polymerization, miniemulsion polymerization and microemulsion polymerization) may be applied.

For example, in the case of applying an emulsion polymerization method to the production of the vinyl resin particle, a monomer such as styrenes and (meth)acrylic acids is added to water having dissolved therein a water-soluble polymerization initiator such as potassium persulfate and ammonium persulfate, a surfactant such as sodium dodecylsulfate and diphenyl oxide disulfonates is further added, if desired, and the mixture is heated under stirring to perform polymerization, whereby the vinyl resin particle is obtained.

As for the monomer, the vinyl resin includes, for example, a vinyl resin unit obtained by polymerization of a monomer, e.g., styrene structure-containing styrenes such as styrene, an alkyl-substituted styrene (for example, α-methylstyrene, 2-methylstyrene, 3-methylstyrene, 4-methylstyrene, 2-ethylstyrene, 3-ethylstyrene and 4-ethylstyrene), a halogen-substituted styrene (for example, 2-chlorostyrene, 3-chlorostyrene and 4-chlorostyrene) and divinylnaphthalene; vinyl group-containing esters such as methyl (meth)acrylate, ethyl (meth)acrylate, n-propyl (meth)acrylate, n-butyl (meth)acrylate, lauryl (meth)acrylate and 2-ethylhexyl (meth)acrylate; vinyl nitriles such as acrylonitrile and methacrylonitrile; vinyl ethers such as vinyl methyl ether and vinyl isobutyl ether; vinyl ketones such as vinyl methyl ketone, vinyl ethyl ketone and vinyl isopropenyl ketone; acids such as (meth)acrylic acid, maleic acid, cinnamic acid, fumaric acid and vinylsulfonic acid; and bases such as ethyleneimine, vinylpyridine and vinylamine.

As another monomer, a monofunctional monomer such as vinyl acetate, a bifunctional monomer such as ethylene glycol dimethacrylate, nonane diacrylate and decanediol diacrylate, or a polyfunctional monomer such as trimethylolpropane triacrylate and trimethylolpropane trimethacrylate, may be used in combination.

The vinyl resin may be an uncrosslinked resin using such a monomer alone or an uncrosslinked resin that is a copolymer using two or more of these monomers.

In the case where the monomer used for the uncrosslinked resin constituting the vinyl resin particle contains styrene, the ratio of styrene to all monomer components is preferably from 20 mass % to 100 mass %, more preferably from 40 mass % to 100 mass %.

The average particle diameter of the uncrosslinked resin particle is not particularly limited but is suitably, for example, 2.5 µm or less, preferably 2.0 µm or less, more preferably 1.0 µm or less. The lower limit is not particularly limited but is suitably 0.001 µm or more, preferably 0.005 µm or more, more preferably 0.01 µm or more.

As for the average particle diameter of the resin particle, a cumulative distribution for the volume is drawn from the small diameter side with respect to divided particle size ranges (channels) by using a particle size distribution obtained by measurement by means of a laser diffraction particle size distribution measuring apparatus (for example, LA-700, manufactured by Horiba, Ltd.), and the particle diameter at an accumulation of 50% relative to all particles is measured as the volume average particle diameter D50v.

The uncrosslinked resin particle includes, for example, a polymethyl methacrylate (MB-Series, produced by Sekisui Plastics Co., Ltd.), and a (meth)acrylic acid ester.styrene copolymer (FS-Series, produced by Nippon Paint Co., Ltd.).

The binder resin is not particularly limited as long as it dissolves in the organic solvent and does not dissolve in the polyimide precursor solution. The binder resin includes, for example, an acetal resin such as polyvinylbutyral resin; a polyamide resin such as nylon; a polyester resin such as polyethylene terephthalate and polyethylene naphthalate; a polyolefin resin such as polyethylene and polypropylene; an acrylic resin; a vinyl resin such as polyvinyl chloride resin and polyvinylidene chloride resin; a polyurethane resin; polyvinylpyrrolidone, polyethylene glycol, and polyvinyl alcohol. A polyvinylacetal resin and an aliphatic polyamide resin are preferred.

The organic solvent incapable of dissolving the uncrosslinked resin particle includes, for example, alcohols such as methanol, ethanol and ethylene glycol; cellosolves such as ethylene glycol monomethyl ether, hydrocarbons such as hexane; ketones such as acetone; aromatics such as toluene; esters such as ethyl acetate; and nitriles such as acetonitrile.

Among these, from the standpoint of maintaining the shape of the uncrosslinked resin particle, alcohols and cellosolves are preferred, and the binder resin is preferably a resin soluble in alcohols and cellosolves (for example, acetal resin and polyamide resin).

The method for applying the uncrosslinked resin particle dispersion liquid onto a base plate is not particularly limited and includes various methods, for example, a spray coating method, a spin coating method, a roll coating method, a bar coating method, a slit die coating method, and an inkjet coating method.

The coating film formed by applying the uncrosslinked resin particle dispersion liquid onto the base plate is dried to obtain the uncrosslinked resin particle layer. The drying temperature may be a temperature capable of maintaining the shape of the uncrosslinked resin particle and bonding uncrosslinked resin particles to each other (for example, 100° C.).

Subsequently, a coating film containing the polyimide precursor solution and the uncrosslinked resin particle is formed by impregnating the previously prepared polyimide precursor solution between uncrosslinked resin particles of the uncrosslinked resin particle layer formed above, and the coating film is then dried to form a coat containing the polyimide precursor and the uncrosslinked resin particle.

The method for impregnating the polyimide precursor solution is not particularly limited and includes, for example, a method where the base plate having formed thereon the uncrosslinked resin particle layer is dipped in the polyimide precursor solution, and a method where the polyimide precursor solution is applied onto the uncrosslinked resin particle layer formed on the base plate and impregnated between particles of the uncrosslinked resin particle layer.

The method for applying the polyimide precursor solution onto the uncrosslinked resin particle layer formed on the base plate includes various methods, for example, a spray coating method, a spin coating method, a roll coating method, a bar coating method, a slit die coating method, and an inkjet coating method. From the standpoint of impregnating the polyimide precursor solution between uncrosslinked resin particles forming the uncrosslinked resin particle layer, a vacuum impregnation filling method of applying the polyimide precursor solution onto the uncrosslinked resin particle layer and then reducing the pressure, thereby filling between uncrosslinked resin particles with the polyimide precursor solution, is preferably employed, because the polyimide precursor solution is efficiently impregnated into a void between uncrosslinked resin particles.

The method for forming a coating film containing the polyimide precursor solution and the uncrosslinked resin particle is not limited to the methods above.

For example, the method specifically includes the following method. First, a polyimide precursor solution where a polyimide precursor and an organic amine compound are dissolved in an aqueous solvent, is prepared. Next, the polyimide precursor solution and an uncrosslinked resin particle incapable of dissolving in the polyimide precursor solution are mixed to obtain a polyimide precursor solution having dispersed therein uncrosslinked resin particles (hereinafter, sometimes referred to as "uncrosslinked resin particle-dispersed polyimide precursor solution"). This uncrosslinked resin particle-dispersed polyimide precursor solution is applied onto the base plate to form a coating film containing the polyimide precursor solution and the uncrosslinked resin particle. Uncrosslinked resin particles in the coating film are distributed in the state of aggregation being suppressed (see, FIG. 6A). Thereafter, the coating film is dried, whereby a coat containing the polyimide precursor and the uncrosslinked resin particle is formed on the base plate.

The method for producing the uncrosslinked resin particle-dispersed polyimide precursor solution is not particularly limited and includes, for example, a method of mixing the polyimide precursor solution and the uncrosslinked resin particle in a dry state, and a method of mixing the polyimide precursor solution with a dispersion liquid where uncrosslinked resin particles are previously dispersed in an aqueous solvent. As the dispersion liquid where uncrosslinked resin particles are previously dispersed in an aqueous solvent, an uncrosslinked resin particle dispersion liquid where uncrosslinked resin particles are previously dispersed in an aqueous solvent may be produced, or a commercially available dispersion liquid where uncrosslinked resin particles are previously dispersed in an aqueous solvent may be prepared. In the case of producing a dispersion liquid where uncrosslinked resin particles are previously dispersed, the dispersibility of the uncrosslinked resin particle may be increased, for example, by using at least either one of an ionic surfactant and a nonionic surfactant.

In the polyimide precursor solution having dispersed therein uncrosslinked resin particles, the ratio of the uncrosslinked resin particle is suitably, in terms of mass ratio assuming that the solid content of the polyimide precursor solution is 100, solid content of polyimide precursor solution:uncrosslinked resin particle=from 100:20 to 100:200, preferably from 100:25 to 100:180, more preferably from 100:30 to 100:150.

The method for applying the uncrosslinked resin particle-dispersed polyimide precursor solution onto the base plate is not particularly limited and includes various methods, for example, a spray coating method, a spin coating method, a roll coating method, a bar coating method, a slit die coating method, and an inkjet coating method.

The amount of the polyimide precursor solution coated for obtaining the coating film containing the polyimide precursor solution obtained above and the uncrosslinked resin particle is suitably an amount allowing the uncrosslinked resin particle to be exposed on the coating film surface, because the pore area ratio of the porous polyimide film can be increased. For example, in the case of impregnating the polyimide precursor solution between uncrosslinked resin particles forming the uncrosslinked resin particle layer, the polyimide precursor solution is suitably impregnated with a thickness less than the thickness of the uncrosslinked resin particle layer.

In the case of forming the uncrosslinked resin particle-dispersed polyimide precursor solution on the base plate, the solution is suitably formed after adding the uncrosslinked resin particle in an amount allowing the uncrosslinked resin particle to be exposed on the coating film surface.

After the coating film containing the polyimide precursor solution obtained by the method above and the uncrosslinked resin particle is formed, the coating film is dried to form a coat containing the polyimide precursor and the uncrosslinked resin particle. Specifically, the coating film containing the polyimide precursor solution and the uncrosslinked resin particle is dried, for example, by heat drying, natural drying, vacuum drying or other methods to form a coat. More specifically, the coat is formed by drying the coating film such that the solvent remaining in the coat accounts for 50% or less, preferably 30% or less, relative to the solid content of the coat. This coat is in a state of the polyimide precursor being dissolvable in water.

At the time of formation of the coating film, the coating film may be formed with an amount enough to embed the uncrosslinked resin particle in the coating film. In this case, in the first step, a treatment for exposing the uncrosslinked resin particle may be performed in the process of drying the obtained coating film to form the coat, so as to provide a state of the uncrosslinked resin particle being exposed. The pore area ratio of the porous polyimide film is increased by performing the treatment for exposing the uncrosslinked resin particle.

The treatment for exposing the uncrosslinked resin particle specifically includes the following method.

Figure 4B:
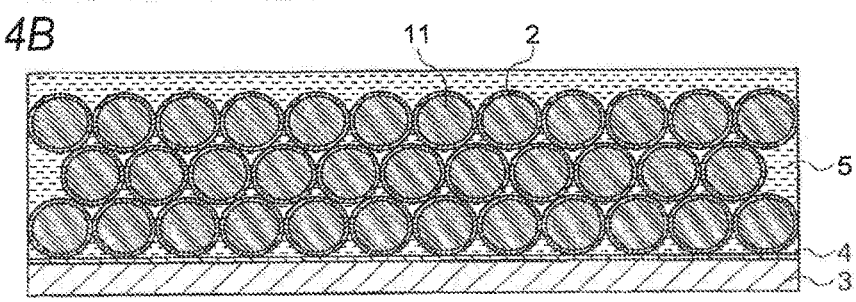
Figure 4C:
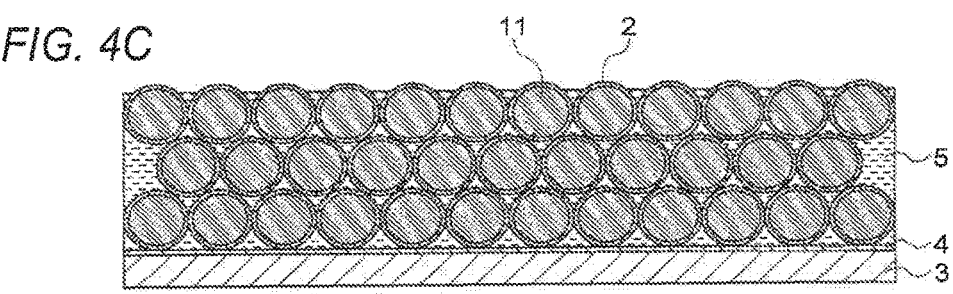

When the coating film is formed to embed the uncrosslinked resin particle layer by impregnating the polyimide precursor solution between uncrosslinked resin particles forming the uncrosslinked resin particle layer, the polyimide precursor solution is present in the region exceeding the thickness of the uncrosslinked resin particle layer (see, FIG. 4B).

In the process of drying the coating film to form the coat containing the polyimide precursor and the uncrosslinked resin particle after obtaining the coating film containing the polyimide precursor solution and the uncrosslinked resin particle, the coat is in a state of the polyimide precursor being dissolvable in water. The coat in this state is treated, for example, by wiping or dipping in water, whereby the uncrosslinked resin particle can be exposed. Specifically, the polyimide precursor solution present in the region exceeding the thickness of the uncrosslinked resin particle layer is subjected to, for example, a treatment for exposing the uncrosslinked resin particle layer by wet wiping, whereby the polyimide precursor solution present in the region exceeding the thickness of the uncrosslinked resin particle layer is removed. As a result, the uncrosslinked resin particle present in the region at the top of the uncrosslinked resin particle layer (that is, the region on the side distant from the base plate of the uncrosslinked resin particle layer) is exposed on the coat surface (see, FIG. 4C).

In this connection, in the case of forming the coat on the base plate by using the uncrosslinked resin particle-dispersed polyimide precursor solution, when a coat having embedded therein the uncrosslinked resin particle is formed, the same treatment as the above-described treatment for exposing the uncrosslinked resin particle can also be employed as the treatment for exposing the uncrosslinked resin particle embedded in the coat.

(Second Step)

The second step is a step of heating the coat containing the polyimide precursor and the uncrosslinked resin particle, obtained in the first step, to imidize the polyimide precursor and form a polyimide film. The second step includes a treatment for removing the uncrosslinked resin particle. A porous polyimide film is obtained through the treatment for removing the uncrosslinked resin particle.

In the second step, the step of forming a polyimide film is specifically performed by heating the coat containing the polyimide precursor and the uncrosslinked resin particle, obtained in the first step, thereby allowing imidization to proceed, and further heating the coat to form a polyimide film. As the imidization proceeds and the imidization ratio rises, the coat becomes hardly dissolvable in an organic solvent.

Thereafter, in the second step, a treatment for removing the uncrosslinked resin particle is performed. As for the removal, the uncrosslinked resin particle may be removed in the process of imidizing the polyimide precursor by heating the coat or may be removed from a polyimide film after the completion of imidization (after imidization).

In the second exemplary embodiment of the present invention, the process of imidizing the polyimide precursor indicates a process of heating the coat containing the polyimide precursor and the uncrosslinked resin particle, obtained in the first step, thereby allowing imidization to proceed and producing a state prior to becoming a polyimide film after the completion of imidization.

Specifically, the uncrosslinked resin particle is removed from the coat in the process of heating the coating film obtained in the first step, on which the uncrosslinked resin particle is exposed, and thereby imidizing the polyimide precursor (hereinafter, the coat in this state is sometimes referred to as "polyimide coat"). Alternatively, the uncrosslinked resin particle may be removed from the polyimide film after the completion of imidization. As a result, a porous polyimide film, from which the uncrosslinked resin particle is removed, is obtained (see, FIG. 4D).

In the process of removing the uncrosslinked resin particle, the uncrosslinked resin component of the uncrosslinked resin particle is incorporated, as an uncrosslinked resin except for a polyimide resin, into the porous polyimide film. Although not shown, the porous polyimide film contains an uncrosslinked resin except for a polyimide resin.

In view of removability, etc. of the uncrosslinked resin particle, the treatment for removing the uncrosslinked resin particle is preferably performed when the imidization ratio of the polyimide precursor in the polyimide coat is 30% or more, in the process of imidizing the polyimide precursor. When the imidization ratio becomes 30% or more, the coat becomes hardly dissolvable in an organic solvent.

The treatment for removing the uncrosslinked resin particle is not particularly limited as long as the porous polyimide film obtained contains an uncrosslinked resin. The treatment includes, for example, a method of removing the uncrosslinked resin particle by heating, a method of removing the uncrosslinked resin particle with an organic solvent capable of dissolving the uncrosslinked resin particle, and a method of removing the uncrosslinked resin particle by decomposition using a laser, etc. Among these, from the standpoint of suppressing generation of cracks in the porous polyimide film, a method of removing the uncrosslinked resin particle with an organic solvent capable of dissolving the uncrosslinked resin particle is preferred.

For example, in the method of removing the uncrosslinked resin particle by heating, depending on the kind of the uncrosslinked resin particle, a decomposition gas may be generated by heating, and rupture, cracking, etc. may occur in the porous polyimide film due to the decomposition gas. Therefore, in view of suppressing generation of cracks, a method of removing the uncrosslinked resin particle with an organic solvent capable of dissolving the uncrosslinked resin particle is preferably employed. Incidentally, it is also effective to further perform heating after the removal with an organic solvent capable of dissolving the uncrosslinked resin particle and thereby raise the removal ratio.

In the case where the uncrosslinked resin particle is removed by the method of removing the uncrosslinked resin particle with an organic solvent capable of dissolving the uncrosslinked resin particle, the uncrosslinked resin component of the uncrosslinked resin particle dissolved in the organic solvent may infiltrate the polyimide film in the process of removing the uncrosslinked resin particle. Therefore, by employing this method, an uncrosslinked resin except for a polyimide resin can be aggressively incorporated into the porous polyimide film obtained. From the standpoint of incorporating an uncrosslinked resin except for a polyimide resin, it is preferable to employ the method of removing the uncrosslinked resin particle with an organic solvent capable of dissolving the uncrosslinked resin particle. Furthermore, from the standpoint of incorporating an uncrosslinked resin except for a polyimide resin, removal of the uncrosslinked resin particle by the method above is preferably applied to the coat (polyimide coat) in the process of imidizing the polyimide precursor. When the uncrosslinked resin particle is dissolved with a solvent capable of dissolving the uncrosslinked resin particle in the state of a polyimide coat, infiltration into the polyimide film may be more facilitated.

The method of removing the uncrosslinked resin particle with an organic solvent capable of dissolving the uncrosslinked resin particle includes, for example, a method of bringing the coat into contact with an organic solvent capable of dissolving the uncrosslinked resin particle (for example, dipping in the solvent), and thereby dissolving and removing the uncrosslinked resin particle. Dipping in this state in the solvent is preferred in that the dissolution efficiency for the uncrosslinked resin particle is increased.

The organic solvent capable of dissolving the uncrosslinked resin particle for removing the uncrosslinked resin particle is not particularly limited as long as it is an organic solvent incapable of dissolving the polyimide coat and the imidization-completed polyimide film and capable of dissolving the uncrosslinked resin particle. The organic solvent includes, for example, ethers such as tetrahydrofuran; aromatics such as toluene; ketones such as acetone; and esters such as ethyl acetate.

Among these, ethers such as tetrahydrofuran are preferred, and it is more preferable to use tetrahydrofuran. In the case where the aqueous solvent remains at the time of dissolving the uncrosslinked resin particle, the aqueous solvent may dissolve in the solvent capable of dissolving the uncrosslinked resin particle and precipitation of the polyimide precursor may occur to produce a state similar to that in a so-called wet phase transition method, making it difficult to control the vacancy diameter. On this account, the uncrosslinked resin particle is preferably dissolved and removed with an organic solvent after reducing the amount of the remaining aqueous solvent to 20 mass % or less, preferably 10 mass % or less, relative to the mass of the polyimide precursor.

In the second step, the heating method when heating the coat obtained in the first step to allow the progression of imidization and thereby obtain a polyimide film is not particularly limited and includes, for example, a method of heating the coat in two stages. In the case of two-stage heating, the heating conditions specifically include the following heating conditions.

As for the heating conditions in the first stage, the temperature is preferably a temperature capable of maintaining the shape of the uncrosslinked resin particle. Specifically, the temperature is suitably, for example, from 50° C. to 150° C., preferably from 60° C. to 140° C. The heating time is suitably from 10 minutes to 60 minutes. As the heating temperature is higher, the heating time may be shorter.

As for the heating conditions in the second stage, heating is performed, for example, under the conditions of from 150° C. to 400° C. (preferably from 200° C. to 390° C.) and from 20 minutes to 120 minutes. Under the heating conditions in these ranges, the imidization reaction further proceeds and a polyimide film can be formed. At the time of heating reaction, heating is suitably performed by step-by-step raising the temperature or gradually raising the temperature at a constant rate, before reaching the final temperature of heating.

The heating conditions are not limited to the above-described two-stage heating method and, for example, a method of heating the coat in a single stage may be employed. In the case of the single-stage heating method, for example, the imidization may be completed only under the heating conditions of the second stage above.

In the case where a treatment for exposing the uncrosslinked resin particle is not applied in the first step, from the standpoint of increasing the pore area ratio, a treatment for exposing the uncrosslinked resin particle is preferably performed in the second step to produce a state of the uncrosslinked resin particle being exposed. In the second step, the treatment for exposing the uncrosslinked resin particle is preferably performed in the process of performing imidization of the polyimide precursor or after imidization but before the treatment for removing the uncrosslinked resin particle.

Figure 5A:
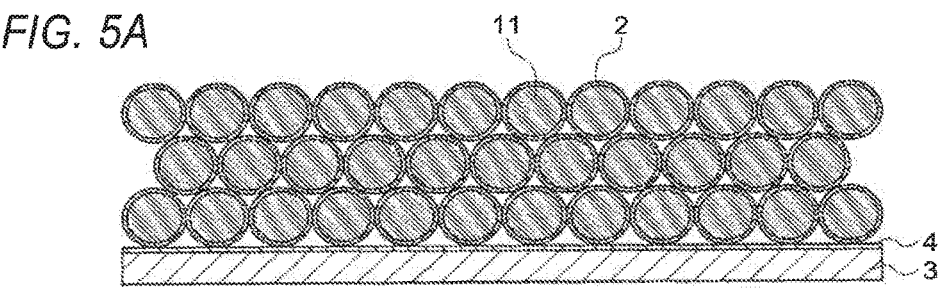
FIG. 5A, FIG. 5B, FIG. 5C, and FIG. 5D are process charts showing another example of the production method of a porous polyimide film in an exemplary embodiment of the present invention.
Figure 5B:
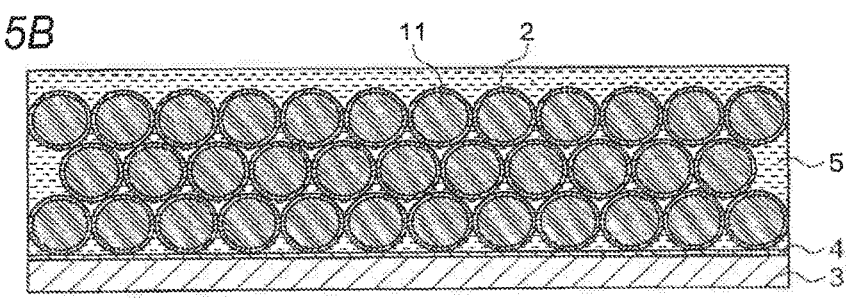

For example, in the first step, the uncrosslinked resin particle layer is formed on the base plate (see, FIG. 5A), and the polyimide precursor solution is impregnated between uncrosslinked resin particles of the uncrosslinked resin particle layer to form a coating film in a state of the uncrosslinked resin particle being embedded therein (see, FIG. 5B). Thereafter, a coat containing the polyimide precursor and the uncrosslinked resin particle is formed without performing a treatment for exposing the uncrosslinked resin particle in the process of drying the coating film to form a coat. The coat formed by this method is a coat in a state of the uncrosslinked resin particle layer being embedded therein. Before performing the treatment for removing the uncrosslinked resin particle by heating, the coat is subjected to a treatment for exposing the uncrosslinked resin particle on the polyimide film in the process of imidizing the polyimide precursor or after the completion of imidization (after imidization).

In the second step, the treatment for exposing the uncrosslinked resin particle includes, for example, a treatment applied when the polyimide coat is in the following state.

In the case of performing the treatment for exposing the uncrosslinked resin particle when the imidization ratio of the polyimide precursor in the polyimide coat is less than 15% (i.e., a state of the polyimide coat being dissolvable in water), the treatment for exposing the uncrosslinked resin particle embedded in the polyimide coat includes a wiping treatment, a water dipping treatment, etc.

In the case of performing the treatment for exposing the uncrosslinked resin particle when the imidization ratio of the polyimide precursor in the polyimide coat is 15% or more (i.e., a state of being hardly dissolvable in an organic solvent) or when the imidization is completed to generate a polyimide film, the method includes a method of exposing the uncrosslinked resin particle by mechanical cutting with tools such as sandpaper, and a method of exposing the uncrosslinked resin particle by decomposition using a laser, etc.

Figure 5C:
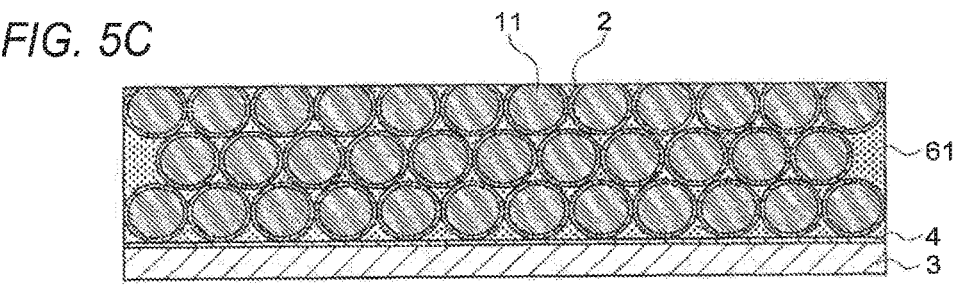

For example, in the case of mechanical cutting, part of the uncrosslinked resin particle present in the region at the top of the uncrosslinked resin particle layer embedded in the polyimide coat (i.e., the region on the side distant from the base plate of the uncrosslinked resin particle layer) is cut together with the polyimide coat present at the top of the uncrosslinked resin particle, and the cut uncrosslinked resin particle is exposed on the surface of the polyimide coat (see, FIG. 5C).

Thereafter, from the polyimide coat on which the uncrosslinked resin particle is exposed, the uncrosslinked resin particle is removed by the above-described treatment for removing the uncrosslinked resin particle. As a result, a porous polyimide film, from which the uncrosslinked resin particle is removed, is obtained (see, FIG. 5D).

Figure 6A:
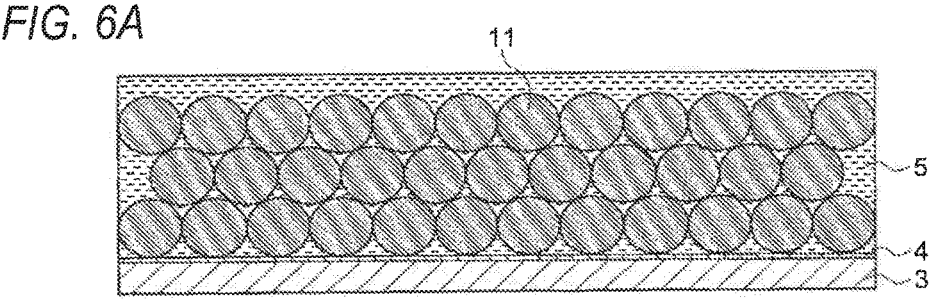
FIG. 6A, FIG. 6B, and FIG. 6C are process charts showing still another example of the production method of a porous polyimide film in an exemplary embodiment of the present invention.
Figure 6B:
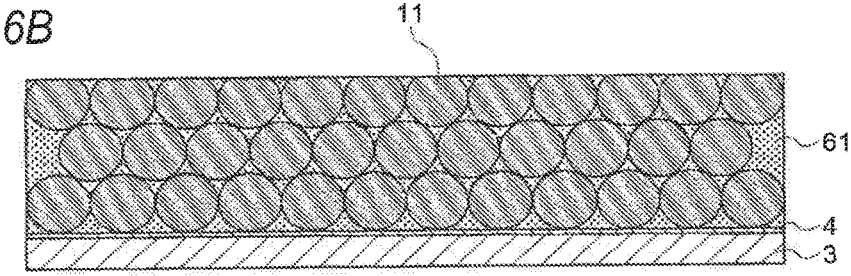

In the case of forming a coat on the base plate by using the uncrosslinked resin particle-dispersed polyimide precursor solution, the uncrosslinked resin particle-dispersed polyimide precursor solution is applied onto the base plate to form a coating film having embedded therein the uncrosslinked resin particle (see, FIG. 6A). When a coat containing the polyimide precursor and the uncrosslinked resin particle is formed without performing a treatment for exposing the uncrosslinked resin particle in the process of drying the coating film to form a coat, a coat having embedded therein the uncrosslinked resin particle is formed. The coat (polyimide coat) in the process of performing imidization by heating the coat is in a state of the uncrosslinked resin particle layer being embedded therein. As the treatment for exposing the uncrosslinked resin particle, which is performed in the second step so as to increase the pore area ratio, the same treatment as the above-descried treatment for exposing the uncrosslinked resin particle can be employed. The uncrosslinked resin particle is then cut together with the polyimide coat present at the top of the uncrosslinked resin particle to expose the uncrosslinked resin particle on the surface of the polyimide coat (see, FIG. 6B).

Thereafter, from the polyimide coat on which the uncrosslinked resin particle is exposed, the uncrosslinked resin particle is removed by the above-described treatment for removing the uncrosslinked resin particle. As a result, a porous polyimide film, from which the uncrosslinked resin particle is removed, is obtained (see, FIG. 6C).

In the second step, the base plate used in the first step for forming the coat thereon may be separated when the coat becomes a dry coat, may be separated when the polyimide precursor in the polyimide coat becomes hardly dissolvable in an organic solvent, or may be separated when an imidization-completed film is generated.

Through these steps, a porous polyimide film containing a polyimide resin and an uncrosslinked resin except for a polyimide resin is obtained. The porous polyimide film may be post-processed according to the intended use.

[Polyimide Precursor Solution]

The polyimide precursor solution is not particularly limited as long as a porous polyimide film containing an uncrosslinked resin except for a polyimide resin is obtained. From the standpoint of suppressing generation of cracks, the polyimide precursor solution is preferably a polyimide precursor solution where a polyimide precursor is dissolved in an aqueous solvent.

Respective components of the polyimide precursor solution for obtaining the porous polyimide film according to the second exemplary embodiment of the present invention are described below. Here, the components are described by referring, as an example, to a polyimide precursor solution having dissolved therein a polyimide precursor and an organic amine compound.

(Polyimide Precursor)

The polyimide precursor is same as the polyimide precursor described in the first exemplary embodiment as above.

Examples and content and the like of the polyimide precursor are same as examples and content and the like of the polyimide precursor described in the first exemplary embodiment.

(Organic Amine Compound)

The organic amine compound is same as the organic amine compound described in the first exemplary embodiment as above.

Examples and content and the like of the organic amine compound are same as examples and content and the like of the organic amine compound described in the first exemplary embodiment.

(Aqueous Solvent)

The aqueous solvent is same as the aqueous solvent described in the first exemplary embodiment as above.

Examples and content and the like of the aqueous solvent are same as examples and content and the like of the aqueous solvent described in the first exemplary embodiment.

(Other Additives)

The other additives are same as the other additives described in the first exemplary embodiment as above.

(Production Method of Polyimide Precursor Solution)

The production method of the polyimide precursor solution according to the second exemplary embodiment of the present invention is not particularly limited but includes, for example, the following production method.

The production method includes, for example, a method of obtaining the polyimide precursor solution by polymerizing a tetracarboxylic acid dianhydride and a diamine compound in an aqueous solvent in the presence of an organic amine compound to produce a resin (polyimide precursor).

This method is advantageous in that use of an aqueous solvent affords high productivity and since the polyimide precursor solution is produced in a single stage, the process is simplified.

Other examples include a method where a tetracarboxylic acid dianhydride and a diamine compound are polymerized in an organic solvent such as aprotic polar solvent (e.g., N-methylpyrrolidone (NMP)) to produce a resin (polyimide precursor), the resin is charged into an aqueous solvent such as water and alcohol to precipitate the resin (polyimide precursor) and thereafter, the polyimide precursor and an organic amine compound are dissolved in an aqueous solvent to obtain the polyimide precursor solution.

Although a polyimide precursor solution where a polyimide precursor and an organic amine compound are dissolved in an aqueous solvent is described as an example, but the polyamide precursor solution is not limited thereto and includes, for example, a polyimide precursor solution where an organic amine compound is not dissolved. Specifically, the production method thereof includes, for example, a method of obtaining a polyimide precursor solution by polymerizing a tetracarboxylic acid dianhydride and a diamine compound in an aqueous mixed solvent selected from a water-soluble ether-based compound, a water-soluble ketone-based solvent, a water-soluble alcohol-based solvent and water (for example, a mixed solution of a water-soluble ether-based solvent and water, a mixed solvent of a water-soluble ketone-based solvent and water, and a combination with a water-soluble alcohol-based solvent), to produce a resin (polyimide precursor).

The porous polyimide film according to the second exemplary embodiment of the present invention is described below.

(Content of Uncrosslinked Resin Except for Polyimide Resin)

The state of presence of the uncrosslinked resin except for a polyimide resin, contained in the porous polyimide film in the second exemplary embodiment of the present invention, is not particularly limited. For example, the uncrosslinked resin may be present at least either in the inside the porous polyimide film or on the surface of the porous polyimide film (including the surface of vacancy of the porous polyimide film).

From the standpoint of suppressing generation of cracks, the content of the uncrosslinked resin except for a polyimide resin is preferably from 0.1 mass % to 5 mass %, more preferably from 0.2 mass % to 4.8 mass %, still more preferably from 0.3 mass % to 4.6 mass %. By containing the uncrosslinked resin except for a polyimide resin in this range, the smoothness of the porous polyimide film may be enhanced.

The amount of the uncrosslinked resin except for a polyimide resin, contained in the porous polyimide film, can be measured, for example, by pyrolysis-gas chromatography-mass analysis (GC-MS). The proportion of the uncrosslinked resin except for a polyimide resin can be calculated from the peak assigned to the uncrosslinked resin except for a polyimide resin and the area thereof. In addition, the resin being an uncrosslinked resin means that a polyfunctional component other than the polyimide resin is not detected in the obtained chromatogram. The uncrosslinked resin component can also be analyzed by liquid chromatography (HPLC), nuclear magnetic resonance (NMR), etc. after hydrolyzing the polyimide resin.

(Characteristics of Porous Polyimide Film)

The porous polyimide film in the second exemplary embodiment of the present invention has a spherical vacancy shape. The "spherical" vacancy shape as used in an exemplary embodiment of the present invention encompasses both spherical and substantially spherical (a shape close to spherical). Specifically, this means that a vacancy in which the ratio of long diameter and short diameter (long diameter/short diameter) is from 1 to 1.5 exists in a proportion of 90% or more. As the proportion of existence of this vacancy is larger, the proportion of the spherical vacancy increases. The proportion of a vacancy where the ratio of long diameter and short diameter (long diameter/short diameter) is from 1 to 1.5 is preferably from 93% to 100%, more preferably from 95% to 100%. As the ratio of long diameter and short diameter approaches 1, the shape becomes close to true spherical.

In addition, when the porous polyimide film in the second exemplary embodiment of the present invention is applied, for example, to a battery separator of a lithium ion battery, occurrence of turbulence in the ion flow is inhibited and therefore, the formation of lithium dendrite is likely suppressed.

Although not particularly limited to this range, the porous polyimide film in the second exemplary embodiment of the present invention suitably has a porosity of 30% or more. The porosity is preferably 40% or more, more preferably 50% or more. The upper limit of the porosity is not particularly limited but is suitably 90% or less.

Figure 4D:
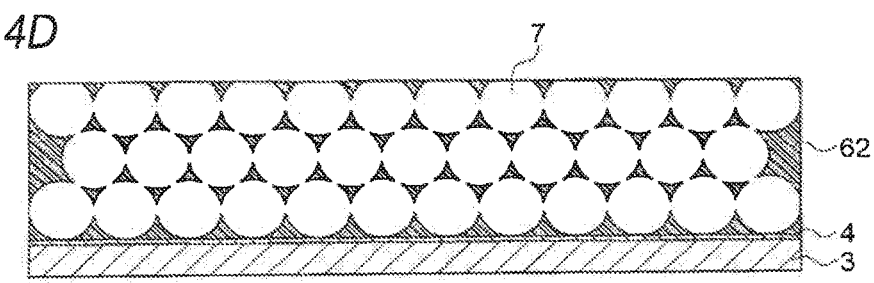
Figure 5D:
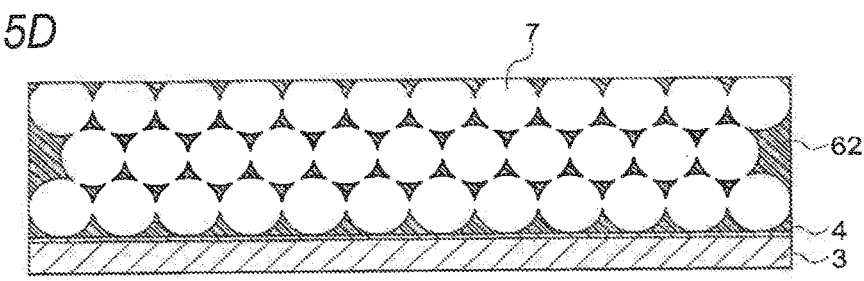
Figure 6C:
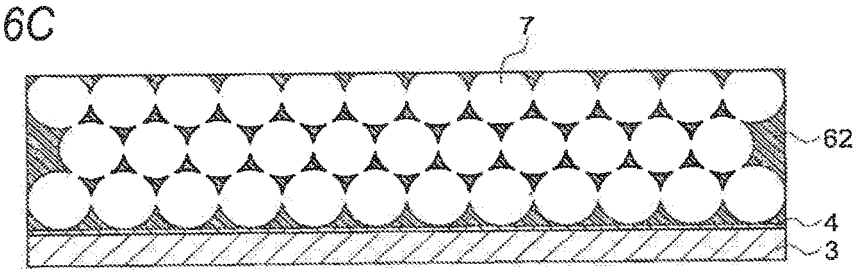

The vacancy is preferably in a configuration where vacancies are connected and continue with each other (see, FIG. 4D, FIG. 5D, and FIG. 6C). The vacancy diameter in the portion where vacancies are connected with each other is suitably, for example, from $1/100$ to $1/2$, preferably from $1/50$ to $1/3$, more preferably from $1/20$ to $1/4$, of the maximum diameter of the vacancy. Specifically, the average value of the vacancy diameter in the portion where vacancies are connected with each other is suitably from 5 nm to 1,500 nm.

The average value of the vacancy diameter is not particularly limited but is preferably from 0.01 µm to 2.5 µm, more preferably from 0.05 µm to 2.0 µm, still more preferably from 0.1 µm to 1.5 µm, yet still more preferably from 0.15 µm to 1.0 µm.

In the porous polyimide film in the second exemplary embodiment of the present invention, the ratio of maximum diameter and minimum diameter of the vacancy (ratio of maximum value and minimum value of the vacancy diameter) is from 1 to 2, preferably from 1 to 1.9, more preferably from 1 to 1.8. Of this range, a value closer to 1 is still more preferred. Within this range, the variation in vacancy diameter is reduced. In addition, when the porous polyimide film in the second exemplary embodiment of the present invention is applied, for example, to a battery separator of a lithium ion battery, occurrence of turbulence in the ion flow is inhibited and therefore, the formation of lithium dendrite is likely suppressed.

The "ratio of maximum diameter and minimum diameter of the vacancy" is a ratio represented by a value obtained by dividing the maximum diameter by the minimum diameter of the vacancy (i.e., maximum value/minimum value of vacancy diameter).

The maximum value, minimum value and average value of the vacancy diameter, the average value of the vacancy diameter in the portion where vacancies are connected with each other, and the long diameter and short diameter of the vacancy are values observed and measured by a scanning electron microscope (SEM). Specifically, first, a sample for measurement is prepared by cutting out from the porous polyimide film. Observation and measurement of the sample for measurement are performed using an image processing software standardly equipped in VE SEM manufactured by Keyence Corporation. The observation and measurement are performed on 100 vacancies for each vacancy portion in the cross-section of the sample for measurement, and the average value, minimum diameter, maximum diameter and arithmetic mean diameter are determined for each portion. In the case where the shape of the vacancy is not circular, the longest part is taken as the diameter. In addition, with respect to each vacancy portion above, observation and measurement of long diameter and short diameter are performed using an image processing software standardly equipped in VE SEM manufactured by Keyence Corporation, and the ratio of long diameter/short diameter is computed.

The thickness of the porous polyimide film is not particularly limited but is suitably from 15 µm to 500 µm.

(Use of Porous Polyimide Film)

The use to which the porous polyimide film according to the second exemplary embodiment of the present invention is applied is same as the use to which the porous polyimide film according to the first exemplary embodiment of the present invention is applied.

Next, a third exemplary embodiment of the present invention is described below.

<Resin Particle-Dispersed Polyimide Precursor Solution and Production Method Thereof>

The method for producing a resin particle-dispersed polyimide precursor solution according to the third exemplary embodiment of the present invention is a method of polymerizing a tetracarboxylic acid dianhydride and a diamine compound in a resin particle dispersion liquid dispersed in an aqueous solvent, in the presence of an organic amine compound to form a polyimide precursor.

Here, the "incapable of dissolving in" as used in the third exemplary embodiment of the present invention encompasses a case where the object substance dissolves in an amount of 3 mass % or less in the object liquid at 25° C.

In the method for producing a resin particle-dispersed polyimide precursor solution according to the third exemplary embodiment of the present invention, thanks to the configuration above, the dispersibility of resin particles is enhanced, compared with a case where the resin particle-dispersed polyimide precursor solution is formed by mixing a resin particle dispersion liquid and a polyimide precursor solution. The reason therefor is not clearly known but is presumed as follows.

The polyimide film is obtained, for example, by applying a polyimide precursor solution dissolved in an organic solvent (e.g., N-methylpyrrolidone (hereinafter, sometimes referred to as "NMP")) or a polyimide precursor solution dissolved in a high-polarity solvent such as N,N-dimethylacetamide (hereinafter, sometimes referred to as "DMAc"), and then heating and shaping the coating.

In the polyimide film, a particle such as inorganic particle or resin particle is sometimes incorporated according to the purpose. In this case, a polyimide precursor solution having mixed therein particles is used. For example, in the case of producing a particle-dispersed polyimide precursor solution by mixing an inorganic particle with a polyimide precursor solution dissolved in a high-polarity organic solvent, the inorganic particle shows a low dispersibility in the polyimide precursor solution.

On the other hand, in the case of mixing a resin particle with a polyimide precursor solution dissolved in a high-polarity organic solvent, when the resin particle is a general resin particle (for example, a polystyrene resin particle), the resin particle is sometimes dissolved with the high-polarity organic solvent, and the dispersibility of the resin particle in the polyimide precursor solution is low. In addition, for example, when a resin particle hardly dissolvable in a high-polarity organic solvent is produced by emulsion polymerization, etc., displacement by a high-polarity organic solvent is sometimes performed so as to mix the resin particle with a polyimide precursor solution dissolved in a high-porality organic solvent. In this case, the resin particle is sometimes taken out from the resin particle dispersion liquid for performing high-polarity organic solvent displacement, and the resin particles taken out may undergo aggregation, resulting in low dispersibility.

In contrast, in the production method of a resin particle-dispersed polyimide precursor solution according to the third exemplary embodiment of the present invention, the dispersibility of resin particles is enhanced thanks to the above-described configuration. This is considered to be achieved because the polyimide precursor is formed in a resin particle dispersion liquid having previously dispersed therein resin particles, in the presence of an organic amine compound, i.e., the polyimide precursor is formed in the state of resin particles being dispersed. Furthermore, since an organic amine compound is present in the aqueous solvent, the polyimide precursor (a carboxyl group thereof) formed is in the state of being converted to an amine salt by the organic amine compound. As a result, part of the organic amine salt of the polyimide precursor is considered to function as a dispersant for the resin particle, leading to enhanced dispersibility of the resin particle.

For these reasons, in the production method of a resin particle-dispersed polyimide precursor solution according to the third exemplary embodiment of the present invention, thanks to the above-described configuration, the dispersibility of the resin particle is presumed to be enhanced, compared with a case where the resin particle-dispersed polyimide precursor solution is formed by mixing a resin particle dispersion liquid and a polyimide precursor solution.

In addition, in the production method of a resin particle-dispersed polyimide precursor solution according to the third exemplary embodiment of the present invention, the polyimide precursor is formed in a resin particle dispersion liquid having previously dispersed therein resin particles. On this account, the resin particle-dispersed polyimide precursor solution in an exemplary embodiment of the present invention is obtained in a single system (for example, in a single vessel) throughout the process from the production of a resin particle dispersion liquid to the production of a resin particle-dispersed polyimide precursor solution and therefore, the process of producing a resin particle-dispersed polyimide precursor solution is simplified.

Incidentally, in the resin particle-dispersed polyimide precursor solution obtained by the production method of a resin particle-dispersed polyimide precursor solution according to the third exemplary embodiment of the present invention, the dispersibility of the resin particle is enhanced. Therefore, in the resin particle-containing polyimide film obtained from this polyimide precursor solution, the variation in resin particle distribution is likely suppressed.

The porous polyimide film in the third exemplary embodiment of the present invention is obtained by a production method including a first step of forming a coating film by using the resin particle-dispersed polyimide precursor solution according to an exemplary embodiment of the present invention, followed by drying of the coating film to form a coat, and a second step of heating the coat to cause imidization, the second step including a treatment for removing the resin particle. In the porous polyimide film obtained by this production method, the variation in vacancy distribution is likely suppressed. In addition, the variation in vacancy shape, vacancy diameter, etc. is likely suppressed. The reason therefor is presumed as follows.

The resin particle-dispersed polyimide precursor solution in the third exemplary embodiment of the present invention is enhanced in dispersibility and therefore, in the porous polyimide film after removing the resin particle, the variation in vacancy distribution is considered to be likely suppressed.

In addition, the variation in vacancy shape, vacancy diameter, etc. is considered to be likely suppressed thanks to use of a resin particle. This is thought to occur because the resin particle effectively contributes to the relaxation of residual stress in the imidization step of the polyimide precursor.

Furthermore, the polyimide precursor is dissolved in an aqueous solvent and therefore, the boiling temperature of the polyimide precursor solution is about 100° C. The solvent rapidly volatilizes as the coat containing the polyimide precursor and the resin particle is heated, and thereafter, an imidization reaction proceeds. Before deformation of the resin particle in the coat occurs due to heat, the resin particle loses fluidity and becomes insoluble in an organic solvent. For this reason, the shape of vacancy is considered to be likely maintained.

In the porous polyimide film in the third exemplary embodiment of the present invention obtained by forming a resin particle-containing polyimide film by use of the resin particle-dispersed polyimide precursor solution according to an exemplary embodiment of the present invention and removing the resin particle, generation of cracks is likely suppressed. This is presumed to occur because in the production method of a porous polyimide film in an exemplary embodiment of the present invention, a resin particle is used and the use thereof effectively contributes to the relaxation of residual stress in the imidization step of the polyimide precursor.

Incidentally, the method for producing a porous polyimide film includes, for example, a method of producing a coat by using a polyimide precursor solution having dispersed therein silica particles, firing the coat, and then removing the silica particle. However, according to this method, a chemical such as hydrofluoric acid needs to be used in the treatment for removing the silica particle. Therefore, in such a production method, the productivity is low, and the cost is high.

Furthermore, in the case of using a silica particle, it is thought that since volume contraction is hardly absorbed in the imidization step, the polyimide film after imidization is prone to generation of cracks. In addition, in the case of using a silica particle, it is thought that since a chemical such as hydrofluoric acid is used, an ion is likely to remain as an impurity.

On the other hand, the porous polyimide film obtained by the above-described production method in the third exemplary embodiment of the present invention does not use a silica particle and therefore, the process of obtaining the porous polyimide film is simplified. In addition, since a hydrofluoric acid is not used for the removal of the resin particle, an ion is prevented from remaining as an impurity.

The production method of a resin particle-dispersed polyimide precursor solution according to the third exemplary embodiment of the present invention and the resin particle-dispersed polyimide precursor solution obtained by the production method are described below.

[Production Method of Resin Particle-Dispersed Polyimide Precursor Solution]

In the production method of a resin particle-dispersed polyimide precursor solution in the third exemplary embodiment of the present invention, first, a resin particle dispersion liquid where resin particles are dispersed in an aqueous solvent, is prepared. Then, a tetracarboxylic acid dianhydride and a diamine compound are polymerized in the resin particle dispersion liquid in the presence of an organic amine compound to form a polyimide precursor.

Specifically, the production method includes a step of preparing a resin particle dispersion liquid where resin particles are dispersed in an aqueous solvent (hereinafter, sometimes referred to as "resin particle dispersion liquid preparation step"), and a step of mixing an organic amine compound, a tetracarboxylic acid dianhydride and a diamine compound with the resin particle dispersion liquid, thereby polymerizing a tetracarboxylic acid dianhydride and a diamine compound to form a polyimide precursor (hereinafter, sometimes referred to as "polyimide precursor forming step").

(Resin Particle Dispersion Liquid Preparation Step)

The resin particle dispersion liquid preparation step is not particularly limited in the method therefor as long as a resin particle dispersion liquid where resin particles are dispersed in an aqueous solvent is obtained.

The method includes, for example, a method where each of the resin particle incapable of dissolving in the polyimide precursor solution and the aqueous solvent for the resin particle dispersion liquid is weighed and these are mixed and stirred to obtain the resin particle dispersion liquid. The method for mixing and stirring the resin particle and the aqueous solvent is not particularly limited and includes, for example, a method of mixing the resin particle while stirring the aqueous solvent. From the standpoint of increasing the dispersibility of the resin particle, for example, at least either one of an ionic surfactant and a nonionic surfactant may be mixed.

The resin particle dispersion liquid may be a resin particle dispersion liquid obtained by granulating the resin particle in the aqueous solvent. In the case of granulating the resin particle in the aqueous solvent, a resin particle dispersion liquid formed by polymerizing a monomer component in the aqueous solvent may be produced. In this case, the dispersion liquid may be a dispersion liquid obtained by a known polymerization method. For example, in the case where the resin particle is a vinyl resin particle, a known polymerization method (a radical polymerization method such as emulsion polymerization, soap-free emulsion polymerization, suspension polymerization, miniemulsion polymerization and microemulsion polymerization) may be applied For example, in the case of applying an emulsion polymerization method to the production of the vinyl resin particle, a monomer such as styrenes and (meth)acrylic acids is added to water having dissolved therein a water-soluble polymerization initiator such as potassium persulfate and ammonium persulfate, a surfactant such as sodium dodecylsulfate and diphenyl oxide disulfonates is further added, if desired, and the mixture is heated under stirring to perform polymerization, whereby the vinyl resin particle is obtained.

The resin particle dispersion liquid forming step is not limited to the above-described method, and a commercially available resin particle dispersion liquid dispersed in an aqueous solvent may be prepared. In the case of using a commercially available resin particle dispersion liquid, an operation such as dilution with an aqueous solvent may be performed according to the purpose. Furthermore, the resin particle dispersion liquid dispersed in an organic solvent may be displaced by an aqueous solvent, as long as the displacement does not affect the dispersibility.

(Polyimide Precursor Forming Step)

Next, a tetracarboxylic acid dianhydride and a diamine compound are polymerized in the resin particle dispersion liquid in the presence of an organic amine compound to produce a resin (polyimide precursor), whereby a polyimide precursor solution is obtained.

This method is advantageous in that use of an aqueous solvent affords high productivity and since the polyimide precursor solution is produced in a single stage, the process is simplified.

Specifically, an organic amine compound, a tetracarboxylic acid dianhydride, and a diamine compound are mixed with the resin particle dispersion liquid prepared in the resin particle dispersion liquid preparation step, and a tetracarboxylic acid dianhydride and a diamine compound are polymerized in the presence of an organic amine compound to form a polyimide precursor in the resin particle dispersion liquid. The order of mixing an organic amine compound, a tetracarboxylic acid dianhydride and a diamine compound with the resin particle dispersion liquid is not particularly limited.

At the time of polymerizing a tetracarboxylic acid dianhydride and a diamine compound in the resin particle dispersion liquid, the polyimide precursor may be formed by utilizing the aqueous solvent in the resin particle dispersion liquid. If desired, an aqueous solvent may be newly mixed. In the case of newly mixing an aqueous solvent, the aqueous solvent may be an aqueous solvent containing a small amount of an aprotic polar solvent. In addition, other additives may be mixed according to the purpose.

Through these steps, a resin particle-dispersed polyimide precursor solution is obtained.

The materials constituting the resin particle-dispersed polyimide precursor solution are described below.

(Aqueous Solvent)

As for the aqueous solvent, the aqueous solvent in the resin particle dispersion liquid, used for the production of the resin particle dispersion liquid, may be utilized as it is at the time of polymerizing a tetracarboxylic acid dianhydride and a diamine compound in the resin particle dispersion liquid. Alternatively, an aqueous solution suitable for polymerization may be prepared when polymerizing a tetracarboxylic acid dianhydride and a diamine compound.

The aqueous solvent is an aqueous solvent containing water. Specifically, the aqueous solvent is suitably a solvent containing 50 mass % or more of water relative to the entire aqueous solvent. Water includes, for example, distilled water, ion-exchanged water, ultrafiltered water, and pure water.

The content of water is preferably from 50 mass % to 100 mass %, more preferably from 70 mass % to 100 mass %, still more preferably from 80 mass % to 100 mass %, relative to the entire aqueous solvent.

The aqueous solvent used when producing the resin particle dispersion liquid is an aqueous solvent containing water. Specifically, the aqueous solvent for the resin particle dispersion liquid is suitably an aqueous solvent containing 50 mass % or more of water relative to the entire aqueous solvent. Water includes, for example, distilled water, ion-exchanged water, ultrafiltered water, and pure water. In the case of containing a soluble organic solvent other than water, for example, a water-soluble alcohol-based solvent may be used. The "water-soluble" as used herein means that the object substance dissolves in a concentration of 1 mass % or more in water at 25° C.

In the case where the aqueous solvent contains a solvent other than water, the solvent other than water includes, for example, a water-soluble organic solvent and an aprotic polar solvent. In view of transparency, mechanical strength, etc. of the polyimide molded body, the solvent other than water is preferably a water-soluble organic solvent. Above all, from the standpoint of improving various properties of the polyimide molded body, such as heat resistance, electrical property and solvent resistance, in addition to transparency and mechanical strength, it is preferred that the aqueous solvent does not contain an aprotic polar solvent or even if an aprotic polar solvent is contained, the amount thereof is small (for example, 40 mass % or less, preferably 30 mass % or less, relative to the entire aqueous solvent). The "water-soluble" as used herein means that the object substance dissolves in a concentration of 1 mass % or more in water at 25° C.

One of the above-described water-soluble organic solvents may be used alone, or two or more thereof may be used in combination.

The water-soluble ether-based solvent is a water-soluble solvent having an ether bond per molecule. The water-soluble ether-based solvent includes, for example, tetrahydrofuran (THF), dioxane, trioxane, 1,2-dimethoxyethane, diethylene glycol dimethyl ether, and diethylene glycol diethyl ether. Among these water-soluble ether-based solvents, tetrahydrofuran and dioxane are preferred.

The water-soluble ketone-based solvent is a water-soluble solvent having a ketone group per molecule. The water-soluble ketone-based solvent includes, for example, acetone, methyl ethyl ketone, and cyclohexanone. Among these water-soluble ketone solvents, acetone is preferred.

The water-soluble alcohol-based solvent is a water-soluble solvent having an alcoholic hydroxyl group per molecule. The water-soluble alcohol-based solvent includes, for example, methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these water-soluble alcohol-based solvents, methanol, ethanol, 2-propanol, ethylene glycol, ethylene glycol monoalkyl ether, propylene glycol, propylene glycol monoalkyl ether, diethylene glycol, and diethylene glycol monoalkyl ether are preferred.

In the case of containing, as the aqueous solvent, an aprotic polar solvent other than water, the aprotic polar solvent used in combination is a solvent having a boiling temperature of from 150° C. to 300° C. and a dipole moment of from 3.0 D to 5.0 D. The aprotic polar solvent specifically includes, for example, N-methyl-2-pyrrolidone (NMP), N,N-dimethylformamide (DMF), N,N-dimethylacetamide (DMAc), dimethylsulfoxide (DMSO), hexamethylenephosphoramide (HMPA), N-methylcaprolactam, N-acetyl-2-pyrrolidone, 1,3-dimethyl-2-imidazolidinone (DMI), N,N'-dimethylpropyleneurea, tetramethylurea, trimethyl phosphate, and triethyl phosphate.

In the case of containing, as the aqueous solvent, a solvent other than water, the solvent used in combination suitably has a boiling temperature of 270° C. or less, preferably from 60° C. to 250° C., more preferably from 80° C. to 230° C. When the boiling temperature of the solvent used in combination is in the range above, the solvent other than water is less likely to remain in the polyimide molded body, and a polyimide molded body having high mechanical strength is easily obtained.

Here, dissolution of the polyimide precursor in the solvent is controlled by the content of water and the kind and amount of the organic amine compound. With a low content of water, the polyimide precursor is likely dissolved in the region where the content of the organic amine compound is small. Conversely, with a high content of water, the polyimide precursor is likely dissolved in the region where the content of the organic amine compound is large. In addition, when the hydrophilicity is high, for example, when the organic amine compound contains a hydroxyl group, the polyimide precursor is likely dissolved in the region where the content of water is high.

(Resin Particle)

The resin particle is not particularly limited as long as it as long as it does not dissolve in the polyimide precursor solution, and includes, for example, a resin particle obtained by polycondensation of a polymerizable monomer, such as polyester resin and urethane resin, and a resin particle obtained by radical polymerization of a polymerizable monomer, such as vinyl resin, olefin resin and fluororesin. The resin particle obtained by radical polymerization includes, for example, resin particles of (meth)acrylic resin, (meth)acrylic acid ester resin, styrene.(meth)acrylic resin, polystyrene resin and polyethylene resin.

Among these, the resin particle is preferably at least one member selected from the group consisting of (meth)acrylic resin, (meth)acrylic acid ester resin, styrene.(meth)acrylic resin, and polystyrene resin.

The resin particle may or may not be crosslinked. From the standpoint of effectively contributing to the relaxation of residual stress in the imidization step of the polyimide precursor, an uncrosslinked resin particle is preferred. Furthermore, from the standpoint of simplifying the process of producing the resin particle-dispersed polyimide precursor solution, the resin particle dispersion liquid is preferably a vinyl resin particle dispersion liquid obtained by emulsion polymerization.

The term "(meth)acrylic" as used in the third exemplary embodiment of the present invention means that both "acrylic" and "methacrylic" are encompassed.

In the case where the resin particle is a vinyl resin particle, the resin particle is obtained by polymerizing a monomer. The monomer of the vinyl resin includes the following monomers. The vinyl resin includes, for example, a vinyl resin unit obtained by polymerization of a monomer, e.g., styrene structure-containing styrenes such as styrene, an alkyl-substituted styrene (for example, α-methylstyrene, 2-methylstyrene, 3-methylstyrene, 4-methylstyrene, 2-ethylstyrene, 3-ethylstyrene and 4-ethylstyrene), a halogen-substituted styrene (for example, 2-chlorostyrene, 3-chlorostyrene and 4-chlorostyrene) and divinylnaphthalene; vinyl group-containing esters such as methyl (meth)acrylate, ethyl (meth)acrylate, n-propyl (meth)acrylate, n-butyl (meth)acrylate, lauryl (meth)acrylate, 2-ethylhexyl (meth) acrylate and trimethylolpropane trimethacrylate (TMPTMA); vinyl nitriles such as acrylonitrile and methacrylonitrile; vinyl ethers such as vinyl methyl ether and vinyl isobutyl ether; vinyl ketones such as vinyl methyl ketone, vinyl ethyl ketone and vinyl isopropenyl ketone; acids such as (meth)acrylic acid, maleic acid, cinnamic acid, fumaric acid and vinylsulfonic acid; and bases such as ethyleneimine, vinylpyridine and vinylamine.

As another monomer, a monofunctional monomer such as vinyl acetate, a bifunctional monomer such as ethylene glycol dimethacrylate, nonane diacrylate and decanediol diacrylate, or a polyfunctional monomer such as trimethylolpropane triacrylate and trimethylolpropane trimethacrylate, may be used in combination.

The vinyl resin may be a resin using such a monomer alone or a resin that is a copolymer using two or more of these monomers.

As described above, the resin particle is preferably uncrosslinked, but in the case of crosslinking the resin particle, when a crosslinking agent is used at least as part of the monomer components, the ratio of the crosslinking agent to all monomer components is preferably from 0 mass % to 20 mass %, more preferably from 0 mass % to 5 mass %, still more preferably 0 mass %.

In the case where the monomer used for the resin constituting the vinyl resin particle contains styrene, the ratio of styrene to all monomer components is preferably from 20 mass % to 100 mass %, more preferably from 40 mass % to 100 mass %.

(Average Particle Diameter of Resin Particle)

The average particle diameter of the resin particle is not particularly limited but is suitably, for example, 2.5 µm or less, preferably 2.0 µm or less, more preferably 1.0 µm or less. The lower limit is not particularly limited but is suitably 0.001 µm or more, preferably 0.005 µm or more, more preferably 0.01 µm or more.

As for the average particle diameter of the resin particle, a cumulative distribution for the volume is drawn from the small diameter side with respect to divided particle size ranges (channels) by using a particle size distribution obtained by measurement by means of a laser diffraction particle size distribution measuring apparatus (for example, LA-700, manufactured by Horiba, Ltd.), and the particle diameter at an accumulation of 50% relative to all particles is measured as the volume average particle diameter D50v.

The resin particle may be a commercial product. Specifically, the crosslinked resin particle includes, for example, a crosslinked polymethyl methacrylate (MBX-Series, produced by Sekisui Plastics Co., Ltd.), a crosslinked polystyrene (SBX-Series, produced by Sekisui Plastics Co., Ltd.), and a crosslinked methyl methacrylate-styrene copolymer resin particle (MSX-Series, produced by Sekisui Plastics Co., Ltd.).

The uncrosslinked resin particle includes, for example, a polymethyl methacrylate (MB-Series, produced by Sekisui Plastics Co., Ltd.), and a (meth)acrylic acid ester.styrene copolymer (FS-Series, produced by Nippon Paint Co., Ltd.).
(Polyimide Precursor)

The polyimide precursor is obtained by polymerizing a tetracarboxylic acid dianhydride and a diamine compound.

The polyimide precursor is same as the polyimide precursor described in the first exemplary embodiment as above.

Examples and content and the like of the polyimide precursor are same as examples and content and the like of the polyimide precursor described in the first exemplary embodiment.
(Organic Amine Compound)

The organic amine compound is same as the organic amine compound described in the first exemplary embodiment as above.

Examples and content and the like of the organic amine compound are same as examples and content and the like of the organic amine compound described in the first exemplary embodiment.
(Ratio of Resin Particle and Polyimide Precursor)

In the resin particle-dispersed polyimide precursor solution, the ratio of the resin particle and the polyimide precursor is suitably, in terms of mass ratio assuming that the solid content of the polyimide precursor solution is 100, solid content of polyimide precursor solution:resin particle=from 100:20 to 100:200, preferably from 100:25 to 100:180, more preferably from 100:30 to 100:150.
(Other Additives)

The other additives are same as the other additives described in the first exemplary embodiment as above.
<Resin Particle-Containing Polyimide Film>

The resin particle-containing polyimide film according to the third exemplary embodiment of the present invention is obtained by applying the resin particle-dispersed polyimide precursor solution to form a coating film, and then heating the coating film.

The resin particle-containing polyimide film encompasses not only a resin particle-containing polyimide film after the completion of imidization but also a partially imidized resin particle-containing polyimide film before the completion of imidization.

Specifically, the resin particle-containing polyimide film according to the third exemplary embodiment of the present invention is obtained, for example, by a method including a step of coating the resin particle-dispersed polyimide precursor solution according to the third exemplary embodiment of the present invention to form a coating film (hereinafter, referred to as "coating film forming step") and a step of heating the coating film to form a polyimide film (hereinafter, referred to as "heating step").
(Coating Film Forming Step)

First, the above-described resin particle-dispersed polyimide precursor solution is prepared. Then, the resin particle-dispersed polyimide precursor solution is applied onto a base plate to form a coating film.

The base plate includes, for example, a resin-made base plate; a glass-made base plate; a ceramic-made base plate; a metal base plate; and a composite material base plate formed by combining these materials. Incidentally, the base plate may be subjected to a release treatment to provide a release layer.

The method for applying the resin particle-dispersed polyimide precursor solution onto a base plate is not particularly limited and includes various methods, for example, a spray coating method, a spin coating method, a roll coating method, a bar coating method, a slit die coating method, and an inkjet coating method.

As the base plate, various base plates can be used according to the intended use. Examples thereof include various substrates applied to a liquid crystal device; a semiconductor substrate having formed thereon an integrated circuit, a wiring substrate having formed thereon wiring, a printed board having provided thereon an electronic component and wiring; a substrate for a wire coating material.
(Heating Step)

Next, the coating film obtained in the coating film forming step above is subjected to a drying treatment. A coat (a dry coat before imidization) is formed by this drying treatment.

As for the heating conditions in the drying treatment, heating is performed, for example, at a temperature of from 80° C. to 200° C. for from 10 minutes to 60 minutes, and as the temperature is higher, the heating time may be shorter. It is also effective to apply hot air during heating. At the time of heating, the temperature may be step-by-step raised or may be raised without changing the speed.

Thereafter, the dry coat before imidization is heated to perform an imidization treatment, whereby a polyimide resin layer is formed.

As for the heating conditions in the imidization treatment, heating is performed, for example, at from 150° C. to 400° C. (preferably from 200° C. to 300° C.) for from 20 minutes to 60 minutes, whereby an imidization reaction is caused to occur and a polyimide film is formed. At the time of heating reaction, heating is preferably performed by step-by-step raising the temperature or gradually raising the temperature at a constant rate, before reaching the final temperature of heating.

Through these steps, a resin particle-containing polyimide film is formed. Then, if desired, the resin particle-containing polyimide film is taken out from the base plate to obtain a resin particle-containing polyimide film. The resin particle-containing polyimide film may be post-processed according to the intended use.
<Production Method of Porous Polyimide Film>

The production method of a porous polyimide film according to the third exemplary embodiment of the present invention includes a first step of applying the resin particle-dispersed polyimide precursor solution according to the third exemplary embodiment of the present invention to form a coating film, followed by drying of the coating film to form a coat containing the polyimide precursor and the resin particle, and a second step of heating the coat to imidize the polyimide precursor and form a polyimide film, the second step including a treatment for removing the resin particle.

The production method of a porous polyimide film according to the third exemplary embodiment of the present invention is described below.

Figure 7A:
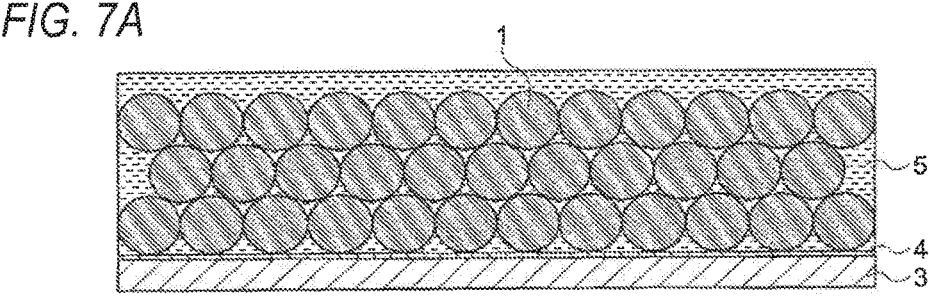
FIG. 7A, FIG. 7B, and FIG. 7C are process charts showing an example of the production method of a porous polyimide film in an exemplary embodiment of the present invention.
Figure 7B:
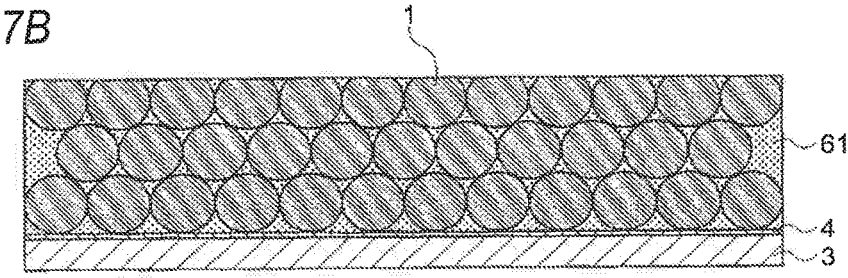
Figure 7C:
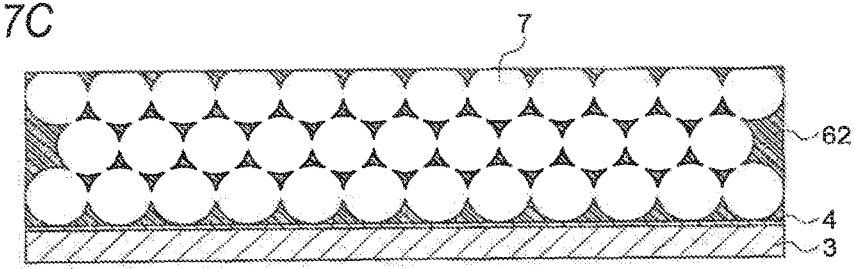

In FIG. 7A, FIG. 7B, and FIG. 7C referred to in the description of the production method, the same numerical reference is used for the same component part. As to the numerical reference in FIG. 7A, FIG. 7B, and FIG. 7C, 1 indicates a resin particle, 2 indicates a binder resin, 3 indicates a base plate, 4 indicates a release layer, 5 indicates a polyimide precursor solution, 7 indicates a vacancy, 61 indicates a coat (polyimide coat) in the process of performing imidization of the polyimide precursor, and 62 indicates a porous polyimide film.

In the following, the production method depicted in FIG. 7A, FIG. 7B, and FIG. 7C (one example of the production method according to the third exemplary embodiment of the present invention) is described, but the production method is not limited thereto.

(First Step)

In the first step, the above-described resin particle-dispersed polyimide precursor solution is prepared. Thereafter, the resin particle-dispersed polyimide precursor solution is applied onto a base plate to form a coating film containing a polyimide precursor solution and a resin particle. The coating film formed on the base plate is then dried to form a coat containing the polyimide precursor and the resin particle.

In the first step, the method for forming, on a base plate, a coating film containing the polyimide precursor solution and the resin particle includes the following method, but the method is not limited thereto.

Specifically, first, a resin particle dispersion where resin particles are dispersed in an aqueous solvent is prepared. Then, an organic amine compound, a tetracarboxylic acid dianhydride and a diamine compound are mixed with the resin particle dispersion to prepare a resin particle-dispersed polyimide precursor solution where a tetracarboxylic acid dianhydride and a diamine compound are polymerized to form a polyimide precursor. Next, the resin particle-dispersed polyimide precursor solution is applied onto a base plate to form a coating film containing the polyimide precursor solution and the resin particle. Resin particles in the coating films are distributed in the state of aggregation being suppressed (see, FIG. 7A).

The base plate onto which the resin particle-dispersed polyimide precursor is applied, is not particularly limited and includes, for example, a base plate made of a resin such as polystyrene and polyethylene terephthalate; a glass-made base plate; a ceramic-made base plate; a metal base plate such as iron and stainless steel (SUS); and a composite material base plate formed by combining these materials. If desired, the base plate may be subjected to a release treatment with a silicone-based or fluorine-based release agent, etc. to provide a release layer.

The method for applying the resin particle-dispersed polyimide precursor solution onto a base plate is not particularly limited and includes various methods, for example, a spray coating method, a spin coating method, a roll coating method, a bar coating method, a slit die coating method, and an inkjet coating method.

The amount of the polyimide precursor solution coated for obtaining the coating film containing the polyimide precursor solution and the resin particle is suitably an amount allowing the resin particle to be exposed on the coating film surface, because the pore area ratio of the porous polyimide film can be increased. For example, the coating film is suitably formed with a thickness allowing the resin particle to be exposed on the coating film surface (for example, a coating film where the thickness of the coating film is smaller than the particle diameter of the resin particle).

After the coating film containing the polyimide precursor solution and the resin particle is formed, the coating film is dried to form a coat containing the polyimide precursor and the resin particle. Specifically, the coating film containing the polyimide precursor solution and the resin particle is dried, for example, by heat drying, natural drying, vacuum drying or other methods to form a coat. More specifically, the coat is formed by drying the coating film such that the solvent remaining in the coat accounts for 50% or less, preferably 30% or less, relative to the solid content of the coat. This coat is in a state of the polyimide precursor being dissolvable in water.

At the time of formation of the coating film, the coating film may be formed with an amount enough to embed the resin particle in the coating film. In this case, a treatment for exposing the resin particle may be performed in the later-described second step. The pore area ratio of the porous polyimide film is increased by performing the treatment for exposing the resin particle.

(Second Step)

The second step is a step of heating the coat containing the polyimide precursor and the resin particle, obtained in the first step, to imidize the polyimide precursor and form a polyimide film. The second step includes a treatment for removing the resin particle. A porous polyimide film is obtained through the treatment for removing the resin particle.

In the second step, the step of forming a polyimide film is specifically performed by heating the coat containing the polyimide precursor and the resin particle, obtained in the first step, thereby allowing imidization to proceed, and further heating the coat to form a polyimide film. As the imidization proceeds and the imidization ratio rises, the coat becomes hardly dissolvable in an organic solvent.

Thereafter, in the second step, a treatment for removing the resin particle is performed. As for the removal, the resin particle may be removed in the process of imidizing the polyimide precursor by heating the coat or may be removed from a polyimide film after the completion of imidization (after imidization).

In an exemplary embodiment of the present invention, the process of imidizing the polyimide precursor indicates a process of heating the coat containing the polyimide precursor and the resin particle, obtained in the first step, thereby allowing imidization to proceed and producing a state prior to becoming a polyimide film after the completion of imidization.

In view of removability, etc. of the resin particle, the treatment for removing the resin particle is preferably performed when the imidization ratio of the polyimide precursor in the polyimide coat is 30% or more, in the process of imidizing the polyimide precursor. When the imidization ratio becomes 30% or more, the coat becomes hardly dissolvable in an organic solvent.

The treatment for removing the resin particle includes, for example, a method of removing the resin particle by heating, a method of removing the resin particle with an organic solvent capable of dissolving the resin particle, and a method of removing the resin particle by decomposition using a laser, etc. Among these, a method of removing the resin particle by heating, and a method of removing the resin particle with an organic solvent capable of dissolving the resin particle are preferred.

As the method of removing the resin particle by heating, the resin particle may be decomposed and removed, for example, by the heating performed for allowing the imidization to proceed in the process of imidizing the polyimide precursor. In this case, an operation of removing the resin particle with a solvent is omitted, which is advantageous in view of reducing the number of steps. On the other hand, depending on the kind of the resin particle, a decomposition gas may be generated by heating, and rupture, cracking, etc. may occur in the porous polyimide film due to the decomposition gas. Therefore, in this case, a method of removing the resin particle with an organic solvent capable of dissolving the resin particle is preferably employed.

The method of removing the resin particle with an organic solvent capable of dissolving the resin particle includes, for example, a method of bringing the coat into contact with an organic solvent capable of dissolving the resin particle (for example, dipping in the solvent), and thereby dissolving and removing the resin particle. Dipping in this state in the solvent is preferred in that the dissolution efficiency for the resin particle is increased.

The organic solvent capable of dissolving the resin particle for removing the resin particle is not particularly limited as long as it is an organic solvent incapable of dissolving the polyimide coat and the imidization-completed polyimide film and capable of dissolving the resin particle. The organic solvent includes, for example, ethers such as tetrahydrofuran; aromatics such as toluene; ketones such as acetone; and esters such as ethyl acetate.

In the second step, the heating method when heating the coat obtained in the first step to allow the progression of imidization and thereby obtain a polyimide film is not particularly limited and includes, for example, a method of heating the coat in two stages. In the case of two-stage heating, the heating conditions specifically include the following heating conditions.

As for the heating conditions in the first stage, the temperature is preferably a temperature capable of maintaining the shape of the resin particle. Specifically, the temperature is suitably, for example, from 50° C. to 150° C., preferably from 60° C. to 140° C. The heating time is suitably from 10 minutes to 60 minutes. As the heating temperature is higher, the heating time may be shorter.

As for the heating conditions in the second stage, heating is performed, for example, under the conditions of from 150° C. to 400° C. (preferably from 200° C. to 390° C.) and from 20 minutes to 120 minutes. Under the heating conditions in these ranges, the imidization reaction further proceeds and a polyimide film can be formed. At the time of heating reaction, heating is suitably performed by step-by-step raising the temperature or gradually raising the temperature at a constant rate, before reaching the final temperature of heating.

The heating conditions are not limited to the above-described two-stage heating method and, for example, a method of heating the coat in a single stage may be employed. In the case of the single-stage heating method, for example, the imidization may be completed only under the heating conditions of the second stage above.

From the standpoint of increasing the pore area ratio, a treatment for exposing the resin particle is preferably performed in the second step to produce a state of the resin particle being exposed. In the second step, the treatment for exposing the resin particle is preferably performed in the process of performing imidization of the polyimide precursor or after imidization but before the treatment for removing the resin particle.

In this case, for example, when forming a coat on a base plate by using a resin particle-dispersed polyimide precursor solution, the resin particle-dispersed polyimide precursor solution is applied onto the base plate to form a coating film in a state of the resin particle being embedded therein (see, FIG. 7A). Thereafter, a coat containing the polyimide precursor and the resin particle is formed by drying the coating film. The coat formed by this method is in a state of the resin particle layer being embedded therein. Before performing the treatment for removing the resin particle by heating, the coat may be subjected to a treatment for exposing the resin particle on the polyimide film in the process of imidizing the polyimide precursor or after the completion of imidization (after imidization).

In the second step, the treatment for exposing the resin particle includes, for example, a treatment applied when the polyimide coat is in the following state.

In the case of performing the treatment for exposing the resin particle when the imidization ratio of the polyimide precursor in the polyimide coat is less than 15% (i.e., a state of the polyimide coat being dissolvable in water), the treatment for exposing the resin particle embedded in the polyimide coat includes a wiping treatment, a water dipping treatment, etc.

In the case of performing the treatment for exposing the resin particle when the imidization ratio of the polyimide precursor in the polyimide coat is 15% or more (i.e., a state of being hardly dissolvable in an organic solvent) or when the imidization is completed to generate a polyimide film, the method includes a method of exposing the resin particle by mechanical cutting with tools such as sandpaper, and a method of exposing the resin particle by decomposition using a laser, etc.

For example, in the case of mechanical cutting, part of the resin particle present in the region at the top of the resin particle embedded in the polyimide coat (i.e., the region on the side distant from the base plate of the resin particle) is cut together with the polyimide coat present at the top of the resin particle, and the cut resin particle is exposed on the surface of the polyimide coat (see, FIG. 7B).

Thereafter, from the polyimide coat on which the resin particle is exposed, the resin particle is removed by the above-described treatment for removing the resin particle. As a result, a porous polyimide film, from which the resin particle is removed, is obtained (see, FIG. 7C).

In the above, the production process of a porous polyimide film, where the treatment for exposing the resin particle is applied in the second step, is described, but from the standpoint of increasing the pore area ratio, the treatment for exposing the resin particle may be applied in the first step. In this case, the treatment for exposing the resin particle may be performed to produce a state of the resin particle being exposed in the process of drying the coating film to form the coat after obtaining the coating film in the first step. By performing this treatment for exposing the resin particle, the pore area ratio of the porous polyimide film is increased.

For example, in the process of drying the coating film to form the coat containing the polyimide precursor and the resin particle after obtaining the coating film containing the polyimide precursor solution and the resin particle, as described above, the coat is in a state of the polyimide precursor being dissolvable in water. The coat in this state is treated, for example, by wiping or dipping in water, whereby the resin particle can be exposed. Specifically, the polyimide precursor solution present in the region exceeding the thickness of the resin particle layer is subjected to, for example, a treatment for exposing the resin particle layer by wet wiping, whereby the polyimide precursor solution present in the region exceeding the thickness of the resin particle layer is removed. As a result, the resin particle present in the region at the top of the resin particle layer (that is, the region on the side distant from the base plate of the resin particle layer) is exposed on the coat surface.

In the second step, the base plate used in the first step for forming the coat thereon may be separated when the coat becomes a dry coat, may be separated when the polyimide precursor in the polyimide coat becomes hardly dissolvable in an organic solvent, or may be separated when an imidization-completed film is generated.

Through these steps, a porous polyimide film is obtained. The porous polyimide film may be post-processed according to the intended use.

<Porous Polyimide Film>

The porous polyimide film in the third exemplary embodiment of the present invention is described below.

In the porous polyimide film obtained by the production method of a porous polyimide film according to an exemplary embodiment of the present invention, generation of cracks is suppressed.

(Characteristics of Porous Polyimide Film)

Although not particularly limited to this range, the porous polyimide film of the present invention suitably has a porosity of 30% or more. The porosity is preferably 40% or more, more preferably 50% or more. The upper limit of the porosity is not particularly limited but is suitably 90% or less.

The shape of the vacancy is preferably spherical or close to spherical. In addition, the vacancy is preferably in a configuration where vacancies are connected and continue with each other (see, FIG. 7C). The vacancy diameter in the portion where vacancies are connected with each other is suitably, for example, from 1/100 to 1/2, preferably from 1/50 to 1/3, more preferably from 1/20 to 1/4, of the maximum diameter of the vacancy. Specifically, the average value of the vacancy diameter in the portion where vacancies are connected with each other is suitably from 5 nm to 1,500 nm.

The average value of the vacancy diameter is not particularly limited but is preferably from 0.01 µm to 2.5 µm, more preferably from 0.05 µm to 2.0 µm, still more preferably from 0.1 µm to 1.5 µm, yet still more preferably from 0.15 µm to 1.0 µm.

In the porous polyimide film in the third exemplary embodiment of the present invention, the ratio of maximum diameter and minimum diameter of the vacancy (ratio of maximum value and minimum value of the vacancy diameter) is from 1 to 2, preferably from 1 to 1.9, more preferably from 1 to 1.8. Of this range, a value closer to 1 is still more preferred. Within this range, the variation in vacancy diameter is reduced. In addition, when the porous polyimide film in the third exemplary embodiment of the present invention is applied, for example, to a battery separator of a lithium ion battery, occurrence of turbulence in the ion flow is inhibited and therefore, the formation of lithium dendrite is likely suppressed. The "ratio of maximum diameter and minimum diameter of the vacancy" is a ratio represented by a value obtained by dividing the maximum diameter by the minimum diameter of the vacancy (i.e., maximum value/minimum value of vacancy diameter).

The average value of the vacancy diameter and the average value of the vacancy diameter in the portion where vacancies are connected with each other are values observed and measured by a scanning electron microscope (SEM). Specifically, first, a sample for measurement is prepared by cutting out from the porous polyimide film. Observation and measurement of the sample for measurement are performed using an image processing software standardly equipped in VE SEM manufactured by Keyence Corporation. The observation and measurement are performed on 100 vacancies for each vacancy portion in the cross-section of the sample for measurement, and the average value, minimum diameter, maximum diameter and arithmetic mean diameter are determined for each portion. In the case where the shape of the vacancy is not circular, the longest part is taken as the diameter.

The thickness of the porous polyimide film is not particularly limited but is suitably from 15 µm to 500 µm.

(Use of Porous Polyimide Film)

The use to which the porous polyimide film according to the third exemplary embodiment of the present invention is applied is same as the use to which the porous polyimide film according to the first exemplary embodiment of the present invention is applied.

EXAMPLES

The present invention is described below by referring to Examples, but the present invention is not limited to these Examples by any means. In the following description, unless otherwise indicated, the "parts" and "%" are all on the mass basis.

Examples 1 to 7, Comparative Examples 1 and 2

[Production of Polyimide Precursor "Water" Solution (PAA-1(a))]

A flask equipped with a stirring bar, a thermometer and a dropping funnel is filled with 900 g of water. Thereto, 27.28 g (252.27 mmol) of p-phenylenediamine (molecular weight: 108.14) and 50.00 g (494.32 mmol) of methylmorpholine (organic amine compound) are added and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 20° C., the mixture is stirred for 24 hours to perform dissolution and reaction, whereby Polyimide Precursor "Water" Solution (PAA-1(a)) is obtained.

[Production of Polyimide Precursor "N-Methylpyrrolidone" Solution (RPAA-1(a))]

A flask equipped with a stirring bar, a thermometer and a dropping funnel is filled with 900 g of N-methylpyrrolidone. Thereto, 27.28 g (252.27 mmol) of p-phenylenediamine is added and dispersed by stirring at 20° C. for 10 minutes. Furthermore, 72.72 g (247.16 mmol) of 3,3',4,4'-biphenyltetracarboxylic acid dianhydride is added to the resulting solution and while keeping the reaction temperature at 20° C., the mixture is stirred for 24 hours to perform dissolution and reaction, whereby Polyimide Precursor "N-Methylpyrrolidone" Solution (RPAA-1(a)) is obtained.

[Production of Polyimide Precursor "Water/Isopropanol" Solution (PAA-2(a))]

500 g of Polyimide Precursor "N-Methylpyrrolidone" Solution (RPAA-1(a)) is added dropwise to 3,000 g of water under stirring to precipitate the polyimide precursor, and 30 g of this polyimide precursor is added to 243 g of water and 27 g of isopropanol. Furthermore, 15 g of methylmorpholine is added and dissolved under stirring to obtain Polyimide Precursor "Water/Isopropanol" Solution (PAA-2(a)).

[Production of Polyimide Precursor "Water/Isopropanol" Solution (PAA-3(a))]

500 g of Polyimide Precursor "N-Methylpyrrolidone" Solution (RPAA-1(a)) is added dropwise to 3,000 g of water under stirring to precipitate the polyimide precursor, and 30 g of this polyimide precursor is added to 243 g of water and 27 g of isopropanol. Furthermore, 15 g of 1,2-dimethylimidazole (DMIz) is added and dissolved under stirring to obtain Polyimide Precursor "Water/Isopropanol" Solution (PAA-3(a)).

[Production of Polyimide Precursor "Water/N-Methylpyrrolidone" Solution (PAA-4(a))]

500 g of Polyimide Precursor "N-Methylpyrrolidone" Solution (RPAA-1(a)) is added dropwise to 3,000 g of water under stirring to precipitate the polyimide precursor, and 30 g of this polyimide precursor is added to 243 g of water and 27 g of N-methylpyrrolidone. Furthermore, 15 g of 1,2-dimethylimidazole is added and dissolved under stirring to obtain Polyimide Precursor "Water/N-Methylpyrrolidone" Solution (PAA-4(a)).

Example 1

10 Parts of an uncrosslinked polymethyl methacrylate.styrene copolymer having an average particle diameter of 0.1 μm (FS-102E, produced by Nippon Paint Co., Ltd.) and 1 part of polyvinylbutyral resin (S-LEC SV-02, produced by Sekisui Chemical Co., Ltd.) are added to 30 parts of ethanol, and the mixture is stirred on a web rotor to produce a dispersion liquid. The dispersion liquid is applied onto a glass-made base plate to have a film thickness of 30 μm after drying, and the coating formed is dried at 90° C. for 1 hour to form a resin particle layer.

Polyimide Precursor "Water" Solution (PAA-1(a)) is 10-fold diluted and after applying Polyimide Precursor "Water" Solution (PAA-1(a)) onto the resin particle layer, vacuum degassing is performed to impregnate Polyimide Precursor "Water" Solution (PAA-1(a)) into a void between resin particles. The coating is dried overnight at room temperature (25° C., hereinafter the same) and then wet-wiped to expose the surface of the resin particle layer, and the surplus polyimide precursor on the resin particle layer is removed. The resulting coating is heated at 120° C. for 1 hour, then separated from the glass-made base plate, and dipped in toluene to dissolve out the resin particle. After drying, the coating is subjected to temperature elevation from room temperature to 380° C. at a rate of 10° C./min, held at 380° C. for 1 hour and thereafter, cooled to room temperature to obtain Porous Polyimide Film (PIF-1(a)).

Comparative Example 1

Polyimide Precursor "N-Methylpyrrolidone" Solution (RPAA-1(a)) is 10-fold diluted and applied onto the resin particle layer produced in the same manner as in Example 1, as a result, the resin particle is dissolved. This coating is heated at 120° C. for 1 hour, then separated from the glass-made base plate, and dipped in toluene to dissolve out the resin particle. After drying, the coating is subjected to temperature elevation from room temperature to 380° C. at a rate of 10° C./min, held at 380° C. for 1 hour and thereafter, cooled to room temperature to obtain Porous Polyimide Film (RPIF-1(a)). However, the vacancy diameter ranges from 0.05 μm to 1.01 μm, revealing a wide distribution. This is considered to result because the resin particle dissolves and the form of a resin particle cannot be maintained.

Example 2

Porous Polyimide Film (PIF-2(a)) is obtained in the same manner as in Example 1 by 10-fold diluting Polyimide Precursor "Water/Isopropanol" Solution (PAA-2(a)) and applying the solution onto the resin particle layer produced in the same manner as in Example 1.

Example 3

Polyimide Precursor "Water/Isopropanol" Solution (PAA-2(a)) is 10-fold diluted, applied onto the resin particle layer produced in the same manner as in Example 1, then dried overnight at room temperature and thereafter, wet-wiped to expose the surface of the resin particle layer, and the surplus polyimide precursor is removed. The resulting coating is heated at 120° C. for 1 hour, separated from the glass-made base plate, then subjected to temperature elevation from room temperature to 380° C. at a rate of 10° C./min, held at 380° C. for 1 hour and thereafter, cooled to room temperature to obtain Porous Polyimide Film (PIF-3(a)).

Example 4

Polyimide Precursor "Water/Isopropanol" Solution (PAA-2(a)) is 10-fold diluted, and an uncrosslinked polymethyl methacrylate.styrene copolymer having an average particle diameter of 0.1 μm (FS-102E, produced by Nippon Paint Co., Ltd.) is added thereto in a ratio of 10 parts relative to 10 parts of the polyimide precursor. The mixture is stirred on a web rotor to produce a dispersion liquid, and the dispersion liquid is applied onto a glass-made base plate to have a film thickness of about 30 μm after drying. The coating formed is dried at 90° C. for 1 hour to form a resin particle layer, then subjected to temperature elevation from 90° C. to 380° C. at a rate of 10° C./min, held at 380° C. for 1 hour and thereafter, cooled to room temperature to obtain Porous Polyimide Film (PIF-4(a)).

Example 5

Polyimide Precursor "Water/Isopropanol" Solution (PAA-2(a)) is 10-fold diluted, and an uncrosslinked polymethyl methacrylate styrene copolymer having an average particle diameter of 0.1 μm (FS-102E, produced by Nippon Paint Co., Ltd.) is added thereto in a ratio of 10 parts relative to 10 parts of the polyimide precursor. The mixture is stirred on a web rotor to produce a dispersion liquid, and the dispersion liquid is applied onto a glass-made base plate to have a film thickness of about 30 μm after drying. The coating formed is dried at room temperature for 1 hour, stripped from the glass-made base plate, and dipped in tetrahydrofuran to dissolve the resin particle. After drying at 90° C. for 1 hour, the coating is subjected to temperature elevation from 90° C. to 380° C. at a rate of 10° C./min, held at 380° C. for 1 hour and thereafter, cooled to room temperature to obtain Porous Polyimide Film (PIF-5(a)).

Example 6

Porous Polyimide Film (PIF-6(a)) is obtained in the same manner as in Example 2 except for using Polyimide Precursor "Water/Isopropanol" Solution (PAA-3(a)).

Example 7

Porous Polyimide Film (PIF-7(a)) is obtained in the same manner as in Example 5 except for using Polyimide Precursor "Water/N-Methylpyrrolidone" Solution (PAA-4(a)). Since N-methylpyrrolidone has a high boiling temperature and cannot be sufficiently removed by drying at room temperature, the vacancy diameter is large compared with the case of using isopropanol.

Comparative Example 2

30 Parts by mass of monodisperse spherical silica particles having an average diameter of 550 nm (sphericity: 1.0, particle size distribution index: 1.20) produced by Nippon Shokubai Co., Ltd. are dispersed in 30 parts by mass of N-methylpyrrolidone (NMP), and 20 parts by mass of the silica particle dispersion liquid is mixed with 100 parts by mass of Polyimide Precursor "N-Methylpyrrolidone" Solution (RPAA-1(a)). After stirring, the resulting solution is applied onto a glass plate, and the coating is heated at 120° C. for 1 hours, separated from the glass-made base plate, then subjected to temperature elevation from room temperature to 380° C. at a rate of 10° C./min, held at 380° C. for 1 hour and thereafter, cooled to room temperature to obtain a silica-polyimide composite film. The silica-polyimide composite film is dipped in 10 mass % hydrogen fluoride water to dissolve and remove the silica over 6 hours, then thoroughly washed with water and dried to obtain Porous Polyimide Film (RPIF-2(a)).

[Evaluation of Vacancy Diameter Distribution]

The porous polyimide films obtained in Examples 1 to 7 and Comparative Examples 1 and 2 are evaluated for the vacancy diameter distribution (maximum diameter, minimum diameter, and average diameter). Specifically, the evaluation is performed by the method described above.

[Evaluation of Cracking]

The porous polyimide films obtained in Examples 1 to 7 and Comparative Examples 1 and 2 are evaluated for cracking. The method therefor is specifically as follows. A 1 cm$^2$-square area of the polyimide film is examined through a microscope at a magnification of 500 times, and the presence or absence of a crack of 0.1 mm or more is observed with an eye.

—Criteria for Evaluation—

A: No crack.
B: From 1 to 3 cracks.
C: 4 or more cracks.

TABLE 1

| | Porous Polyimide Film | Solvent | Polyimide Precursor | | | Resin Particle | Treatment for Removal | Treatment for Exposure |
| | | | Tetra-carboxylic Acid | Di-amine | Amine Compound | | | |
|---|---|---|---|---|---|---|---|---|
| Example 1 | PIF-1(a) | water | BPDA | PDA | MMO | PMMA/St | Tol | treated |
| Example 2 | PIF-2(a) | water/IPA | BPDA | PDA | MMO | PMMA/St | Tol | treated |
| Example 3 | PIF-3(a) | water/IPA | BPDA | PDA | MMO | PMMA/St | heating | treated |
| Example 4 | PIF-4(a) | water/IPA | BPDA | PDA | MMO | PMMA/St | heating | none |
| Example 5 | PIF-5(a) | water/IPA | BPDA | PDA | MMO | PMMA/St | THF | none |
| Example 6 | PIF-6(a) | water/IPA | BPDA | PDA | DMIz | PMMA/St | Tol | treated |
| Example 7 | PIF-7(a) | water/NMP | BPDA | PDA | DMIz | PMMA/St | Tol | none |
| Comparative Example 1 | RPIF-1(a) | NMP | BPDA | PDA | — | PMMA/St | Tol | none |
| Comparative Example 2 | RPIF-2(a) | NMP | BPDA | PDA | — | silica | hydrofluoric acid | none |

| | Porous Polyimide Film | Vacancy | | | Evaluation of Cracking |
| | | Minimum Diameter (μm) | Maximum Diameter (μm) | Average Diameter (μm) | |
|---|---|---|---|---|---|
| Example 1 | PIF-1(a) | 0.09 | 0.12 | 0.11 | A |
| Example 2 | PIF-2(a) | 0.09 | 0.12 | 0.11 | A |
| Example 3 | PIF-3(a) | 0.08 | 0.15 | 0.13 | A |
| Example 4 | PIF-4(a) | 0.06 | 0.17 | 0.13 | A |
| Example 5 | PIF-5(a) | 0.08 | 0.13 | 0.12 | A |
| Example 6 | PIF-6(a) | 0.09 | 0.12 | 0.11 | A |
| Example 7 | PIF-7(a) | 0.11 | 0.18 | 0.15 | A |
| Comparative Example 1 | RPIF-1(a) | 0.05 | 1.01 | 0.65 | B |
| Comparative Example 2 | RPIF-2(a) | 0.50 | 0.59 | 0.55 | C |

Details of abbreviations in Table 1 are as follows.
"PDA": p-Phenylenediamine
"BPDA": 3,3',4,4'-Biphenyltetracarboxylic acid dianhydride
"MMO": Methylmorpholine
"DMIz": 1,2-Dimethylimidazole
"THF": Tetrahydrofuran
"Tol": Toluene
"PMMA/St": Uncrosslinked polymethyl methacrylate•styrene copolymer
"IPA": Isopropanol
"NMP": N-Methylpyrrolidone Examples 1(b) to 5(b), Comparative Examples 1(b) to 3(b)

[Production of Polyimide Precursor "Water" Solution (PAA-1(b))]

A flask equipped with a stirring bar, a thermometer and a dropping funnel is filled with 900 g of water. Thereto, 27.28 g (252.27 mmol) of p-phenylenediamine (molecular weight: 108.14) and 50.00 g (494.32 mmol) of methylmorpholine (organic amine compound) are added and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 20° C., the mixture is stirred for 24 hours to perform dissolution and reaction, whereby Polyimide Precursor "Water" Solution (PAA-1(b)) is obtained.

[Production of Polyimide Precursor "N-Methylpyrrolidone" Solution (RPAA-1(b))]

A flask equipped with a stirring bar, a thermometer and a dropping funnel is filled with 900 g of N-methylpyrrolidone. Thereto, 27.28 g (252.27 mmol) of p-phenylenediamine is added and dispersed by stirring at 20° C. for 10 minutes. Furthermore, 72.72 g (247.16 mmol) of 3,3',4,4'-biphenyltetracarboxylic acid dianhydride is added to the resulting solution and while keeping the reaction temperature at 20° C., the mixture is stirred for 24 hours to perform dissolution and reaction, whereby Polyimide Precursor "N-Methylpyrrolidone" Solution (RPAA-1(b)) is obtained.

[Production of Polyimide Precursor "Water/Isopropanol" Solution (PAA-2(b))]

500 g of Polyimide Precursor "N-Methylpyrrolidone" Solution (RPAA-1(b)) is added dropwise to 3,000 g of water under stirring to precipitate the polyimide precursor, and 30 g of this polyimide precursor is added to 243 g of water and 27 g of isopropanol. Furthermore, 15 g of methylmorpholine is added and dissolved under stirring to obtain Polyimide Precursor "Water/Isopropanol" Solution (PAA-2(b)).

[Production of Polyimide Precursor "Water/Isopropanol" Solution (PAA-3(b))]

500 g of Polyimide Precursor "N-Methylpyrrolidone" Solution (RPAA-1(b)) is added dropwise to 3,000 g of water under stirring to precipitate the polyimide precursor, and 30 g of this polyimide precursor is added to 243 g of water and 27 g of isopropanol. Furthermore, 15 g of 1,2-dimethylimidazole (DMIz) is added and dissolved under stirring to obtain Polyimide Precursor "Water/Isopropanol" Solution (PAA-3(b)).

[Production of Polyimide Precursor "Water/N-Methylpyrrolidone" Solution (PAA-4(b))]

500 g of Polyimide Precursor "N-Methylpyrrolidone" Solution (RPAA-1(b)) is added dropwise to 3,000 g of water under stirring to precipitate the polyimide precursor, and 30 g of this polyimide precursor is added to 243 g of water and 27 g of N-methylpyrrolidone. Furthermore, 15 g of 1,2-dimethylimidazole is added and dissolved under stirring to obtain Polyimide Precursor "Water/N-Methylpyrrolidone" Solution (PAA-4(b)).

Example 1(b)

10 Parts of an uncrosslinked polymethyl methacrylate.styrene copolymer having an average particle diameter of 0.1 μm (FS-102E, produced by Nippon Paint Co., Ltd.) and 1 part of polyvinylbutyral resin (S-LEC SV-02, produced by Sekisui Chemical Co., Ltd.) are added to 30 parts of ethanol, and the mixture is stirred on a web rotor to produce a dispersion liquid. The dispersion liquid is applied onto a glass-made base plate to have a film thickness of 30 μm after drying, and the coating formed is dried at 90° C. for 1 hour to form an uncrosslinked resin particle layer.

Polyimide Precursor "Water" Solution (PAA-1(b)) is 10-fold diluted and after applying Polyimide Precursor "Water" Solution (PAA-1(b)) onto the uncrosslinked resin particle layer, vacuum degassing is performed to impregnate Polyimide Precursor "Water" Solution (PAA-1(b)) into a void between uncrosslinked resin particles. The coating is dried overnight at room temperature (25° C., hereinafter the same) and then wet-wiped to expose the surface of the uncrosslinked resin particle layer, and the surplus polyimide precursor on the uncrosslinked resin particle layer is removed. The resulting coating is heated at 120° C. for 1 hour, then separated from the glass-made base plate, and dipped in tetrahydrofuran (THF) for 30 minutes to dissolve out the uncrosslinked resin particle. After drying, the coating is subjected to temperature elevation from room temperature to 380° C. at a rate of 10° C./min, held at 380° C. for 1 hour and thereafter, cooled to room temperature to obtain Porous Polyimide Film (PIF-1(b)).

Comparative Example 1(b)

Polyimide Precursor "N-Methylpyrrolidone" Solution (RPAA-1(b)) is 10-fold diluted and applied onto the uncrosslinked resin particle layer produced in the same manner as in Example 1(b), as a result, the uncrosslinked resin particle is dissolved. The coating is heated at 120° C. for 1 hour, then separated from the glass-made base plate, and dipped in THF for 1 hour to dissolve out the uncrosslinked resin particle. After drying, the coating is subjected to temperature elevation from room temperature to 380° C. at a rate of 10° C./min, held at 380° C. for 1 hour and thereafter, cooled to room temperature to obtain Porous Polyimide Film (RPIF-1(b)). However, the vacancy diameter ranges from 0.05 μm to 1.01 μm, revealing a wide distribution. This is considered to result because the uncrosslinked resin particle dissolves and the form of an uncrosslinked resin particle cannot be maintained. In the Porous Polyimide Film (RPIF-1(b)), the content of the uncrosslinked resin component derived from the uncrosslinked resin particle is 0.02%.

Example 2(b)

Porous Polyimide Film (PIF-2(b)) is obtained in the same manner as in Example 1(b) by 10-fold diluting Polyimide Precursor "Water/Isopropanol" Solution (PAA-2(b)) and applying the solution onto the uncrosslinked resin particle layer produced in the same manner as in Example 1(b).

Example 3(b)

Polyimide Precursor "Water/Isopropanol" Solution (PAA-2(b)) is 10-fold diluted, and an uncrosslinked polymethyl methacrylate.styrene copolymer having an average particle diameter of 0.1 μm (FS-102E, produced by Nippon Paint Co., Ltd.) is added thereto in a ratio of 10 parts relative to 10 parts of the polyimide precursor. The mixture is stirred on a web rotor to produce a dispersion liquid, and the dispersion liquid is applied onto a glass-made base plate to have a film thickness of about 30 μm after drying, and the coating formed is dried at room temperature for 1 hour, separated from the glass-made base plate, and dipped in tetrahydrofuran for 30 minutes. After drying at 90° C. for 1 hour, the coating is subjected to temperature elevation from 90° C. to 380° C. at a rate of 10° C./min, held at 380° C. for 1 hour and thereafter, cooled to room temperature to obtain Porous Polyimide Film (PIF-3(b)).

Example 4(b)

Porous Polyimide Film (PIF-4(b)) is obtained in the same manner as in Example 2(b) except for using Polyimide Precursor "Water/Isopropanol" Solution (PAA-3(b)).

Example 5(b)

Porous Polyimide Film (PIF-5(b)) is obtained in the same manner as in Example 3(b) except for using Polyimide Precursor "Water/N-Methylpyrrolidone" Solution (PAA-4 (b)) and using toluene for the removal of uncrosslinked resin particle. Since N-methylpyrrolidone has a high boiling temperature and cannot be sufficiently removed by drying at room temperature, the vacancy diameter is large compared with the case of using isopropanol.

Comparative Example 2(b)

30 Parts by mass of monodisperse spherical silica particles having an average diameter of 550 nm (sphericity: 1.0, particle size distribution index: 1.20) produced by Nippon Shokubai Co., Ltd. are dispersed in 30 parts by mass of N-methylpyrrolidone (NMP), and 20 parts by mass of the silica particle dispersion liquid is mixed with 100 parts by mass of Polyimide Precursor "N-Methylpyrrolidone" Solution (RPAA-1(b)). After stirring, the resulting solution is applied onto a glass plate, and the coating is heated at 120° C. for 1 hours and then separated from the glass-made base plate. The coating is further subjected to temperature elevation from room temperature to 380° C. at a rate of 10° C./min, held at 380° C. for 1 hour and thereafter, cooled to room temperature to obtain a silica-polyimide composite film. The silica-polyimide composite film is dipped in 10 mass % hydrogen fluoride water to dissolve and remove the silica over 6 hours, then thoroughly washed with water and dried to obtain Porous Polyimide Film (RPIF-2(b)).

Comparative Example 3(b)

Porous Polyimide Film (RPIF-3(b)) is obtained in the same manner as in Example 3(b) except for using, as the uncrosslinked resin particle, a crosslinked polymethyl methacrylate copolymer having an average particle diameter of 1 µm (SSX-101, produced by Sekisui Plastics Co., Ltd.) and using toluene as the solvent for the removal of uncrosslinked resin particle. In the case of using a crosslinked resin particle, the film is a film having many cracks, and this is considered to result because the crosslinked resin particle swells without dissolving in the solvent.

[Evaluation of Vacancy Diameter Distribution]

The porous polyimide films obtained in Examples 1(b) to 5(b) and Comparative Examples 1(b) to 3(b) are evaluated for the vacancy diameter distribution (maximum diameter, minimum diameter, average diameter, and ratio of long diameter and short diameter). Specifically, the evaluation is performed by the method described above.

[Evaluation of Cracking]

The porous polyimide films obtained in Examples 1(b) to 5(b) and Comparative Examples 1(b) to 3(b) are evaluated for cracking. The method therefor is specifically as follows. A 1 $cm^2$-square area of the polyimide film is examined through a microscope at a magnification of 500 times, and the presence or absence of a crack of 0.1 mm or more is observed with an eye.

—Criteria for Evaluation—

A: No crack.

B: From 1 to 3 cracks.

C: 4 or more cracks.

[Content of Uncrosslinked Resin Except for Polyimide Resin]

The content of the uncrosslinked resin except for a polyimide resin, contained in the porous polyimide film, is measured by the method described above.

TABLE 2

| | Porous Polyimide Film | Solvent | Polyimide Precursor | | | Uncrosslinked Resin Particle | Treatment for Removal | Treatment for Exposure |
| | | | Tetra-carboxylic Acid | Di-amine | Amine Compound | | | |
| --- | --- | --- | --- | --- | --- | --- | --- | --- |
| Example 1(b) | PIF-1(b) | water | BPDA | PDA | MMO | PMMA/St | THF | treated |
| Example 2(b) | PIF-2(b) | water/IPA | BPDA | PDA | MMO | PMMA/St | THF | treated |
| Example 3(b) | PIF-3(b) | water/IPA | BPDA | PDA | MMO | PMMA/St | THF | none |
| Example 4(b) | PIF-4(b) | water/IPA | BPDA | PDA | DMIz | PMMA/St | THF | treated |
| Example 5(b) | PIF-5(b) | water/NMP | BPDA | PDA | DMIz | PMMA/St | Tol | none |
| Comparative Example 1(b) | RPIF-1(b) | NMP | BPDA | PDA | — | PMMA/St | THF | none |
| Comparative Example 2(b) | RPIF-2(b) | NMP | BPDA | PDA | — | silica | hydrofluoric acid | none |
| Comparative Example 3(b) | RPIF-3(b) | water/IPA | BPDA | PDA | MMO | crosslinked PMMA | Tol | none |

| | Porous Polyimide Film | Vacancy | | | | Evaluation of Cracking | Content of Resin Except for Polyimide Resin (mass %) |
| | | Minimum Diameter (µm) | Maximum Diameter (µm) | Average Diameter (µm) | Proportion of Vacancy with Long Diameter/Short Diameter of 1.5 to 1 (%) | | |
| --- | --- | --- | --- | --- | --- | --- | --- |
| Example 1(b) | PIF-1(b) | 0.09 | 0.12 | 0.11 | 98 | A | 0.3 |
| Example 2(b) | PIF-2(b) | 0.09 | 0.12 | 0.11 | 97 | A | 0.4 |
| Example 3(b) | PIF-3(b) | 0.08 | 0.13 | 0.12 | 93 | A | 3.2 |
| Example 4(b) | PIF-4(b) | 0.09 | 0.12 | 0.11 | 96 | A | 0.4 |
| Example 5(b) | PIF-5(b) | 0.11 | 0.18 | 0.15 | 91 | A | 4.5 |

TABLE 2-continued

| | | | | | | | |
|---|---|---|---|---|---|---|---|
| Comparative Example 1(b) | RPIF-1(b) | 0.05 | 1.01 | 0.65 | 5 | B | 0.02 |
| Comparative Example 2(b) | RPIF-2(b) | 0.50 | 0.59 | 0.55 | 98 | C | 0 |
| Comparative Example 3(b) | RPIF-3(b) | 0.85 | 1.85 | 1.40 | 75 | C | 6.5 |

Details of abbreviations in Table 2 are as follows.
"PDA": p-Phenylenediamine
"BPDA": 3,3',4,4'-Biphenyltetracarboxylic acid dianhydride
"MMO"; Methylmorpholine
"DMIz": 1,2-Dimethylimidazole
"THF": Tetrahydrofuran
"Tol": Toluene
"PMMA/St": Uncrosslinked polymethyl methacrylate•styrene copolymer
"Crosslinked PMMA": Crosslinked polymethyl methacrylate copolymer
"IPA": isopropanol
"NMP": N-Methylpyrrolidone Examples 1(c) to 6(c), 1A(c) to 10A(c), Reference Example 1(c), and Comparative Examples 1(c) to 3(c), 1A(c) to 3A(c)

[Preparation of Resin Particle Dispersion Liquid]
—Preparation of Resin Particle Dispersion Liquid (1)—

770 Parts by mass of styrene, 230 parts by mass of butyl acrylate, 15.7 parts by mass of dodecanethiol, 19.8 parts by mass of surfactant Dowfax 2A1 (47% solution, produced by Dow Chemical Co.) and 576 parts by mass of ion-exchanged water are mixed and emulsified by stirring at a rotation speed of 1.500 for 30 minutes to prepare a monomer emulsion liquid. Subsequently, 1.49 parts by mass of Dowfax 2A1 (47% solution, produced by Doe Chemical Co.) and 1,270 parts by mass of ion-exchanged water are charged into a reaction vessel and heated at 75° C. in a nitrogen stream, and a portion (75 parts by mass) of the monomer emulsion liquid is added thereto. A polymerization initiator solution obtained by dissolving 15 parts by mass of ammonium persulfate in 98 parts by mass of ion-exchanged water is then added dropwise over 10 minutes, and the reaction is allowed to proceed for 50 minutes after the dropwise addition. Thereafter, the remaining portion of the monomer emulsion liquid is added dropwise over 220 minutes, and the reaction is further allowed to proceed for 180 minutes. The reaction solution is cooled to obtain Resin Particle Dispersion Liquid (1) as a styrene.acrylic resin particle dispersion liquid where the solid content concentration is adjusted to 30 mass %. The average particle diameter of this resin particle is 0.18 μm.
—Resin Particle Dispersion Liquid (2)—

A water dispersion liquid of an uncrosslinked styrene.acryl copolymer having an average particle diameter of 0.1 μm (FS-102E, produced by Nippon Paint Co., Ltd., solid content concentration: 21 mass %) is used as Resin Particle Dispersion Liquid (2).

Example 1(c)

[Production of Resin Particle-Dispersed Polyimide Precursor Solution (PAA-1(c))]

After adding 350 g of ion-exchanged water to 100 g in terms of solid content of Resin Particle Dispersion Liquid (1), 27.28 g (252.27 mmol) of p-phenylenediamine (molecular weight: 108.14) and 50.00 g (494.32 mmol) of methylmorpholine (organic amine compound) are added thereto and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 40° C., the mixture is stirred for 24 hours to perform dissolution and reaction, whereby Resin Particle-Dispersed Polyimide Precursor Solution (PAA-1(c)) is obtained (resin particle/polyimide precursor=100/100 (mass ratio), concentration of polyimide precursor: 12 mass %).

Example 2(c)

[Production of Resin Particle-Dispersed Polyimide Precursor Solution (PAA-2(c))]

Resin Particle-Dispersed Polyimide Precursor Solution (PAA-2) (resin particle/polyimide precursor=100/100 (mass ratio), concentration of polyimide precursor: 10 mass %) is obtained in the same manner as in Example 1(c) except for changing Resin Particle Dispersion Liquid (1) to Resin Particle Dispersion Liquid (2).

Comparative Example 1(c)

[Production of Resin Particle-Dispersed Polyimide Precursor Organic Solvent Solution (PAA-C1(c))]

After adding 450 g of NMP (N-methylpyrrolidone) to 100 g in terms of solid content of an uncrosslinked styrene.acryl copolymer powder having an average particle diameter of 0.1 μm (FS-102E, produced by Nippon Paint Co., Ltd., 27.28 g (252.27 mmol) of p-phenylenediamine (molecular weight: 108.14) is added thereto and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 40° C., the mixture is stirred for 24 hours to perform dissolution and reaction, whereby production of Resin Particle-Dispersed Polyimide Precursor Organic Solvent Solution (PAA-C1(c)) is attempted (resin particle/polyimide precursor=100/100 (mass ratio), concentration of polyimide precursor: 15 mass %). All resin particles are dissolved until the polyimide precursor is obtained.

Comparative Example 2(c)

[Production of Silica Particle-Dispersed Polyimide Precursor Aqueous Solvent Solution (PAA-C2(c))]

After adding 350 g of ion-exchanged water to 100 g in terms of solid content of Snowtex (registered trademark) ZL (a water dispersion liquid of silica particle, particle diameter: from 70 nm to 100 nm, produced by Nissan Chemical Industries, Ltd.), 27.28 g (252.27 mmol) of p-phenylenediamine (molecular weight: 108.14) and 50.00 g (494.32 mmol) of methylmorpholine (organic amine compound) are added thereto and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 40° C., the mixture is stirred for 24 hours to perform dissolution and reaction, whereby Particle-Dispersed Polyimide Precursor Solution (PAA-C2(c)) having dispersed therein silica particles is obtained (silica particle/polyimide precursor=100/100 (mass ratio), concentration of polyimide precursor: 12 mass %).

Comparative Example 3(c)

[Production of Silica Particle-Dispersed Polyimide Precursor Organic Solvent Solution (PAA-C3(c))]

30 Parts by mass of monodisperse spherical silica particles having an average diameter of 550 nm (sphericity: 1.0, particle size distribution index: 1.20) produced by Nippon Shokubai Co., Ltd. are dispersed in 30 parts by mass of NMP, and 350 g of NMP (N-methylpyrrolidone) is added to 100 g in terms of solid content of the silica particle dispersion liquid obtained. Furthermore, 27.28 g (252.27 mmol) of p-phenylenediamine (molecular weight: 108.14) is added thereto and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 40° C., the mixture is stirred for 24 hours to perform dissolution and reaction, whereby Particle-Dispersed Polyimide Precursor Solution (PAA-C3 (c)) having dispersed therein silica particles is obtained (silica particle/polyimide precursor=100/100 (mass ratio), concentration of polyimide precursor: 15 mass %).

Example 3(c)

[Production of Resin Particle-Dispersed Polyimide Precursor Solution (PAA-3(c))]

Resin Particle-Dispersed Polyimide Precursor Solution (PAA-3(c)) (resin particle/polyimide precursor=100/100 (mass ratio), concentration of polyimide precursor: 12 mass %) is obtained in the same manner as in Example 1 except that in Example 1(c), 290 g of ion-exchanged water and 60 g of isopropanol are added in place of 350 g of ion-exchanged water.

Example 4(c)

[Production of Resin Particle-Dispersed Polyimide Precursor Solution (PAA-4(c))]

Resin Particle-Dispersed Polyimide Precursor Solution (PAA-4(c)) (resin particle/polyimide precursor=100/100 (mass ratio), concentration of polyimide precursor: 12 mass %) is obtained in the same manner as in Example 3(c) except that in Example 3(c), 47.52 g of 1,2-dimethylimidazole is added in place of 50 g of methylmorpholine.

Example 5(c)

[Production of Resin Particle-Dispersed Polyimide Precursor Solution (PAA-5(c))]

Resin Particle-Dispersed Polyimide Precursor Solution (PAA-5(c)) (resin particle/polyimide precursor=140/100 (mass ratio), concentration of polyimide precursor: 10 mass %) is obtained in the same manner as in Example 2(c) except that in Example 2(c), the amount (in terms of solid content) of Resin Particle Dispersion Liquid (2) added is changed from 100 g to 140 g and the amount of ion-exchanged water added is changed from 350 g to 160 g.

Example 6(c)

[Production of Resin Particle-Dispersed Polyimide Precursor Solution (PAA-6(c))]

Resin Particle-Dispersed Polyimide Precursor Solution (PAA-6(c)) (resin particle/polyimide precursor=100/100 (mass ratio), concentration of polyimide precursor: 12 mass %) is obtained in the same manner as in Example 1(c) except that in Example 1(c), 290 g of ion-exchanged water and 60 g of N-methylpyrrolidone are added in place of 350 g of ion-exchanged water.

Reference Example 1(c)

[Production of Resin Particle-Dispersed Polyimide Precursor Solution (PAA-S1(c))]

A flask equipped with a stirring bar, a thermometer and a dropping funnel is filled with 900 g of ion-exchanged water. Thereto, 27.28 g (252.27 mmol) of p-phenylenediamine (molecular weight: 108.14) and 50.00 g (494.32 mmol) of methylmorpholine (organic amine compound) are added and dispersed by stirring at 20° C. for 10 minutes. Furthermore, 72.72 g (247.16 mmol) of 3,3',4,4'-biphenyltetracarboxylic acid dianhydride (molecular weight: 294.22) is added to the resulting solution and while keeping the reaction temperature at 40° C., the mixture is stirred for 24 hours to perform dissolution and reaction, whereby a polyimide precursor "water" solution. This polyimide precursor "water" solution is 10-fold diluted and after Resin Particle Dispersion Liquid (1) is added thereto in a ratio of 10 parts as solid content relative to 10 parts of the polyimide precursor, the mixture is stirred on a web rotor to obtain Resin Particle-Dispersed Polyimide Precursor Solution (PAA-S1(c)).

<Evaluation 1>

[Evaluation of Dispersibility]

The resin particle-dispersed polyimide precursor solutions obtained in Examples 1(c) to 6(c), Comparative Examples 1(c) to 3(c) and Reference Example 1(c) are evaluated for the dispersibility. The method therefor is specifically as follows.

Each of the resin particle-dispersed polyimide precursor solutions obtained is stored by leaving the solution to stand still at room temperature (25° C.) or under refrigeration (3° C.), and the dispersion state of resin particles is evaluated with an eye (when the dispersion of resin particles is changed for the worse, layer separation of the solution or sedimentation of particles can be observed).

—Criteria for Evaluation—

A: The solution is not changed at more than 2 months after initiation of storage.

B: Layer separation or sedimentation of particles is observed in more than 1 month to 2 months after initiation of storage.

C: Layer separation or sedimentation of particles is observed within 1 month after initiation of storage

TABLE 3

| | Particle-Dispersed Polyimide Precursor Solution | No. of Particle Dispersion Liquid | Ratio of Polyimide Precursor/Particle | Solvent | Polyimide Precursor | | Amine Compound | Evaluation of Dispersibility (room temperature) | Evaluation of Dispersibility (refrigeration) |
|---|---|---|---|---|---|---|---|---|---|
| | | | | | Tetracarboxylic Acid | Diamine | | | |
| Example 1(c) | PAA-1(c) | (1) | 100/100 | water | BPDA | PDA | MMO | A | A |
| Example 2(c) | PAA-2(c) | (2) | 100/100 | water | BPDA | PDA | MMO | A | A |
| Example 3(c) | PAA-3(c) | (1) | 100/100 | water/IPA | BPDA | PDA | MMO | A | A |
| Example 4(c) | PAA-4(c) | (1) | 100/100 | water/IPA | BPDA | PDA | DMIz | A | A |
| Example 5(c) | PAA-5(c) | (2) | 100/140 | water | BPDA | PDA | MMO | A | A |
| Example 6(c) | PAA-6(c) | (1) | 100/100 | water/NMP | BPDA | PDA | MMO | A | A |
| Reference Example 1(c) | PAA-S1(c) | (1) | 100/100 | water | BPDA | PDA | MMO | A | B |
| Comparative Example 1(c) | PAA-C1(c) | (2) | 100/100 | NMP | BPDA | PDA | — | cannot be evaluated | cannot be evaluated |
| Comparative Example 2(c) | PAA-C2(c) | silica (1) | 100/100 | water | BPDA | PDA | MMO | B | C |
| Comparative Example 3(c) | PAA-C3(c) | silica (2) | 100/100 | NMP | BPDA | PDA | — | B | C |

<Evaluation 2>
[Production of Porous Polyimide Film (PIF-1(c))]
Resin Particle-Dispersed Polyimide Precursor Solution (PAA-1(c)) is applied onto a glass-made base plate to have a film thickness of about 30 μm after drying, and the coating formed is dried at 90° C. for 1 hour, then subjected to temperature elevation from 90° C. to 380° C. at a rate of 10° C./min, held at 380° C. for 1 hour and thereafter, cooled to room temperature (25° C., hereinafter the same) to obtain Porous Polyimide Film (PIF-1(c)).

[Production of Porous Polyimide Film (PIF-2(c))]
Resin Particle-Dispersed Polyimide Precursor Solution (PAA-1(c)) is applied onto a glass-made base plate to have a film thickness of about 30 μm after drying, and the coating formed is dried at 90° C. for 1 hour, separated from the glass-made base plate, and dipped in tetrahydrofuran for 1 hour. The coating is then subjected to temperature elevation from 90° C. to 380° C. at a rate of 10° C./min, held at 380° C. for 1 hour and thereafter, cooled to room temperature to obtain Porous Polyimide Film (PIF-2(c)).

[Production of Porous Polyimide Films (PIF-3(c)) to (PIF-7(c)), (PIF-9(c)) and (PIF-10(c))]
Porous Polyimide Films (PIF-3(c)) to (PIF-7(c)), (PIF-9(c)) and (PIF-10(c)) are obtained in the same manner as Porous Polyimide Film (PIF-2(c)) except that the kind of the resin particle-dispersed polyimide precursor solution used and the solvent used for dipping are changed to those shown in Table 4. In "Treatment for Exposure" of Table 4, when treated, a step of exposing the resin particle with sandpaper is added after separating the coating from the glass-made substrate.

[Production of Porous Polyimide Film (PIF-8(c))]
Porous Polyimide Film (PIF-8(c)) is obtained in the same manner as Porous Polyimide Film (PIF-1(c)) except that the resin particle-dispersed polyimide precursor solution used is changed to (PAA-2(c)) and a step of applying a treatment for exposing the resin particle with sandpaper is added after drying.

[Production of Porous Polyimide Film (PIF-C1(c))]
Porous Polyimide Film (PIF-C1(c)) is obtained in the same manner as (PIF-2(c)) except that the solution used is changed to (PAA-C1(c)).

[Production of Porous Polyimide Film (PIF-C2(c))]
(PAA-C2(c)) is applied onto a glass-made base plate to have a film thickness of about 30 μm after drying, and the coating formed is heated at 120° C. for 1 hour, separated from the glass-made base plate, then subjected to temperature elevation from room temperature to 380° C. at a rate of 10° C./min, held at 380° C. for 1 hour and thereafter, cooled to room temperature to obtain a silica-polyimide composite film. The silica-polyimide composite film is dipped in 10 mass % hydrogen fluoride water to dissolve and remove the silica over 6 hours, then thoroughly washed with water and dried to obtain Porous Polyimide Film (PIF-C2(c)).

[Production of Porous Polyimide Film (PIF-C3(c))]
Porous Polyimide Film (PIF-C3(c)) is obtained in the same manner as in the production of (PIF-C2(c)) except that the solution used is changed to (PAA-C3(c)).

[Evaluation of Cracking]
The porous polyimide films produced using the resin particle-dispersed polyimide precursor solutions obtained in Examples 1A(c) to 10A(c) and Comparative Examples 1A(c) to 3A(c) are evaluated for cracking. The method therefor is specifically as follows. A 1 cm$^2$-square area of the polyimide film is examined through a microscope at a magnification of 500 times, and the presence or absence of a crack of 0.1 mm or more is observed with an eye.
—Criteria for Evaluation—
A: No crack.
B: From 1 to 3 cracks.
C: 4 or more cracks.

[Evaluation of Vacancy Diameter Distribution]
The porous polyimide films produced using the resin particle-dispersed polyimide precursor solutions obtained in Examples 1A(c) to 10A(c) and Comparative Examples 1A(c) to 3A(c) are evaluated for the vacancy diameter distribution. Specifically, the evaluation is performed by the method described above.

TABLE 4

| | Particle-Dispersed Polyimide Precursor Solution | No. of Particle Dispersion Liquid | Porous Polyimide Film | Treatment for Removal | Treatment for Exposure | Vacancy Minimum Diameter (μm) | Vacancy Maximum Diameter (μm) | Vacancy Average Diameter (μm) | Evaluation of Cracking |
|---|---|---|---|---|---|---|---|---|---|
| Example 1A(c) | PAA-1(c) | (1) | PIF-1(c) | heating | none | 0.17 | 0.20 | 0.19 | A |
| Example 2A(c) | PAA-1(c) | (1) | PIF-2(c) | THF | none | 0.17 | 0.20 | 0.19 | A |
| Example 3A(c) | PAA-2(c) | (2) | PIF-3(c) | THF | treated | 0.08 | 0.13 | 0.12 | A |
| Example 4A(c) | PAA-3(c) | (1) | PIF-4(c) | THF | treated | 0.09 | 0.12 | 0.11 | A |
| Example 5A(c) | PAA-4(c) | (1) | PIF-5(c) | THF | none | 0.11 | 0.18 | 0.15 | A |
| Example 6A(c) | PAA-5(c) | (2) | PIF-6(c) | THF | treated | 0.08 | 0.12 | 0.11 | A |
| Example 7A(c) | PAA-6(c) | (1) | PIF-7(c) | THF | treated | 0.11 | 0.18 | 0.15 | A |
| Example 8A(c) | PAA-2(c) | (2) | PIF-8(c) | heating | treated | 0.08 | 0.12 | 0.11 | A |
| Example 9A(c) | PAA-1(c) | (1) | PIF-9(c) | THF | none | 0.18 | 0.21 | 0.19 | A |
| Example 10A(c) | PAA-1(c) | (1) | PIF-10(c) | Tol | treated | 0.10 | 0.13 | 0.12 | A |
| Comparative Example 1A(c) | PAA-C1(c) | (2) | PIF-C1(c) | THF | none | 0.05 | 1.01 | 0.70 | B |
| Comparative Example 2A(c) | PAA-C2(c) | silica (1) | PIF-C2(c) | hydrofluoric acid | none | 0.80 | 1.10 | 1.00 | C |
| Comparative Example 3A(c) | PAA-C3(c) | silica (2) | PIF-C3(c) | hydrofluoric acid | none | 0.50 | 0.59 | 0.55 | C |

In Comparative Example 1A(c), the difference between the maximum diameter and the minimum diameter (and the ratio of maximum diameter and minimum diameter) is large. This is presumed to occur because the resin particle is dissolved in N-methylpyrrolidone.

Particles of the particle dispersion liquids in Tables 3 and 4 are as follows.

(1): Resin Particle Dispersion Liquid (1), average particle diameter: 0.18 μm (2): Resin Particle Dispersion Liquid (2), average particle diameter: 0.1 μm Silica (1): Snowtex (registered trademark) ZL (particle diameter: from 70 nm to 100 nm, produced by Nissan Chemical Industries, Ltd.)

Silica (2): Monodisperse spherical silica particle having an average diameter of 550 nm (sphericity: 1.0, particle size distribution index: 1.20, produced by Nippon Shokubai Co., Ltd.)

Details of abbreviations in Tables 3 and 4 are as follows.

"PDA": p-Phenylenediamine
"BPDA": 3,3',4,4'-Biphenyltetracarboxylic acid dianhydride
"MMO": Methylmorpholine
"DMIz": 1,2-Dimethylimidazole
"IPA": Isopropanol
"NMP": N-Methylpyrrolidone
"THF": Tetrahydrofuran
"Tol": Toluene

What is claimed is:

1. A porous polyimide film comprising:
   a polyimide film,
   an uncrosslinked resin except for a polyimide resin, wherein a content of the uncrosslinked resin except for a polyimide resin is from 0.1 mass % to 5 mass % relative to the entire porous polyimide film; and
   a substantially spherical vacancy.

2. The porous polyimide film as claimed in claim 1, wherein the uncrosslinked resin except for a polyimide resin is an uncrosslinked resin soluble in a solvent incapable of dissolving the polyimide resin.

3. A method for producing a resin particle-dispersed polyimide precursor solution, comprising polymerizing a tetracarboxylic acid dianhydride and a diamine compound in a resin particle dispersion liquid wherein resin particles are dispersed in an aqueous solvent, in the presence of an organic amine compound to form a polyimide precursor.

4. The method for producing a resin particle-dispersed polyimide precursor solution as claimed in claim 3, wherein the resin particle dispersion liquid is a dispersion liquid wherein the resin particle is granulated in the aqueous solvent.

5. The method for producing a resin particle-dispersed polyimide precursor solution as claimed in claim 3, wherein the organic amine compound is a tertiary amine compound.

6. The method for producing a resin particle-dispersed polyimide precursor solution as claimed in claim 3, wherein the organic amine compound is an amine compound having a nitrogen-containing heterocyclic structure.

7. A resin particle-dispersed polyimide precursor solution obtained by the production method claimed in claim 3.

* * * * *